United States Patent
Teranishi et al.

(10) Patent No.: US 10,647,828 B2
(45) Date of Patent: May 12, 2020

(54) PREPREG AND METHOD FOR PRODUCING SAME

(71) Applicant: Mitsubishi Chemical Corporation, Tokyo (JP)

(72) Inventors: Takuya Teranishi, Toyohashi (JP); Manabu Kaneko, Toyohashi (JP); Masahiro Ichino, Toyohashi (JP); Teppei Miura, Toyohashi (JP); Tadao Samejima, Toyohashi (JP); Akira Miyauchi, Toyohashi (JP); Kiharu Numata, Toyohashi (JP); Shouhei Mori, Toyohashi (JP); Masaki Kusumi, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 436 days.

(21) Appl. No.: 14/425,543

(22) PCT Filed: Sep. 5, 2013

(86) PCT No.: PCT/JP2013/073964
§ 371 (c)(1),
(2) Date: Mar. 3, 2015

(87) PCT Pub. No.: WO2014/038633
PCT Pub. Date: Mar. 13, 2014

(65) Prior Publication Data
US 2015/0252160 A1    Sep. 10, 2015

(30) Foreign Application Priority Data

Sep. 6, 2012  (JP) ................. 2012-196671
Sep. 6, 2012  (JP) ................. 2012-196672

(Continued)

(51) Int. Cl.
B32B 27/38  (2006.01)
C08J 5/24   (2006.01)
(Continued)

(52) U.S. Cl.
CPC ................. *C08J 5/24* (2013.01); *B29C 65/80* (2013.01); *B32B 27/20* (2013.01); *B32B 27/38* (2013.01);
(Continued)

(58) Field of Classification Search
None
See application file for complete search history.

(56) References Cited

U.S. PATENT DOCUMENTS 2,596,162 A   5/1952  Muskat
4,252,593 A   2/1981  Green
(Continued)

FOREIGN PATENT DOCUMENTS

EP   2 682 429 A   1/2014
GB   1 570 991     7/1980
(Continued)

OTHER PUBLICATIONS

Sugimori et al., machine translation of JP 09-003158; Jan. 7, 1997.*
(Continued)

*Primary Examiner* — Coris Fung
(74) *Attorney, Agent, or Firm* — Oblon, McClelland, Maier & Neustadt, L.L.P.

(57) ABSTRACT

This prepreg comprises reinforcing fibers and a matrix resin composition. The matrix resin composition comprises at least an epoxy resin (component (A)), a radical polymerizable unsaturated compound (component (B)), and a polymer formed by radical polymerization of the component (B) (component (E)).

9 Claims, 9 Drawing Sheets

(30) Foreign Application Priority Data

Sep. 6, 2012 (JP) ................................. 2012-196673
Aug. 30, 2013 (JP) ................................. 2013-179583

(51) Int. Cl.
*C09D 163/00* (2006.01)
*B29C 65/80* (2006.01)
*B32B 27/20* (2006.01)
*C08J 5/04* (2006.01)
*B29L 31/00* (2006.01)

(52) U.S. Cl.
CPC ............ *C08J 5/042* (2013.01); *C09D 163/00* (2013.01); *B29L 2031/744* (2013.01); *B32B 2262/106* (2013.01); *B32B 2305/076* (2013.01); *C08J 2363/00* (2013.01); *C08J 2433/00* (2013.01); *C08J 2463/10* (2013.01); *Y10T 428/31511* (2015.04)

(56) References Cited

U.S. PATENT DOCUMENTS

| | | | |
|---|---|---|---|
| 4,372,800 | A | 2/1983 | Oizumi et al. |
| 5,104,718 | A | 4/1992 | Asada et al. |
| 5,387,301 | A | 2/1995 | Miyao et al. |
| 5,396,932 | A | 3/1995 | Homma et al. |
| 2008/0213490 | A1 | 9/2008 | Strange et al. |
| 2008/0299395 | A1 | 12/2008 | Strange et al. |
| 2009/0246468 | A1 | 10/2009 | Schubiger |
| 2010/0040857 | A1 | 2/2010 | Schubiger |
| 2010/0166988 | A1* | 7/2010 | Defoort ............... B29C 65/14 428/34.1 |
| 2011/0014419 | A1* | 1/2011 | Simmons ............... B29C 70/20 428/114 |
| 2012/0238688 | A1* | 9/2012 | Iwashita ............... C08L 23/02 524/504 |
| 2013/0011653 | A1 | 1/2013 | Whiter |
| 2013/0115410 | A1 | 5/2013 | Whiter |
| 2013/0327479 | A1 | 12/2013 | Ichino et al. |

FOREIGN PATENT DOCUMENTS

| | | | |
|---|---|---|---|
| JP | 52-100574 A | 8/1977 | |
| JP | 58-008732 A | 1/1983 | |
| JP | 58-019332 A | 2/1983 | |
| JP | 64-56741 A | 3/1989 | |
| JP | 2-227212 A | 9/1990 | |
| JP | 04-244834 A | 9/1992 | |
| JP | 7-68542 A | 3/1995 | |
| JP | 07-227840 A | 8/1995 | |
| JP | 7-324119 A | 12/1995 | |
| JP | 08-267664 A | 10/1996 | |
| JP | 09-003158 A | 1/1997 | |
| JP | 09-100360 A | 4/1997 | |
| JP | 09-208838 A | 8/1997 | |
| JP | 11-043547 A | 2/1999 | |
| JP | 11-171974 A | 6/1999 | |
| JP | 2002-105223 A | 4/2002 | |
| JP | 2002-327076 A | 11/2002 | |
| JP | 2003-105109 A | 4/2003 | |
| JP | 2009-108217 A | 5/2009 | |
| JP | 2010-156081 A | 7/2010 | |
| JP | 2010-215800 A | 9/2010 | |
| JP | 2011-1499 A | 1/2011 | |
| JP | 2011-515531 A | 5/2011 | |
| TW | 332235 | 5/1998 | |
| WO | WO 02/06027 A1 | 1/2002 | |
| WO | WO 2007/038673 A1 | 4/2007 | |
| WO | WO 2008/059603 A1 | 5/2008 | |
| WO | WO 2009/115832 A1 | 9/2009 | |
| WO | WO 2011/117643 A1 | 9/2011 | |
| WO | WO 2012/010293 A1 | 1/2012 | |
| WO | WO 2012/118208 A1 | 9/2012 | |

OTHER PUBLICATIONS

Office Action dated Nov. 25, 2015 in co-pending U.S. Appl. No. 14/001,391.
Extended European Search Report dated Jan. 3, 2017 in Patent Application No. 16187590.1.
Office Action dated May 25, 2016 in co-pending U.S. Appl. No. 14/001,391.
Extended European Search Report dated Feb. 15, 2016 in Patent Application No. 13835598.7.
Office Action dated Mar. 10, 2016 in co-pending U.S. Appl. No. 14/001,391.
International Search Report dated Dec. 3, 2013 in PCT/JP2013/073964 Filed Sep. 5, 2013.
International Search Report dated May 22, 2012 in PCT/JP2012/055473 Filed Mar. 2, 2012.
Combined Taiwanese Office Action and Search Report dated Mar. 10, 2014 in Patent Application No. 101107026 (with English language translation).
B. Thorfinnson, et al., "Production of void free composite parts without debulking", 31$^{st}$ International SAMPE Symposium, Apr. 1986, pp. 480-490.
B. Thorfinnson, et al., "Degree of impregnation of prepregs—effects on porosity", 32$^{nd}$ International SAMPE Symposium, Apr. 1987, pp. 1500-1509.
Office Action dated Aug. 13, 2015 in co-pending U.S. Appl. No. 14/001,391.
Office Action dated Apr. 17, 2015 in co-pending U.S. Appl. No. 14/001,391.
"Dow Liquid Epoxy Resins", http://msdssearch.dow.com/PublishedLiteratureDOWCOM/dh_0030/0901b8038003041c.pdf?filepath=/296-00224.pdf&fromPage=GetDoc, Published Jan. 1999, 43 pages.
Office Action dated Dec. 10, 2018, in corresponding application No. EP16187590.1.
U.S. Appl. No. 14/001,391, filed Aug. 23, 2013, 2013/0327479 A1, Masahiro Ichino, et al.

* cited by examiner

PREPREG AND METHOD FOR PRODUCING SAME

TECHNICAL FIELD

The present invention relates to a prepreg that is used when a fiber-reinforced composite material is produced, and a method for producing the same.

Particularly, the present invention relates to:
(1) a prepreg which facilitates production of a laminated body, and yields a fiber-reinforced composite material having very few defects such as voids by vacuum bag molding, and a method for producing the same;
(2) a prepreg exhibiting different tack values depending on the pressing pressure, a method for producing the same, and a prepreg roll obtained by winding the prepreg plural turns into a roll shape to form a multi-layer roll;
(3) a protective film-attached prepreg in which tackiness of the prepreg surface is relatively low, but a protective film is satisfactorily adhered to the surface, and a method for producing the same; and
(4) a method for producing a prepreg, including collecting the optically transmitting film used in a prepreg production process, in a state appropriate for recycling, and recycling the optically transmitting film during the production process described above.

The present application claims priority on Japanese Application No. 2012-196671 filed in Japan on Sep. 6, 2012; Japanese Patent Application No. 2012-196672 filed in Japan on Sep. 6, 2012; Japanese Patent Application No. 2012-196673 filed in Japan on Sep. 6, 2012; and Japanese Patent Application No. 2013-179583 filed in Japan on Aug. 30, 2013, the disclosures of which are incorporated herein by reference.

BACKGROUND ART

A fiber-reinforced composite material formed from reinforcing fibers and a matrix resin is lightweight and has excellent mechanical characteristics. Therefore, fiber-reinforced composite materials are widely used in structural materials for aircrafts, wind turbine blades, vehicles, ships, buildings and the like; and sports instruments such as golf shafts, fishing poles, tennis rackets and the like.

Various methods are used in the production of a fiber-reinforced composite material. Among others, a method of forming a prepreg in a sheet form, a tape form or a string form, by impregnating a reinforcing fiber substrate with a matrix resin, and utilizing this as an intermediate substrate, is widely used. For the matrix resin used in a prepreg, a thermosetting resin or a thermoplastic resin is used; however, a thermosetting resin is used more frequently.

CITATION LIST

Patent Document

Patent Document 1: JP 9-100360 A
Patent Document 2: JP 2-227212 A
Patent Document 3: JP 2002-327076 A
Patent Document 4: Japanese Translation of PCT Application No. 2011-515531 A
Patent Document 5: JP 2002-105223 A
Patent Document 6: JP 2009-108217
Patent Document 7: JP 7-227840 A
Patent Document 8: JP 9-208838 A

Non-Patent Document

Non-Patent Document 1: Articles presented in $31^{st}$ (held Apr. 7~10, 1986) and $32^{nd}$ (held Apr. 6~9, 1987) International SAMPE Symposiums ("Production of void free composite parts without debulking", "Degree of impregnation of prepregs—Effects on porosity")

SUMMARY OF THE INVENTION

Problem to be Solved by the Invention

Prepregs are seldom used alone, and generally, plural sheets of prepregs are arranged on a molding mold, laminated, and then heated to obtain a fiber-reinforced composite material. At the time of this arrangement and lamination, if the prepreg surface has appropriate tacky adhesiveness (tackiness), arrangement onto the mold and pasting between prepregs can be easily carried out. Furthermore, in a case in which the position is not appropriate when the prepreg is arranged, it is necessary to peel off the prepreg and rearrange (replace) the prepreg in order to correct the position; however, if the prepreg surface has excessive tackiness, it is difficult to peel off the prepreg.

When a molded product has a curved surface shape, it is necessary to arrange the prepreg on a curved molding mold. However, if the prepreg is rigid, the prepreg does not conform to the curved surface shape of the molding mold when the prepreg is arranged on the molding mold. For this reason, the prepreg is required to have adequate flexibility. If the viscosity of the matrix resin of the prepreg is low, the reinforcing fiber substrate is susceptible to deformation, flexibility of the prepreg is enhanced, and it is easier for the prepreg to conform to the curve shape of the molding mold.

However, if the viscosity of the matrix resin is low, the matrix resin of the prepreg becomes prone to adhere to the worker or the workplace, or tackiness of the prepreg surface becomes excessively high, so that it is highly likely to have a problem such as that replacement of the prepreg may become infeasible.

Furthermore, if the viscosity of the matrix resin is low, and the prepreg has excessive tackiness, air is likely to be incorporated between a prepreg and another prepreg that are laminated (interlayer). When a laminated body of prepregs is cured while having air incorporated therein, impressions may remain as voids in the molded product thus obtained (that is, a fiber-reinforced composite material; hereinafter, the same), and the voids in the molded product serve as stress concentration parts. Therefore, the molded product may have impaired functions, such as decreased strength.

That is, there is a trade-off relationship between the conformity of the prepreg to a molding mold, and the handleability of the prepreg or the ease of obtaining a molded product with fewer voids. Thus, it has been difficult to achieve a balance between these two merely by adjusting the viscosity of the matrix resin.

Furthermore, it is known that when molding is carried out by laminating plural prepregs and curing them, the void ratio of the cured laminated body thus obtained, that is, the molded product, can be decreased by applying pressure. For example, in an application where high mechanical strength is required, such as an aircraft structural material, it is a practical choice to perform heating and curing of a prepreg laminated body under pressure using, for example, an autoclave, in order to obtain a fiber-reinforced composite material having a low void ratio.

However, molding using an autoclave requires more expenses and long time, and in the case of large-sized molded products, the autoclave apparatuses also need to become larger, so that application thereof may not be realistic.

Molding at a lower pressure, for example, heating molding based only on a vacuum pressure (vacuum bag molding), is a substitute molding method that readily enables molding of a large-sized molded product at lower cost; however, the method brings a relatively high void ratio in the cured laminated body.

In order to enhance the product quality of the molded product obtainable by the vacuum bag molding method, attempts to reduce the void ratio have been made by devising the structure of the laminated body before curing (that is, of the prepreg).

For example, there is available a method of performing lamination while removing air between prepregs, while applying pressure and heat when prepregs are laminated using an automatic lay-up machine. However, since this automatic lay-up machine is a very expensive apparatus, it is the current situation that a significant number of the operations of laminating prepregs are carried out manually by operators, or using simple tools.

In the method disclosed in Patent Document 1, a powder of talc or the like is attached to the surface of the prepreg, and thus tackiness of the prepreg is decreased to thereby prevent incorporation of air.

However, while this method of attaching talc is effective in decreasing the tackiness of a prepreg, since talc is included in the molded product, unnecessary increase in weight is brought about in the case of producing large-sized molded products. Furthermore, in a case in which talc has caused variegation, there is also a risk that mechanical properties of the molded product may deteriorate.

Alternatively, Non-Patent Document 1 discloses a method of preventing interlayer voids by employing not a prepreg produced by impregnating the entirety of a reinforcing fiber sheet with a resin, but a prepreg produced by impregnating a resin lopsidedly to one side surface of a reinforcing fiber sheet. In regard to this prepreg having a resin impregnated lopsidedly to one side surface, it is assumed that the side where less resin has been impregnated into the reinforcing fiber sheet, forms flow channels intended for the escape of the air incorporated between layers when plural sheets of prepregs are laminated, or the escape of volatile substances, at the time of curing, and thus generation of voids in the molded product can be prevented.

This prepreg is produced by a method of sandwiching a reinforcing fiber sheet between a release paper coated with a resin and a release paper that is not coated with a resin, integrating the assembly, and clamping and pressing this from both surfaces.

However, a prepreg produced by the above-described method causes a phenomenon in which when the release paper on the side without the coating of resin is peeled off, single yarns in the reinforcing fiber sheet are pulled out from the reinforcing fiber sheet, and the single yarns that have been pulled out are entangled one by one with other single yarns, eventually making openings in that part. Thus, molded articles may have defects.

Furthermore, this prepreg having its resin unevenly distributed to one side surface is such that in a case in which the resin surfaces having less resin impregnated into the reinforcing fiber sheets are arranged to face each other and laminated, mutual adhesion between layers is insufficiently achieved, and the shape as a laminated body cannot be stabilized.

Furthermore, Patent Document 2 discloses that a large number of recessed grooves are formed on the surface of a prepreg that has been sufficiently impregnated with a resin, by using a roller having surface asperities in the circumferential direction. It is assumed that when the recessed grooves are arranged in a constant direction, and plural sheets of this prepreg are laminated and subjected to vacuum bag molding, the recessed grooves on the prepreg surfaces form flow channels intended for the escape upon curing of the air entrapped between layers when plural sheets of prepregs are laminated, or of volatile substances, and therefore, generation of voids in the molded product can be prevented.

However, in the case of laminating and molding plural sheets of prepregs having such a configuration, the flow channels intended for the escape upon curing of the air entrapped between layers of the prepregs, or of volatile substances, may be blocked depending on the shape of the recessed grooves and the way of stacking. Thus, voids that entrap air are rather more likely to be formed.

Patent Document 3 discloses the following method for prepreg production.

That is, a reinforcing fiber sheet is impregnated with a matrix resin so that a continuous resin layer is formed in the interior of the reinforcing fiber sheet, and then a protective film having a surface with convexities and concavities is pasted to at least any one surface of the reinforcing fiber sheet that has been impregnated with resin. In the parts of the reinforcing fiber sheet where convexities of the protective film are closely adhered, the resin impregnated into the reinforcing fiber sheet is attracted to the side of the protective film due to surface tension, and the amount of resin in those parts is increased. Thus, areas where impregnated resin substantially exists are formed. On the other hand, at the sites corresponding to the concavities of the protective film in the reinforcing fiber sheet, the surface tension does not work, and the matrix resin present at the relevant sites described above migrates to the side of the convexities, or to the interior of the prepreg. As a result, the matrix resin substantially does not exist on the surface of the sites corresponding to concavities.

By utilizing this phenomenon, a prepreg is obtained in which a continuous resin layer exists in the interior, and at least one surface is configured to include resin-impregnated parts where the matrix resin exists, and fiber parts where the matrix resin substantially does not exist. It is assumed that since these fiber parts where the matrix resin substantially does not exist, form flow channels intended for the escape upon curing of the air entrapped between layers when plural sheets of prepregs are laminated, or of volatile substances, generation of voids in the molded product can be prevented.

However, as in the case of Patent Document 3, the resin-rich parts formed by the contact with the convexities of the protective film undergo fluid deformation depending on the pressing operation when the prepregs are laminated, or the work temperature environment. Thus, when the resin-rich parts fuse with one another, there is a possibility that the resin-rich parts may block the flow channels intended for the escape upon curing of the air or volatile substances inside the cavities of the concavities, and may cause an increase in the void generation ratio.

Patent Document 4 describes that when a prepreg is produced by impregnating reinforcing fibers with a matrix resin, and then plural resins are deposited on the prepreg surface by inkjet printing or the like to form protruded regions, the gaps between prepregs that are formed by these protruded regions form flow channels intended for the escape upon curing of the air entrapped when plural sheets of prepregs are laminated, or of volatile substances, and therefore, generation of voids in the molded product can be prevented.

However, as in the case of Patent Document 4, there is a possibility that the matrix resin may flow in during vacuum bag molding into the gaps between prepregs formed by the conspicuous protruded regions formed by deposits, and interlayer resin-rich layers may be formed. These interlayer resin-rich layers have a risk of causing deterioration of the properties of the molded product.

An object according to a first aspect of the present invention is to ameliorate such drawbacks of the related art technologies, and to provide a prepreg which has excellent handleability, does not generate voids in a fiber-reinforced composite material, and allows easy production of even a molded article having a curved surface shape; and a method for producing the prepreg.

However, generally in a case in which a molded product (fiber-reinforced composite material) is produced using a prepreg, the prepreg is first disposed on a molding mold, subsequently plural sheets of prepregs are laminated on the foregoing prepreg, and then this laminated body is heated and cured. For this type of molding, sheet-shaped prepregs are often used from the viewpoint of the convenience of lamination.

When a prepreg is disposed on a molding mold, and plural sheets of prepregs are laminated on the foregoing prepreg, if the prepreg surface has appropriate tacky adhesiveness (tackiness), disposition on the molding mold or bonding between prepregs can be easily carried out. If the position of the prepreg at the time of pasting the prepreg onto a molding mold or at the time of laminating prepregs is not appropriate, it is necessary to peel off the prepreg and paste it again (replacement) in order to correct the position to an appropriate position.

If tackiness is reduced, or tackiness is eliminated, the correction of position is made easier; however, discrepancy occurs in the disposition on a molding mold or bonding between prepregs. When tackiness is increased, pasting of a prepreg onto a molding mold or bonding between prepregs is made easier, but discrepancy occurs in the correction of position.

Conventionally, since it is difficult to achieve a balance between these, tackiness has been set with the emphasis on the pasting onto a molding mold and bonding between prepregs. As a result, the degree of tacky adhesiveness (tack) is increased, and for that reason, it becomes difficult for the air between prepreg layers to be discharged. Thus, there is an increasing possibility that the strength of a fiber-reinforced composite material thus obtainable may be decreased.

Furthermore, sheet-shaped prepregs are generally supplied in the form of roll; however, in order to prevent adhesion between prepregs, a prepreg is sandwiched between a release paper and a separating film (or a protective film), or a separating film (or a protective film) is attached to one surface of the prepreg, and thereby this is wound into a roll. If only the prepreg is made into a roll, adhesion between prepregs occurs, and the prepreg cannot be wound off from the roll at the time of molding. The release paper or the separating film (or the protective film) attached to the prepreg needs to be peeled off when prepregs are laminated, and thus this requires time and labor. Furthermore, there is also a problem that the release paper and the separating film (or protective film) become waste materials.

As a means for solving the problems described above, Patent Document 5 discloses a method of providing a prepreg that uses neither a release paper nor a separating film, by sticking a thermoplastic resin film on either surface of a reinforcing fiber matrix layer that is obtained by impregnating reinforcing fibers with an uncured matrix resin.

However, this prepreg obtained by sticking a thermoplastic resin film over the entire surfaces of both surfaces allows easy replacement; however, it is obvious that this prepreg does not adhere onto the frame or onto the prepreg, and the problem of achieving a balance between the ease of replacement of the prepreg, adhesion onto the molding mold, and the firmness of adhesion between prepregs, has not yet been solved.

Furthermore, since a thermoplastic resin film exists in the interior of the fiber-reinforced composite material thus obtained, there is a problem that the upper limit of the content of the reinforcing fibers is low, and the interlayer shear strength is low, compared with a fiber-reinforced composite material in which no thermoplastic resin film exists in the interior.

An object according to a second aspect of the present invention is to provide a prepreg which can achieve a balance between the ease of replacement of the prepreg, adhesion onto a molding mold, and the firmness of the adhesion between prepregs. Furthermore, it is intended to reduce the time or labor required for the prepreg lamination operation at the time of molding, and to enable reduction of waste materials in the production process for a fiber-reinforced composite material, by providing a prepreg roll that does not use a release paper or a separating film.

Furthermore, in regard to a prepreg having a protective film laminated on the surface, when the protective film is detached from the surface during storage or transportation of the prepreg, and foreign materials such as dust and waste fibers attach to the prepreg surface, it is difficult to eliminate those foreign materials due to the tackiness of the prepreg. If a fiber-reinforced composite is produced using a prepreg having foreign materials attached thereto, the foreign materials remain in the fiber-reinforced composite material, and there occurs a problem that the strength of the fiber-reinforced composite material is decreased, or the external appearance is impaired. Also, this protective film is peeled off at a time point when the protective film should protect the prepreg, such as when the prepreg is cut into a desired shape (pattern cutting), workability is significantly adversely affected. Therefore, it is important that the protective film is pasted properly to the prepreg to a certain extent (having sufficient adhesive force).

In order to properly paste a protective film to a prepreg, for example, as described in Patent Document 6, it is general to intensify the adhesive power of the protective film by strengthening tackiness of the prepreg or by subjecting the surface of the protective film to a corona discharge treatment or the like.

However, in a case in which pasting of the protective film is strengthened by increasing tackiness of the prepreg or subjecting the surface of the prepreg to a corona discharge treatment or the like, it may be difficult to detach the protective film before lamination of the prepreg, or replacement of the prepreg may become difficult so that significant hindrance to workability may be brought about.

An object according to a third embodiment of the present invention is to provide a protective film-attached prepreg in which the surface of the prepreg is less tacky, but protective film is satisfactorily adhering to the surface; and a method for producing a protective film-attached prepreg.

However, a prepreg is generally produced using a matrix resin-laminated peelable paper obtained by laminating a resin layer in a semi-cured state, which is formed by applying a matrix resin that has been heated and melted to a certain thickness on a process peelable paper (synonym with the release paper mentioned above) obtained by imparting peelability to a process paper, and cooling this matrix resin. Specifically, a matrix resin-laminated peelable paper is produced by laminating a matrix resin layer on a process peelable paper in advance, and a sheet formed of reinforcing fibers, or the like is interposed between two sheets resin-laminated peelable paper, with the matrix resin layers arranged to face each other. When the matrix resin layer and the reinforcing fibers are heated with a heater from the outside of the peelable paper or pressed with a pressing roll, the reinforcing fibers are impregnated with the matrix, and a prepreg in which the reinforcing fibers and the matrix resin are integrated, is formed.

Next, one of the process peelable papers laminated on the prepreg is peeled off, and a protective film such as a polyethylene film is placed again on the exposed prepreg surface. When this is wound around a paper tube, a prepreg having satisfactory protectiveness and handleability is obtained.

A prepreg produced as such is seldom used alone, as described above, and generally, plural sheets of prepregs are disposed on a mold, laminated, and then heated to obtain a fiber-reinforced composite material. At the time of this disposition and lamination, if the prepreg surface has adequate tackiness, disposition onto a mold and bonding between prepregs can be carried out easily.

Furthermore, if a molded product has a curved surface shape, it is necessary to dispose the prepreg on a molding mold having a curved surface; however, if the prepreg is rigid, the prepreg does not conform to the curved surface shape of the molding mold when disposed on the molding mold. For this reason, the prepreg needs to have appropriate flexibility (drape properties). If the viscosity of the matrix resin that constitutes the prepreg is low, the reinforcing fiber substrate is likely to be deformed, flexibility of the prepreg is enhanced, and it is easier for the prepreg to conform to the curved surface shape of the molding mold.

However, when the viscosity of the matrix resin is low, even if a process peel able paper is used, the prepreg and the process peelable paper are attached strongly by the matrix resin. Thus, the prepreg cannot be satisfactorily detached, and the surface layer of the process peelable paper is peeled off and adheres to the prepreg, causing a decrease in the product quality of the prepreg. Alternatively, there has been a problem that the matrix resin protruding from both edges of the prepreg contaminates the process peelable paper during the production process, and deteriorates the recyclability of the process peelable paper.

As described in Patent Document 7, generally, in regard to the prepreg production process using a low viscosity matrix resin, in order to satisfactorily detach the process peel able paper from the prepreg, a technique of cooling the prepreg with a cooled plate or roll, increasing the viscosity of the matrix resin, and then detaching the process peelable paper is used. However, if a cooling plate or a cooling roll is heavily used, there is a possibility that the dew condensation water may adhere to the prepreg, and there is a risk of deterioration of the product quality of the prepreg, or a process peelable paper that has absorbed moisture due to dew condensation has poor recyclability. In order to collect the process peelability, a process for wiping the dew condensation water from the process peelability is also needed. Furthermore, in order to sufficiently cool the prepreg, it is necessary to extend the duration of the cooling process; however, when there are restrictions on the duration of a process, a cooling method cannot be utilized. Also, repeating heating or cooling during the production process causes a large loss of the energy consumed, and is not preferable from the viewpoint of the production cost or environmental concerns.

As described in Patent Document 8, there is available a technique of enabling easy detachment of a process peelable paper even from a prepreg that uses a low viscosity matrix resin, by a technique of thermally curing a portion of a thermosetting resin and thereby thickening the resin, so-called conversion to B-stage. However, it is difficult to control the thermally curing conditions and to thermally curing only a portion of a thermosetting matrix resin, and it is not feasible to stabilize the product quality. Also, when the prepreg is required to have drape properties, deterioration of the drape properties of the prepreg caused by the viscosity increase of the entire matrix resin also poses a problem. Furthermore, since conversion to B-stage induced by thermal curing requires time, securing of a sufficient duration of the production process is limited only to the application in a low-rate production process.

An object according to a fourth embodiment of the present invention is to provide a method for producing a prepreg in which the matrix resin has low viscosity; even if a strong tacky adhesive layer is formed at the interface between a prepreg and a process peelable material (hereinafter, may be simply referred to as "peelable material"), the prepreg and the process peelable material can be satisfactorily detached; and even in a case in which the matrix resin that has bled out to both edges of the prepreg adheres to the peelable material, the resin composition can be easily removed, so that the peelable material can be collected and reutilized in a state appropriate for reutilization.

Means for Solving Problem

The present invention is intended to solve the various problems described above, and resides in the following item [1].

[1] The invention resides in a prepreg containing reinforcing fibers and a matrix resin composition, in which the matrix resin composition includes at least:
component (A): an epoxy resin,
component (B): a radical polymerizable unsaturated compound, and
component (E): a polymer formed by radical polymerization of the component (B),
and a method for producing the prepreg.

More specifically, the invention relates to the embodiments described in the following items (1) to (4).

(1) A first aspect of the present invention is to provide a prepreg which allows easy production of a laminated body, and yields a fiber-reinforced composite material having very few defects such as voids as a result of vacuum bag molding, and a method for producing the same. Specifically, the first aspect resides in the following items [2] to [4].

[2] The first aspect of the present invention relates to the prepreg described in [1], in which the matrix resin composition further includes component (C): an epoxy resin curing agent, the prepreg is in a sheet form or a tape form, and one surface of the prepreg has plural regions exhibiting different reaction ratios of the matrix resin composition.

[3] One embodiment according to the first aspect of the present invention relates to the prepreg described in [1], in which the component (B) is a (meth)acrylate resin.

[4] Another embodiment according to the first aspect of the present invention relates to a method for producing the prepreg described in [2] or [3], the method including:

producing a prepreg precursor by impregnating a reinforcing fiber substrate containing the reinforcing fibers, with a resin composition for impregnation containing the component (A), the component (B), and the component (C): an epoxy resin curing agent;

irradiating a portion of at least one surface of the prepreg precursor, with at least one energy wave selected from the group consisting of ultraviolet radiation, infrared radiation, visible light and electron beam to thereby cause a portion of the component (B) to react; and producing the component (E) at the surface of the prepreg precursor.

(2) A second aspect of the present invention is to provide a prepreg which exhibits different tack values depending on the pressing pressure, a method for producing the same, and a prepreg roll in which the prepreg is wound plural turns into a roll shape and forms a multilayer roll. Specifically, the second aspect resides in the following items [5] to [11].

The second aspect of the present invention relates to a prepreg in which the matrix resin composition further includes component (C): an epoxy resin curing agent, and component (D): a polymerization initiator that generates a radical, the prepreg is in a sheet form or tape form, and in at least one surface of the prepreg, the tack value measured at a pressing pressure of 40 kPa is 70 kPa or less, while the tack value measured at a pressing pressure of 80 kPa is 150 kPa or more.

[6] An embodiment according to the second aspect of the present invention relates to the prepreg described in [5], in which the component (E) is localized at the surface layer portion of the prepreg.

[7] Another embodiment according to the second aspect of the present invention relates to the prepreg described in [5] or [6], in which when the sum of the component (A), the component (B) and the component (E) is designated as 100 parts by mass, the content sum of the component (B) and the component (E) is 10 parts by mass to 25 parts by mass.

[8] Another embodiment according to the second aspect of the present invention relates to the prepreg described in any one of [5] to [7], in which the reinforcing fibers are in the form of a reinforcing fiber sheet produced by gathering and arranging reinforcing fiber bundles.

[9] Another embodiment according to the second aspect of the present invention relates to a method for producing a prepreg, the method including producing a prepreg precursor sheet by impregnating a reinforcing fiber sheet with a resin composition for impregnation including component (A): an epoxy resin, component (B): a radical polymerizable unsaturated compound, component (C): an epoxy resin curing agent, and component (D1): a photopolymerization initiator which generates a radical when irradiated with ultraviolet radiation or visible light; and irradiating a portion of at least one surface of the prepreg precursor sheet with ultraviolet radiation or visible light.

[10] Another embodiment according to the second aspect of the present invention relates to a prepreg roll in which a continuous prepreg is wound plural turns into a roll shape and forms a multilayer roll, in which the prepregs that form adjacent layers in the prepreg roll are in contact with each other.

[11] Another embodiment according to the second aspect of the present invention relates to the prepreg roll described in [10], which is formed from the prepreg described in any one of [1] to [3] and [5] to [8].

(3) A third aspect of the present invention is to provide a protective film-attached prepreg in which although the tackiness of the prepreg surface is relatively low, a protective film is satisfactorily closely adhering to the surface, and a method for producing the same. Specifically, the third aspect resides in the following items [12] and [13].

[12] The third aspect of the present invention relates to the prepreg described in [1], in which the prepreg is in a sheet form or a tape form, a protective film is laminated on at least one surface of the prepreg, and the tackiness index according to a tackiness evaluation of the prepreg is 50 g or more.

[13] One embodiment according to the third aspect of the present invention relates to a method for producing a prepreg, the method including:

producing a prepreg precursor by impregnating reinforcing fibers in a sheet form or a tape form with a resin composition including component (A): an epoxy resin, component (B): a radical polymerizable unsaturated compound, and component (C): an epoxy resin curing agent;

laminating a protective film on at least one surface of the prepreg precursor;

irradiating a portion of the surface laminated with the protective film, with at least one energy wave selected from the group consisting of ultraviolet radiation, infrared radiation, visible light and electron beam; and thereby causing a portion of the component (B) to react.

(4) A fourth aspect of the present invention is to provide a method for producing a prepreg, the method including collecting the light transmitting film used in a prepreg production process, in a state appropriate for reutilization, and reutilizing the light transmitting film in the production process. Specifically, the fourth aspect resides in the following items [14] to [16].

[14] The fourth aspect of the present invention relates to a method for producing a prepreg, the method including:

a step of preparing a resin composition for impregnation by mixing component (A): an epoxy resin, component (B): a radical polymerizable unsaturated compound, component (C): an epoxy resin curing agent, and component (D): a radical polymerization initiator;

a step of producing a first laminated body in which a light transmitting film is laminated on at least one surface of a prepreg precursor, the step including an impregnation operation for impregnating a reinforcing fiber substrate in a sheet form or a tape form with the resin composition for impregnation, and thus producing a prepreg precursor, and including an operation of laminating a light transmitting film on at least one surface of the reinforcing fiber substrate before the impregnation operation, or including an operation of laminating the light transmitting film on at least one surface of the prepreg precursor obtained after the impregnation operation;

a step of irradiating at least one side of the surface laminated with the light transmitting film of the first laminated body, with at least one energy radiation selected from the group consisting of ultraviolet radiation, infrared radiation, visible light and electron beam, causing a portion of the component (B) to react, and thus producing a second laminated body having at least one surface thereof laminated with the light transmitting film;

a step of detaching and collecting, from the second laminated body, at least one of the light transmitting films on the surfaces irradiated with energy radiation in the step of producing the second laminated body; and a step of reutilizing the light transmitting film collected from the step of collecting the light transmitting film.

[15] One embodiment according to the third aspect of the present invention relates to the method for producing a prepreg described in [14], which further includes a step of reutilizing the light transmitting film collected in the step of collecting the light transmitting film.

[16] The method for producing a prepreg described in [15] may reutilize the light transmitting film collected in the step of collecting the light transmitting film, as the light transmitting film for the step of producing the first laminated body.

Meanwhile, the reinforcing fibers according to the first to fourth aspects of the present invention as described above may be carbon fibers in all cases.

Effect of the Invention

The prepreg related to the first aspect of the present invention contains a matrix resin composition having low viscosity, has satisfactory conformity to a curved surface of a molding mold (drape properties), has adequate tack, and has excellent handleability.

When the prepreg related to the first aspect of the present invention is used, a molded product of a fiber-reinforced composite material having a low void ratio and excellent properties can be easily obtained. Even if laminated prepregs are subjected to vacuum bag molding, since no gaps are generated between the layers because the prepreg surface is smooth, a molded product of a fiber-reinforced composite material which does not have a resin-rich layer that is formed by the resin flowing into the gaps at the time of curing, can be obtained.

According to the method for producing a prepreg related to the first aspect of the present invention, a prepreg which achieves a balance between satisfactory flexibility and adequate tackiness, has a low void ratio, does not have a resin-rich layer, and can easily produce a molded product of a fiber-reinforced composite material having excellent properties, can be easily produced.

The second aspect of the present invention enables a balance to be achieved between the ease of replacement of the prepreg, adhesion onto a molding mold, and the firmness of the adhesion between prepregs. Furthermore, the second aspect of the present invention reduces the time or labor required for the prepreg lamination operation by providing a prepreg roll that does not use a release paper or a separating film, and also, reduction of waste materials in the composite material production process is enabled.

When the protective film-attached prepreg related to the third aspect of the present invention is used, since attachment of foreign materials to the prepreg surface layer, which occurs as a result of unintended peeling of the protective film, can be prevented, a fiber-reinforced composite material having satisfactory strength and external appearance can be obtained.

Furthermore, film detachment that occurs when the prepreg is cut to a desired pattern or the like is suppressed, and after the protective film is detached, satisfactory workability such as easy replacement of the prepreg can be obtained.

According to the method for producing a protective film-attached prepreg related to the third aspect of the present invention, a protective film-attached prepreg in which although the resulting prepreg has low tackiness, the protective film is satisfactorily adhering to the prepreg surface, can be obtained.

According to the method for producing a prepreg related to the fourth aspect of the present invention, even if a low viscosity resin composition for impregnation is used, the process peelable material (light transmitting film) can be easily detached from the prepreg, and collected and/or reutilized. At that time, since the prepreg surface does not undergo partial carry-away of a uniform surface that provides satisfactory external appearance quality and stabilized tackiness, a prepreg having satisfactory external appearance quality and handleability can be obtained.

Furthermore, the collected film is such that attachment of the matrix resin composition that has been bled out from the prepreg surface layer or from both edges of the prepreg is suppressed, and thus the film has satisfactory recyclability.

MODE(S) FOR CARRYING OUT THE INVENTION

Figure 1:
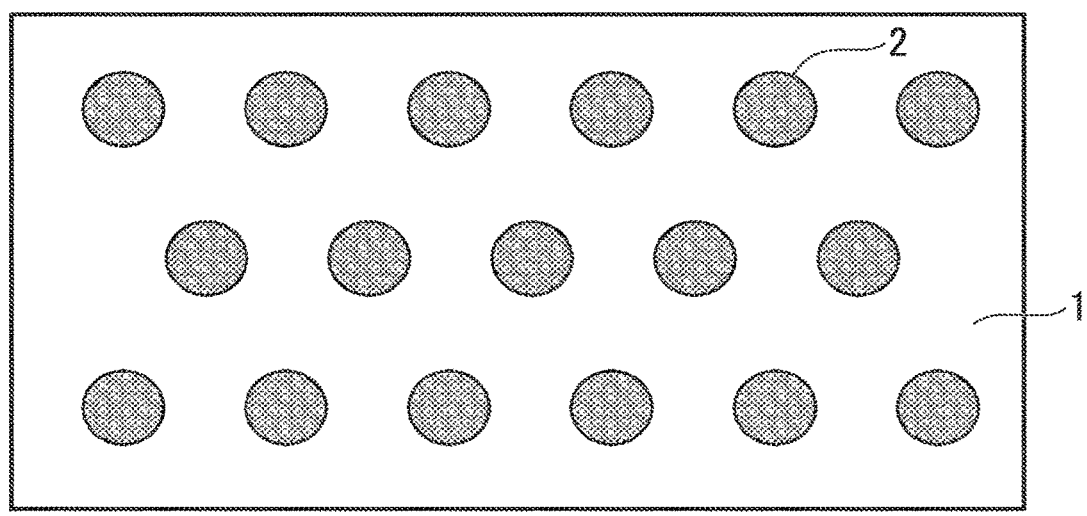
FIG. 1 is a diagram illustrating an example of the sea-island structure pattern as an exemplary pattern of the surface of the prepreg related to the first aspect of the present invention showing regions of a relatively larger content of the component (B) and regions of a relatively larger content of the component (E)

Embodiments of the present invention reside in a prepreg containing reinforcing fibers and a matrix resin composition, in which the matrix resin composition includes at least component (A): an epoxy resin, component (B): a radical polymerizable unsaturated compound, and component (E): a polymer formed by radical polymerization of the component (B); and a method for producing the prepreg.

Furthermore, according to the embodiments of the present invention, a release paper and a process peelable paper have the same meaning, and these papers and a separating film are collectively referred to as "process peelable materials". All of them are members used at least in any one of during the production of a prepreg precursor or during the production of a prepreg; however, it does not matter whether these members are stored or transported while being laminated on a completed prepreg.

Also, the "protective film" accomplishes the role of being laminated on a prepreg and protecting the prepreg at the time of storage or transportation; however, it does not matter whether the protective film has already been laminated on the surface of the prepreg or prepreg precursor during the prepreg production process or during the preceding prepreg precursor production process (that is, also serving as a process peelable material), or the protective film should be freshly laminated on a prepreg after completion of the production.

The "resin composition for impregnation" according to the embodiments of the present invention represents a resin composition that constitutes a prepreg precursor by being impregnated into the reinforcing fiber substrate that will be described below. On the other hand, the "matrix resin composition" represents the resin composition that is included in the prepreg, and means a resin composition obtained after the component (B) included in the resin composition for impregnation has partially reacted (polymerized).

In the present specification, symbol "~" includes the numerical values, ratios and the like described before and after the symbol "~".

Furthermore, in the present specification, the viscosity is defined as a value at 30° C. That is, even for a viscosity having a value that is not included in the range defined in the present specification, if the value obtained after compensation thereof to a value corresponding to a viscosity at 30° C. is included in the range of viscosity defined in the present specification, the value is to be included in the range of the present invention.

Also, in the present specification, the indices of tackiness and the tack value are defined as values measured in an environment at an air temperature of 23±3° C. and a humidity of 50±10% RH. That is, even for an index of tackiness that is not included in the range defined in the present specification, if the value obtained after compensation thereof to a value corresponding to an index of tackiness in an environment at a temperature of 23±3° C. and a humidity of 50±10% RH is included in the range of the index of tackiness defined in the present specification, the value is to be included in the range of the present invention.

More specifically and preferably, some of the embodiments of the present invention are first to fourth embodiments described in the following items (1) to (4).

Hereinafter, embodiments of the present invention will be sequentially described in detail.

(1) First Embodiment

The first embodiment relates to a prepreg in a sheet form or a tape form, containing reinforcing fibers and a matrix resin composition, in which the matrix resin composition includes at least component (A): an epoxy resin, component (B): a radical polymerizable unsaturated compound, component (C): an epoxy resin curing agent, and component (E): a polymer formed by radical polymerization of the component (B), and the prepreg has, on at least one surface, plural regions having mutually different reaction ratios of the matrix resin composition.

Here, the reaction ratio of the matrix resin composition according to the first embodiment means the reaction ratio of the component (B) in the matrix resin composition. That is, the reaction ratio of the matrix resin composition is the ratio of the component (B) that has reacted to become the component (E), with respect to the entire amount of the component (B) included in the matrix resin composition. It can be confirmed that the component (B) has reacted to become the component (E), from a structural analysis by the ATR method based on FT-IR (Fourier Transform Infrared Spectroscopy). Also, since the viscosity of the matrix resin composition locally changes as the component (B) reacts to become the component (E), the ratio can be checked by measuring the change in tackiness of the prepreg surface.

Furthermore, the first embodiment can also be expressed as follows.

(1-i) A prepreg containing reinforcing fibers and a matrix resin including an epoxy resin and a (meth)acrylate resin, the prepreg being in a sheet form or a tape form, in which at least one side of the surfaces thereof is formed to have plural regions having mutually different reaction ratios of the matrix resin.

(1-ii) A method for producing a prepreg containing reinforcing fibers and a matrix resin including an epoxy resin and a (meth)acrylate resin, the method including irradiating at least one side of the surfaces of a prepreg precursor with one kind or plural kinds of energy waves selected from ultraviolet radiation, infrared radiation, visible light and electron beam, and thereby causing a portion of the matrix resin to react.

(1-iii) The production method described in (1-ii), further including a step of impregnating the reinforcing fibers with the matrix resin.

At least one surface of the prepreg related to the first embodiment is configured to include plural classified regions with respect to the level of the reaction ratio of the component (B) included in the matrix resin composition at the prepreg surface. Among these plural classifications, the regions of higher reaction ratio, that is, the region of relatively larger content of the component (E), become regions of lower tackiness of the surface. The regions having lower tackiness form pathways for the air entrapped in the laminated body or volatile substances to escape, during the process of vacuum bag molding a laminated body of the prepreg, particularly during debulking or curing, and thus the void ratio of the resulting molded product is lowered.

The number of the level for classifying the reaction ratio of the matrix resin composition can be any natural number of 1 or more other than the reference level (that is, the reaction ratio of the component (B) at a part that has not been irradiated with the energy radiation described below, in the prepreg surface; hereinafter, the same). However, when the regions are classified into two levels including the reference level, the effects of the first embodiment can be sufficiently obtained from a practical viewpoint. It is also possible to form a more complicated pattern, or to apply gradation to the reaction ratio of the prepreg surface, by increasing the number of levels.

The plural regions have an arbitrary pattern shape as necessary. For example, as described in FIG. 1 and FIG. 2, a pattern of the prepreg surface including a region 2 having a relatively larger content of the component (B) and a region 1 having a relatively larger content of the component (E) is configured as a sea-island structure in which island regions each surrounded by a closed curve or a polygonal line are non-continuously distributed. In this case, the size of individual island regions is preferably from 0.01 cm$^2$ to 100 cm$^2$, and it is preferable that the region 1 of a relatively larger content of the component (E) (the region having a relatively higher reaction ratio, that is, the region with a lowered level of tack) forms the sea region. Also, the width of the sea region between an island region and another island region is preferably from 1 mm to 100 mm, and more preferably from 5 mm to 50 mm.

Figure 3:
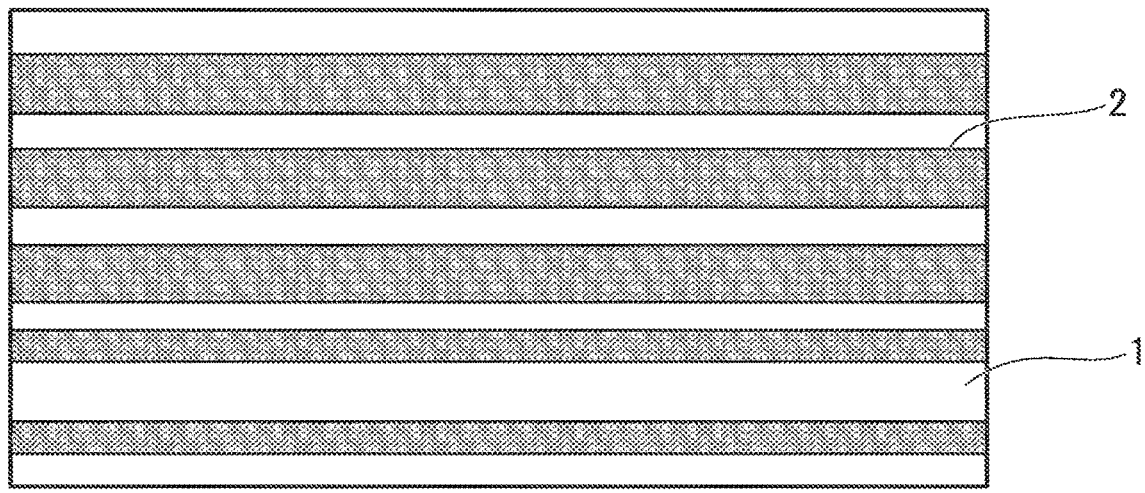
FIG. 3 is a diagram illustrating an example of the striped structure pattern as an exemplary pattern of the surface of the prepreg related to the first embodiment of the present invention showing regions of a relatively larger content of the component (B) and regions of a relatively larger content of the component (E)
Figure 4:
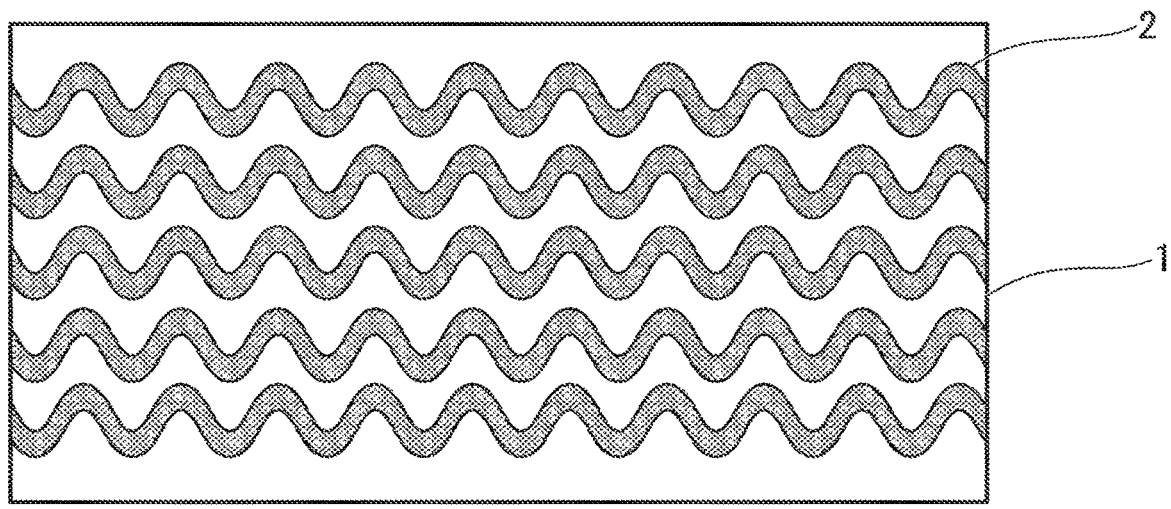
FIG. 4 is a diagram illustrating another example of the striped structure pattern as an exemplary pattern of the surface of the prepreg related to the first embodiment of the present invention showing regions of a relatively larger content of the component (B) and regions of a relatively larger content of the component (E)

As described in FIG. 3 and FIG. 4, the pattern of the prepreg surface of the region 2 having a relatively larger content of the component (B) and the region 1 having a relatively larger content of the component (E) may be configured as a striped structure composed of boundary lines such as straight lines, curved lines, polygonal lines and broken lines. In this case, the width of the pattern of the striped structure (the length in a direction perpendicular to the longitudinal direction of the pattern is designated as the width of the pattern), that is, the widths of the region 2 of a relatively larger content of the component (B) (the region where the reaction ratio of the matrix resin composition is relatively lower) and the region 1 of a relatively larger content of the component (E) (the region where the reaction ratio of the matrix resin composition is relatively higher) are each preferably from 1 mm to 100 mm, and more preferably from 5 mm to 50 mm.

These patterns may be used singly, or two or more kinds thereof may be used in combination.

The proportion of the regions having a relatively larger content of the component (E) at the prepreg surface can be freely set based on the desired prepreg properties; however, in order to form pathways for the air entrapped in the laminated body or volatile substances to escape during the operation of vacuum bag molding the prepreg laminated body, particularly during debulking or curing, and to further lower the void ratio of the resulting molded product, it is preferable that the area of the regions having a relatively larger content of the component (E) is set to be between 20% and 95% of the total area of the prepreg.

It is more effective when the first embodiment is applied to a prepreg in which the basis weight of the reinforcing fibers is 50 g/m$^2$ to 2000 g/m$^2$, and preferably to a prepreg in which the basis weight of the reinforcing fibers is 250 g/m$^2$ to 2000 g/m$^2$. It is even more effective when the first embodiment is applied to a prepreg of 500 g/m$^2$ to 2000 g/m$^2$, and it is particularly effective when the first embodiment is applied to a prepreg of 600 g/m$^2$ to 2000 g/m$^2$.

(Matrix Resin Composition)

The matrix resin composition according to the first embodiment includes component (A): an epoxy resin composition, component (B): a radical polymerizable unsaturated compound, and component (E): a polymer obtained by radical polymerization of the component (B).

<Component (A): Epoxy Resin>

Regarding the component (A): epoxy resin (hereinafter, may be referred to as "epoxy resin (A)"), for example, use can be made of a compound in which epoxy groups of any one form of glycidyl ether type, glycidylamine type, glycidyl ester type, or alicyclic epoxy type, or of two or more forms selected from these forms, exist in the molecule.

Specific examples of an epoxy resin having epoxy groups of glycidyl ether type include bisphenol A type epoxy resins (for example, "jER826", "jER1001", "EPON825", "jER826", "jER827", "jER828", and "jER1001" manufactured by Mitsubishi Chemical Corp.; "EPICLON 850" manufactured by DIC Corp.; "EPOTOTE YD-128" manufactured by Nippon Steel & Sumikin Chemical Co., Ltd.; "DER-331" and "DER-332" manufactured by Dow Chemical Co.), bisphenol F type epoxy resins (for example, "jER806", "jER807", and "jER1750" manufactured by Mitsubishi Chemical Corp.; "EPICLON 830" manufactured by DIC Corp.; "EPOTOTE YD-170" and "EPOTOTE YD-175" manufactured by Nippon Steel & Sumikin Chemical Co., Ltd.), resorcinol type epoxy resins (for example, "DENACOL EX-201" manufactured by Nagase ChemteX Corp.), phenol-novolac type epoxy resins (for example, "jER152" and "jER154" manufactured by Mitsubishi Chemical Corp.; "EPICLON 740" manufactured by DIC Corp.; "EPN179" and "EPN180" manufactured by Huntsman Advanced Materials LLC), ethylene glycol or polyethylene glycol type epoxy resins (for example, "DENACOL EX810" and "DENACOL EX-861" manufactured by Nagase ChemteX Corp.; and "EPOLITE 200E" manufactured by Kyoeisha Chemical Co., Ltd.), propylene glycol or polypropylene glycol type epoxy resins (for example, "DENACOL EX-911", "DENACOL EX-941", "DENACOL EX-920", "DENACOL EX-921", and "DENACOL EX-931" manufactured by Nagase ChemteX Corp.; "EPOLITE 70P", "EPOLITE 200P", and "EPOLITE 400P" manufactured by Kyoeisha Chemical Co., Ltd.; and "EPOLIDE NT228" manufactured by Daicel Chemical Industries, Ltd.), naphthalenediol type epoxy resins (for example, "EPOTOTE ZX-1355" manufactured by Nippon Steel & Sumikin Chemical Co., Ltd.), isocyanate-modified epoxy resins ("AER4152" manufactured by Asahi Kasei Epoxy Co., Ltd.), dicyclopentadiene skeleton-type epoxy resins (for example, "EPICLON HP-7200L" manufactured by DIC Corp.), regioisomers thereof, and substituted forms having substituents such as an alkyl group and a halogen atom.

Specific examples of an epoxy resin having epoxy groups of glycidylamine type include tetraglycidyldiaminodiphenylmethane (for example, "SUMI-EPOXY ELM434" manufactured by Sumitomo Chemical Co., Ltd.; "ARALDITE MY720", "ARALDITE MY721", "ARALDITE MY9512", "ARALDITE MY9612", "ARALDITE MY9634", and "ARALDITE MY9663" manufactured by Huntsman Advanced Materials, LLC; and "jER604" manufactured by Mitsubishi Chemical Corp.), diglycidylaniline (for example, "GAN, GOT" manufactured by Nippon Kayaku Co., Ltd.), and tetraglycidylxylenediamine (for example, "TETRAD-X" manufactured by Mitsubishi Gas Chemical Co., Inc.).

Specific examples of an epoxy resin having epoxy groups of glycidyl ester type include phthalic acid diglycidyl esters (for example, "EPOMIK R508" manufactured by Mitsui Chemical, Inc.; and "DENACOL EX-721" manufactured by Nagase ChemteX Corp.), (methyl)tetrahydrophthalic acid diglycidyl esters, (methyl)hexahydrophthalic acid diglycidyl esters (for example, "EPOMIK R540" manufactured by Mitsui Chemicals, Inc.; and "AK-601" manufactured by Nippon Kayaku Co., Ltd.), isophthalic acid diglycidyl esters, dimeric acid diglycidyl esters (for example, "jER871" manufactured by Mitsubishi Chemical Corp.; "EPOTOTE YD-171" manufactured by Nippon Steel & Sumikin Chemical Co., Ltd.), and various isomers thereof.

Representative examples of an epoxy resin having epoxy groups of alicyclic epoxy type include compounds having cyclohexene oxide groups, tricyclodecene oxide groups, cyclopentene oxide groups, and the like, and specific examples thereof include vinylcyclohexene diepoxide, vinylcyclohexene monoepoxide, (3',4'-epoxycyclohxane) methyl 3,4-epoxycyclohexanecarboxylate (for example, "CELLOXIDE 2021P" manufactured by Daicel Corp.; and "CY179" manufactured by Huntsman Advanced Materials, LLC), (3',4'-epoxycyclohexane)octyl 3,4-epoxycyclohexanecarboxylate (for example, "CELLOXIDE 2081" manufactured by Daicel Corp.), 1-methyl-4-(2-methyloxiranyl)-7-oxabicyclo[4.1.0]heptane (for example, "CELLOXIDE 3000" manufactured by Daicel Corp.), 2-(3,4-epoxycyclohexyl-5,5-spiro-3,4-epoxy)cyclohexane-m-dioxane, bis(3,4-epoxycyclohexyl) adipate, bis(3,4-epoxycyclohexylmethylene) adipate, and bis(2-methyl-4,5-epoxycyclohexylmethylene) adipate.

Specific examples of an epoxy resin having epoxy groups of both glycidyl ether type and glycidylamine type include triglycidylaminophenol and triglycidylaminocresol (for example, "SUMI-EPOXY ELM-100" and "SUMI-EPOXY ELM-120" manufactured by Sumitomo Chemical Co., Ltd.; "jER630" manufactured by Mitsubishi Chemical Corp.; "ARALDITE MY0500", "ARALDITE MY0510", "ARALDITE MY0600", and "ARALDITE MY0610" manufactured by Huntsman Advanced Materials, LLC; and "EPOTOTE YDCN-701" manufactured by Nippon Steel & Sumikin Chemical Co., Ltd.).

These epoxy resins may be used singly, or in combination of two or more kinds thereof. Among these epoxy resins, it is preferable to include a bisphenol A type epoxy resin from the viewpoints of heat resistance and toughness of the cured matrix resin composition. Also, it is more preferable to include a bisphenol A type epoxy resin and an isocyanate-modified epoxy resin.

<Component (B): Radical Polymerizable Unsaturated Compound>

The component (B): radical polymerizable unsaturated compound (hereinafter, may be referred to as "radical polymerizable unsaturated compound (B)") is a low molecular weight compound, high molecular weight compound, or oligomer containing a radical polymerizable unsaturated bond, that is, a carbon-carbon double bond or triple bond in the molecule. The low molecular weight compound containing a carbon-carbon double bond or triple bond in the molecule as used herein refers to a monomer containing a carbon-carbon double bond or triple bond in the molecule, and the molecular weight is generally approximately 50 to 1000. The oligomer means a product obtained by polymerizing plural (generally, 2 to 100) monomers.

An example of the low molecular weight compound containing a radical polymerizable unsaturated bond in the molecule is a low molecular weight compound having one or more, for example, one to six, radical polymerizable unsaturated bonds in the molecule. Examples thereof include a (meth)acrylate compound, an allyl phthalate compound, an allyl isophthalate compound, an allyl terephthalate compound, and an allyl cyanurate compound. Meanwhile, the "(meth)acrylate" according to the present invention means "acrylate or methacrylate".

Preferred are an acrylate compound and a methacrylate compound.

Examples of a low molecular weight compound having one radical polymerizable unsaturated bond in the molecule include phenoxyethyl acrylate (for example, "VISCOAT #192" manufactured by Osaka Organic Chemical Industry, Ltd.), ethoxydiethylene glycol acrylate (for example, "LIGHT ACRYLATE EC-A" manufactured by Kyoeisha Chemical Co., Ltd.), methoxytriethylene glycol acrylate (for example, "LIGHT ACRYLATE MTG-A" manufactured by Kyoeisha Chemical Co., Ltd.), methoxydipropylene glycol acrylate (for example, "LIGHT ACRYLATE DPM-A" manufactured by Kyoeisha Chemical Co., Ltd.), isobornyl acrylate (for example, "LIGHTACRYLATE IB-XA" manufactured by Kyoeisha Chemical Co., Ltd.), and phenyl glycidyl ether acrylic acid adduct (for example, "DENACOL ACRYLATE DA-141" manufactured by Nagase ChemteX Corp.).

Examples of a low molecular weight compound having two radical polymerizable unsaturated bonds in the molecule include triethylene glycol diacrylate (for example, "LIGHT ESTER 3EG-A" manufactured by Kyoeisha Chemical Co., Ltd.), tetraethylene glycol diacrylate (for example, "ARONIX M-240" manufactured by Toagosei Co., Ltd.), neopentyl glycol diacrylate (for example, "LIGHT ESTER NP-A" manufactured by Kyoeisha Chemical Co., Ltd.), 1,6-hexanediol diacrylate (for example, "LIGHT ESTER 1,6HX-A" manufactured by Kyoeisha Chemical Co., Ltd.), bisphenol A propylene oxide adduct diacrylate (for example, "LIGHT ESTER BP-2PA" manufactured by Kyoeisha Chemical Co., Ltd.), bisphenol A ethylene oxide adduct diacrylate (for example, "NEOMER BA-641" manufactured by Sanyo Chemical Industries, Ltd.), hydrated bisphenol A propylene oxide adduct diacrylate (for example, "NEOMER HA-605" manufactured by Sanyo Chemical Industries, Ltd.), hydrated bisphenol A ethylene oxide adduct diacrylate (for example, "NEOMER HA-601" manufactured by Sanyo Chemical Industries, Ltd.), bisphenol S ethylene oxide adduct diacrylate (for example, "ARONIX M-205" manufactured by Toagosei Co., Ltd.), dimethylolpropanetricyclodecane diacrylate (for example, "LIGHT ESTER DCP-A" manufactured by Kyoeisha Chemical Co., Ltd.), ethylene glycol dimethacrylate (for example, "LIGHT ESTER EG" manufactured by Kyoeisha Chemical Co., Ltd.), diethylene glycol dimethacrylate (for example, "LIGHT ESTER 2EG" manufactured by Kyoeisha Chemical Co., Ltd.), triethylene glycol dimethacrylate (for example, "NEOMER PM-201" manufactured by Sanyo Chemical Industries, Ltd.), 1,4- butanediol dimethacrylate (for example, "LIGHT ESTER 1•4BG" manufactured by Kyoeisha Chemical Co., Ltd.), 1,6-hexanediol dimethacrylate (for example, "LIGHT ESTER 1•6HX" manufactured by Kyoeisha Chemical Co., Ltd.), glycerin dimethacrylate (for example, "LIGHT ESTER G-101P" manufactured by Kyoeisha Chemical Co., Ltd.), bisphenol A ethylene oxide adduct dimethacrylate (for example, "LIGHT ESTER BP-2EM" manufactured by Kyoeisha Chemical Co., Ltd.), bisphenol A propylene oxide adduct dimethacrylate, bis(2-acryloyloxyethyl) (2-hydroxyethyl) cyanurate (for example, "ARONIX M-215" manufactured by Toagosei Co., Ltd.), bisphenol A diglycidyl ether acrylic acid adduct (for example, "EPOXY ESTER 3000A" manufactured by Kyoeisha Chemical Co., Ltd.; "DIABEAM UK6105" manufactured by Mitsubishi Rayon Co., Ltd.), bisphenol A ethylene oxide adduct diglycidyl ether acrylic acid adduct, bisphenol A ethylene oxide adduct diglycidyl ether methacrylic acid adduct, bisphenol A propylene oxide adduct diglycidyl ether acrylic acid adduct (for example, "EPOXY ESTER 3002A" manufactured by Kyoeisha Chemical Co., Ltd.), bisphenol A propylene oxide adduct diglycidyl ether methacrylic acid adduct (for example, "EPOXY ESTER 3002M" manufactured by Kyoeisha Chemical Co., Ltd.), glycerol diglycidyl ether acrylic acid adduct (for example, "EPOXY ESTER 80MFA manufactured by Kyoeisha Chemical Co., Ltd.), diglycidyl phthalate acrylic acid adduct (for example, "DENACOL ACRYLATE DA-721" manufactured by Nagase ChemteX Corp.), diglycidyl tetrahydrophthalate acrylic acid adduct (for example, "DENACOL ACRYLATE DA-722" manufactured by Nagase ChemteX Corp.), resorcinol diglycidyl ether methacrylic acid adduct (for example, "DENACOL ACRYLATE DA-201" manufactured by Nagase ChemteX Corp.), diallyl phthalate, diallyl isophthalate, and diallyl terephthalate.

Examples of a low molecular weight compound having three radical polymerizable unsaturated bonds in the molecule include trimethylolpropane triacrylate (for example, "ARONIX M-309" manufactured by Toagosei Co., Ltd.), pentaerythritol triacrylate (for example, "ARONIX M-305" manufactured by Toagosei Co., Ltd.), trimethylolpropane trimethacrylate (for example, "LIGHT ESTER TMP" manufactured by Kyoeisha Chemical Co., Ltd.), tris(2-acryloyloxyethyl) cyanurate (for example, "ARONIX M-315" manufactured by Toagosei Co., Ltd.), tris(2-acryloyloxyethyl)phosphate (for example, "VISCOAT 3PA" manufactured by Osaka Organic Chemical Industries, Ltd.), glycerol triglycidyl ether acrylic acid adduct (for example, "DENACOL ACRYLATE DA-314" manufactured by Nagase ChemteX Corp.), and triallyl cyanurate. Also, examples of an oligomer having three radical polymerizable unsaturated bonds in the molecule include novolac type glycidyl ether acrylic acid adduct (for example, "DICLITE UE-8740" manufactured by DIC Corp.).

Examples of a low molecular weight compound having four radical polymerizable unsaturated bonds in the molecule include pentaerythritol tetraacrylate (for example, "LIGHT ESTER BP-4A" manufactured by Kyoeisha Chemical Co., Ltd.), glycerin dimethacrylate isophorone diisocyanate adduct (for example, "URETHANE ACRYLATE UA-101I" manufactured by Kyoeisha Chemical Co., Ltd.), glycerin dimethacrylate hexamethylene diisocyanate adduct (for example, "URETHANE ACRYLATE UA-101H" manufactured by Kyoeisha Chemical Co., Ltd.), and glycerin dimethacrylate tolylene diisocyanate adduct (for example, "URETHANE ACRYLATE UA-101T" manufactured by Kyoeisha Chemical Co., Ltd.).

Examples of a low molecular weight compound having five radical polymerizable unsaturated bonds in the molecule include dipentaerythritol pentaacrylate (for example, "NEOMER DA-600" manufactured by Sanyo Chemical Industries, Ltd.).

Examples of a low molecular weight compound having six radical polymerizable unsaturated bonds in the molecule include dipentaerythritol hexaacrylate (for example, "LIGHT ESTER DPE-6A" manufactured by Kyoeisha Chemical Co., Ltd.), pentaerythritol trimethacrylate isophorone diisocyanate adduct (for example, "URETHANE ACRYLATE UA-306I" manufactured by Kyoeisha Chemical Co., Ltd.), pentaerythritol trimethacrylate hexamethylene diisocyanate adduct ("URETHANE ACRYLATE UA-306H" manufactured by Kyoeisha Chemical Co., Ltd.), and pentaerythritol trimethacrylate tolylene diisocyanate adduct (for example, "URETHANE ACRYLATE UA-306T" manufactured by Kyoeisha Chemical Co., Ltd.).

Furthermore, for the radical polymerizable unsaturated compound (B) according to the first embodiment of the present invention, a polymer compound or oligomer having a radical polymerizable unsaturated bond in at least any one of chain ends, a side chain or a main chain can be used. Here, the main chain of a polymer compound or an oligomer refers to the longest straight chain of the polymer compound or oligomer. The side chain of a polymer compound or an oligomer refers to a straight chain extending from a substituent contained in the main chain. The chain end of a polymer compound or an oligomer refers to both ends of the main chain.

Examples of a compound having radical polymerizable unsaturated bonds at the chain ends include a compound in which the terminal hydroxyl groups of polyethylene glycol or polypropylene glycol have been esterified with acrylic acid or methacrylic acid; a polyester containing maleic acid or fumaric acid as an acid component; and a polyimide having the amino ends capped with maleic anhydride, nadic anhydride or ethynylphthalic anhydride, all having a radical polymerizable unsaturated bond.

Examples of an unsaturated polyester resin having a radical polymerizable unsaturated bond in the main chain include an orthophthalic acid-based resin, an isophthalic acid anhydride, a terephthalic acid anhydride, a bisphenol-based resin, a propylene glycol maleic acid-based resin, and dicyclopentadiene or a derivative thereof introduced into an unsaturated polyester composition.

Meanwhile, as the radical polymerizable unsaturated compound (B), the low molecular weight compounds or oligomers described above are preferred from the viewpoint of suppressing an increase of viscosity in the resin composition, the radical polymerizable unsaturated compound (B).

Regarding the radical polymerizable unsaturated compound (B), a low molecular weight compound, a high molecular weight compound, or an oligomer, all of which have a partial structure that reacts with the epoxy resin (A), together with a radical polymerizable unsaturated bond, can also be used. When such a compound is used, chemical bonding is formed between a polymer block constituted by the epoxy resin (A) and a polymer block constituted by the radical polymerizable unsaturated compound (B) in a cured product of the matrix resin, and morphology and properties can be improved.

Examples of such a compound include, as compounds each having one radical polymerizable unsaturated bond, 2-acryloyloxyethyl hydrogen phthalate (for example, "VISCOAT #2000" manufactured by Osaka Organic Chemical Industries, Ltd.), 2-acryloyloxypropyl hydrogen phthalate (for example, "VISCOAT #2100" manufactured by Osaka Organic Chemical Industries, Ltd.), 2-methacryloyloxyethyl hydrogen phthalate (for example, "LIGHT ESTER HO-MP" manufactured by Kyoeisha Chemical Co., Ltd.), 4-hydroxybutyl acrylate, 2-acryloyloxyethyl 2-hydroxypropyl phthalate (for example, "VISCOAT #2311HP" manufactured by Osaka Organic Chemical Industries, Ltd.), maleic anhydride, and nadic anhydride.

Furthermore, examples of a compound having two radical polymerizable unsaturated bonds include bisphenol A diglycidyl ether acrylic acid partial adduct (for example, "RIPDXY SP-1509H1" manufactured by Showa Denko K.K.), and bis(2-acryloyloxyethyl) 2-hydroxyethyl cyanurate (for example, "ARONIX M-215" manufactured by Toagosei Co., Ltd.).

From the viewpoint that the high molecular weight component produced by radical polymerization at the prepreg surface has a crosslinked structure, and a high viscosity increasing effect may be obtained at the prepreg surface, it is preferable to use a compound having plural radical polymerizable unsaturated bonds in the molecule as the radical polymerizable unsaturated compound (B).

Furthermore, a compound having a hydroxyl group, a carboxyl group or an amino group as the partial structure that reacts with the epoxy resin (A) is more preferred. This is because the epoxy groups in the epoxy resin (A) can easily react with these groups, or the hydroxyl group, carboxyl group and the like that are generated when the epoxy groups react have high affinity due to the interaction with these groups.

Regarding the radical polymerizable unsaturated compound (B) used in the first embodiment, one kind of compound may be used singly, or two or more kinds of compounds may be used in combination. In view of polymerizability and the extent of the viscosity increase of the resin composition containing the radical polymerizable unsaturated compound (B), bisphenol A diglycidyl ether (meth)acrylic acid adduct is preferred.

In regard to the resin composition for impregnation, the content of the component (B) is preferably from 10 parts by mass to 25 parts by mass when the sum of the component (A) and the component (B) is designated as 100 parts by mass. When the content of the component (B) is 10 parts by mass or more, it is preferable because the tack value of the prepreg can be easily controlled. When the content of the component (B) is 25 parts by mass or less, since the component (B) does not remain in a large amount in the fiber-reinforced composite material obtainable after the prepreg is laminated and cured, preferable strength of the fiber-reinforced composite material is obtained.

<Component (C): Epoxy Resin Curing Agent>

The matrix resin composition and the resin composition for impregnation of the first embodiment preferably contains component (C): an epoxy resin curing agent (hereinafter, may be referred to as "epoxy resin curing agent (C)".

Examples of the epoxy resin curing agent (C) include amine type agents, acid anhydrides (carboxylic acid anhydrides and the like), phenols (novolac resins and the like), mercaptans, Lewis amine complexes, onium salts, and imidazoles; however, a curing agent having any structure may be used as long as it is capable of curing the epoxy resin (A). Among these, amine type curing agents are preferred. These curing agents may be used singly, or in combination of two or more kinds.

Examples of the amine type curing agents include aromatic amines such as diaminodiphenylmethane and diaminodiphenylsulfone; aliphatic amines such as diethylenetriamine; imidazole derivatives such as 2-ethyl-4-methylimidazole; dicyandiamide, tetramethylguanidine, thiourea-added amine, and isomers, modification products and the like thereof. Among these, from the viewpoint of having excellent preservability of the prepreg, dicyandiamide is particularly preferred.

In order to increase the curing activity of the epoxy resin curing agent (C), a curing aid may also be used in combination. For example, when the epoxy resin curing agent (C) is dicyandiamide, the curing aid is preferably a urea derivative such as 3-phenyl-1,1-dimethylurea, 3-(3,4-dichlorophenyl)-1,1-dimethylurea (DCMU), 3-(3-chloro-4-methylphenyl)-1,1-dimethylurea, or 2,4-bis(3,3-dimethylureido) toluene; when the epoxy resin curing agent (C) is a carboxylic acid anhydride or a novolac resin, the curing aid is preferably a tertiary amine such as tris(dimethylaminomethyl)phenol; and when the epoxy resin curing agent (C) is diaminodiphenylsulfone, the curing aid is preferably an imidazole compound such as 2-ethyl-4-methylimidazole, a urea compound such as phenyldimethylurea (PDMU), or an amine complex such as boron trifluoride monomethylamine or a boron trichloride-amine complex.

Among these, a combination of dicyandiamide and DCMU is particularly preferred.

<Component (D): Radical Polymerization Initiator>

It is preferable that the matrix resin composition and the resin composition for impregnation of the first embodiment contain component (D): a radical polymerization initiator (hereinafter, may be referred to as "radical polymerization initiator (D)".

Regarding the radical polymerization initiator (D), for example, when the stimulation for the generation of a radical is conducted by irradiation with ultraviolet radiation or visible light, a photopolymerization initiator that causes a reaction such as cleavage, hydrogen abstraction, electron transfer or the like when irradiated with ultraviolet radiation or visible light, can be used as the polymerization initiator. Furthermore, when polymerization is carried out by irradiating infrared radiation or ultrasonic waves, or by pressing a heated plate, a thermal polymerization initiator that generates a radical by heat can be used.

For the photopolymerization initiator, known photopolymerization initiators can be used without any particular limitations.

Specific examples thereof include, but are not limited to, carbonyl-based photopolymerization initiators such as benzophenone, co-bromoacetophenone, chloroacetone, acetophenone, diethoxyacetophenone, 2,2-dimethoxy-2-phenylacetophenone, p-dimethylaminoacetophenone, p-dimethylaminopropiophenone, 2-chlorobenzophenone, 4,4'-dichlorobenzophenone, 4,4-bis(diethylamino)benzophenone, 2,4,6-trimethylbenzophenone, 4-phenylbenzophenone, Michler's ketone, benzoin methyl ether, benzoin isobutyl ether, benzoin n-butyl ether, benzyl methyl ketal, 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, 2-hydroxy-1-{4-[4-(2-hydroxy-2-methylpropionyl)benzyl]phenyl}-2-methylpropan-1-one, 2-methyl-1-(4-methylthiophenyl)-2-morpholinopropan-1-one, and 2-benzyl-2-dimethyl amino-1-(4-morpholinophenyl)-butanone-1,2-(dimethylamino)-2-[(4-methylphenyl) methyl]-1-[4-(4-morpholinyl)phenyl]-1-butanone.

Further examples include sulfide-based photopolymerization initiators such as diphenyl disulfide, dibenzyl disulfide, and tetraethylmethylammonium sulfide; quinine-based photopolymerization initiators such as benzoquinone, t-butylanthraquinone, and 2-ethylanthraquinone; azo-based photopolymerization initiators such as azibisisobutyronitrile, 2,2'-azobispropane, and hydrazine; thioxanthone-based photopolymerization initiators such as thioxanthone, 2-chlorothioxanthone, and 2-methylthioxanthone; peroxide-based photopolymerization initiators such as benzoyl peroxide and di-t-butyl peroxide; oxime ester compound-based photopolymerization initiators such as 1-[4-(phenylthio)phenyl]-1, 2-octanedione-2-(O-benzoyloxime), and O-acetyl-1-[6-(2-methylbenzoyl)-9-ethyl-9H-carbazol-3-yl]ethanone oxime; and oxyphenylacetic acid ester-based photopolymerization initiators such as oxyphenylacetic acid and 2-[2-oxo-2-phenylacetoxyethoxy]ethyl ester, and oxyphenylacetic acid.

These photopolymerization initiators can be used singly or in combination of two or more kinds.

Among them, from the viewpoint of generating a radical by ultraviolet radiation and having high solubility in various resins, α-hydroxyalkylphenones such as 1-hydroxycyclohexyl phenyl ketone, 2-hydroxy-2-methyl-1-phenylpropan-1-one, 1-[4-(2-hydroxyethoxyl)phenyl]-2-hydroxy-2-methyl-1-propan-1-one, and 2-hydroxy-1-{4-[4-(2-hydroxy-2-methyl propionyl)benzyl]phenyl}-2-methylpropan-1-one are preferred.

Regarding the thermal polymerization initiator that generates a radical by heating, for example, an azo compound and an organic peroxide can be used. Examples of the azo compound that can be used include azonitrile compounds such as 2,2'-azobis(4-methoxy-2,4-dimethylvaleronitrile) (for example, "V-70" manufactured by Wako Pure Chemical Industries, Ltd.), 2,2'-azobis(2,4-dimethylvaleronitrile) (for example, "V-65" manufactured by Wako Pure Chemical Industries, Ltd.), 2,2'-azobisisobutyronitrile (for example, "V-60" manufactured by Wako Pure Chemical Industries, Ltd.), 2,2'-azobis(2-methylbutyronitrile) (for example, "V-59" manufactured by Wako Pure Chemical Industries, Ltd.), 1,1'-azobis(cyclohexane-1-carbonitrile) (for example, "V-40" manufactured by Wako Pure Chemical Industries, Ltd.), 1-[(1-cyano-1-methylethyl)azo]formamide (for example, "V-30" manufactured by Wako Pure Chemical Industries, Ltd.), and 2-phenylazo-4-methoxy-2,4-dimethylvaleronitrile (for example, "V-19" manufactured by Wako Pure Chemical Industries, Ltd.); azoamide compounds such as 2,2'-azobis[2-methyl-N-[1,1-bis(hydroxymethyl)-2-hydroxyethyl]propionamide (for example, "VA-080" manufactured by Wako Pure Chemical Industries, Ltd.), 2,2'-azobis[2-methyl-N-[1,1-bis(hydroxymethyl)ethyl]propionamide] (for example, "VA-082" manufactured by Wako Pure Chemical Industries, Ltd.), 2,2'-azobis[2-methyl-N-[2-(1-hydroxybutyl)]-propionamide] (for example, "VA-085" manufactured by Wako Pure Chemical Industries, Ltd.), 2,2'-azobis[2-methyl-N-(2-hydroxyethyl)propionamide] (for example, "VA-086" manufactured by Wako Pure Chemical Industries, Ltd.), 2,2'-azobis(2-methylpropionamide)dihydrate (for example, "VA-088" manufactured by Wako Pure Chemical Industries, Ltd.), 2,2'-azobis[N-(2-propenyl)-2-methylpropionamide] (for example, "VF-096" manufactured by Wako Pure Chemical Industries, Ltd.), 2,2'-azobis(N-butyl-2-methylpropionamide) (for example, "VAm-110" manufactured by Wako Pure Chemical Industries, Ltd.), and 2,2'-azobis(N-cyclohexyl-2-methylpropionamide) (for example, "VAm-111" manufactured by Wako Pure Chemical Industries, Ltd.); and alkylazo compounds such as 2,2'-azobis(2,4,4-trimethylpentane) (for example, "VR-110" manufactured by Wako Pure Chemical Industries, Ltd.), and 2,2'-azobis(2-methylpropane) (for example, "VR-160" manufactured by Wako Pure Chemical Industries, Ltd.). Examples of the organic peroxide include 1,1-bis(t-butylperoxy)-2,2,5-trimethylcyclohexane (for example, "PERHEXA 3M-95" manufactured by NOF Corp.), 1,1-bis(t-butylperoxy)cyclododecane (for example, "PERHEXA CD" manufactured by NOF Corp.), 1,1,3,3-tetramethyl hydroperoxide (for example, "PEROCTA H" manufactured by NOF Corp.), 1,1-dimethylbutyl peroxide (for example, "PERHEXYL H" manufactured by NOF Corp.), bis(1-t-butylperoxy-1-methylethyl)benzene (for example, "PERBUTYL P" manufactured by NOF Corp.), dicumyl peroxide (for example, "PERCUMYL D" manufactured by NOF Corp.), 2,5-dimethyl-2,5-bis(t-butylperoxy)hexane (for example, "PERHEXA 25B" manufactured by NOF Corp.), t-butylcumyl peroxide (for example, "PERBUTYL C" manufactured by NOF Corp.), di-t-butyl peroxide (for example, "PERBUTYL D" manufactured by NOF Corp.), 2,5-dimethyl-2,5-bis(t-butylperoxy)hexyne (for example, "PERHEXYNE 25B" manufactured by NOF Corp.), benzoyl peroxide, lauroyl peroxide (for example, "PEROYL L" manufactured by NOF Corp.), decanoyl peroxide (for example, "SANPEROX DPO" manufactured by Sanken Chemical Co., Ltd.), dicyclohexyl peroxydicarbonate (for example, "SANPEROX CD" manufactured by Sanken Chemical Co., Ltd.), bis(4-t-butylcyclohexyl) peroxydicarbonate (for example, "PEROYL TCP" manufactured by NOF Corp.), t-butyl 2-ethylperhexanoate (for example, "PERBUTYL O" manufactured by NOF Corp.), (1,1-dimethylpropyl) 2-ethylperhexanoate (for example, "TRIGONOX 121" manufactured by Kayaku Akzo Corp.), (1,1-dimethylbutyl) 2-ethylperhexanoate (for example, "KAYA ESTER HO" manufactured by Kayaku Akzo Corp.), t-butyl 3,5,5-trimethylperhexanoate (for example, "PERBUTYL 355" manufactured by NOF Corp.), t-hexylperoxyisopropyl monocarbonate (for example, "PERHEXYL I" manufactured by NOF Corp.), t-butyloxyisopropyl carbonate (for example, "PERBUTYL I" manufactured by NOF Corp.), t-butylperoxy-2-ethylhexyl carbonate (for example, "PERBUTYL E" manufactured by NOF Corp.), t-butylperoxymaleic acid (for example, "PERBUTYL MA" manufactured by NOF Corp.), t-butyl peroxylaurate (for example, "PERBUTYL L" manufactured by NOF Corp.), and t-butyl peroxybenzoate (for example, "PERBUTYL Z" manufactured by NOF Corp.). These thermal polymerization initiators may be used singly or as mixtures of plural kinds.

Furthermore, a photopolymerization initiator and a thermal polymerization initiator may be used in combination as the means for generating a radical. When a photopolymerization initiator and a thermal polymerization initiator are used in combination, radicals can be generated from both the photopolymerization initiator and the thermal polymerization initiator, by conducting irradiation of ultraviolet radiation or visible light so as to generate a radical from the photopolymerization initiator, and irradiation of infrared radiation or ultrasonic waves and pressing of a heated plate so as to generate a radical from the thermal polymerization initiator, simultaneously or sequentially.

<Component (E): Polymer Formed by Radical Polymerization of Component (B)>

The component (E) is a polymer obtainable when the component (B): a radical polymerizable unsaturated compound undergoes radical polymerization. Also, the component (E) may form chemical bonding with the component (A) or a compound derived from the component (A).

It is preferable that the component (E) is localized at the prepreg surface layer section. The surface layer section of a prepreg means the space extending from an arbitrary point at the surface of the prepreg to the surface of reinforcing fibers that is reached for the first time along the thickness direction of the prepreg, the space being filled by a matrix resin composition.

When the component (E) is localized at the prepreg surface layer section, the viscosity of the matrix resin composition at the prepreg surface is high, and the viscosity of the matrix resin composition in the interior is lowered. Therefore, tackiness of the prepreg surface can be controlled while the drape properties of the prepreg are maintained.

The sum of the contents of the component (B) and the component (E) in the matrix resin composition is preferably 10 parts by mass to 25 parts by mass when the sum of the contents of the component (A), the component (B) and the component (E) is designated as 100 parts by mass. When the sum of the contents of the component (B) and the component (E) is adjusted to 10 parts by mass or more when the sum of the contents of the component (A), the component (B) and the component (E) is designated as 100 parts by mass, a sufficient tackiness controlling effect is obtained. When the sum of the contents is adjusted to 25 parts by mass or less, in a case in which a fiber-reinforced composite material is produced by stacking plural sheets of prepregs and curing the prepregs, the degree of curing, strength, heat resistance and the interlayer binding force are not easily lowered.

<Other Components (Optional Components)>

The matrix resin composition according to the first embodiment may optionally contain one or more components selected from the group consisting of a thermoplastic resin, a thermoplastic elastomer and an elastomer, to the extent that the effects of the first embodiment are not impaired. These components play the role of regulating the viscosity, storage modulus and thixotropy of the matrix resin composition, and also play the role of changing the viscoelasticity or enhancing the toughness of the cured product of the matrix resin composition. These components may be mixed together with the various components described above, or may have them dissolved in the epoxy resin (A) in advance.

The thermoplastic resin that can be used in the first embodiment is preferably a thermoplastic resin having a bond selected from the group consisting of a carbon-carbon bond, an amide bond, an imide bond, an ester bond, an ether bond, a carbonate bond, a urethane bond, a urea bond, a thioether bond, a sulfone bond, an imidazole bond and a carbonyl bond, in the main chain. Examples of such a thermoplastic resin include polyacrylate, polyamide, polyaramid, polyester, polycarbonate, polyphenylene sulfide, polybenzimidazole, polyimide, polyether imide, polysulfone, and polyether sulfone. Among these, polyimide, polyether imide, polysulfone and polyether sulfone are particularly preferred from the viewpoint of having excellent heat resistance.

When the matrix resin composition according to the first embodiment contains a thermoplastic resin, it is preferable that the thermoplastic resin has a functional group that is reactive with the epoxy group carried by the epoxy resin (A), from the viewpoint of enhancing toughness of the cured product and maintaining the resistance to environment. Particularly preferred functional groups are a carboxyl group, an amino group, and a hydroxyl group.

If the matrix resin composition according to the first embodiment is liquid at the time point of being impregnated into the reinforcing fiber substrate, the matrix resin composition may contain additives that are solid at normal temperature, as optional components. Examples of the additives that are solid at normal temperature, which can be used in the first embodiment, include inorganic particles of silica, alumina, titanium oxide, zirconia, clay minerals, talc, mica, ferrite and the like; and carbonaceous components such as carbon nanotubes and fullerenes. These solid additives have an effect of imparting thixotropy to an uncured matrix resin composition, and an effect of enhancing the elastic modulus, heat resistance, fatigue strength, and/or abrasion resistance of a cured product of the matrix resin composition. Also, particles of metals, carbon black, copper oxide, tin oxide and the like can also be incorporated as the solid additives, for the purpose of enhancing electrical conductivity. The content of the solid additives is preferably adjusted to from 1% by weight to 50% by mass relative to the total mass of the matrix resin composition.

(Viscosity of Resin Composition for Impregnation)

The resin composition for impregnation according to the first embodiment is such that the viscosity at 30° C. is preferably 12 Pa·s to 40,000 Pa·s, and more preferably 40 Pa·s to 30,000 Pa·s. If the lower limit of the viscosity of the resin composition for impregnation is less than 12 Pa·s, there is a tendency that it is difficult for the prepreg precursor that will be described below to maintain the shape during the operation of impregnation into a reinforcing fiber substrate. Also, if the viscosity is more than 40,000 Pa·s, there is a tendency that it is difficult to impregnate a reinforcing fiber substrate with the resin composition for impregnation.

The lower limit of the viscosity at 30° C. of the resin composition for impregnation is more preferably 50 Pa·s, and even more preferably 60 Pa·s. Also, the upper limit of the viscosity at 30° C. is more preferably 20,000 Pa·s, and even more preferably 10,000 Pa·s.

Particularly, a resin composition for impregnation having a viscosity lower than the upper limit value described above is preferred because the resin composition for impregnation has satisfactory impregnability to a reinforcing fiber substrate having a relatively high FAW (Fiber Areal Weight) value that will be described below, and a thick prepreg appropriate for the production of large-sized members for aircrafts, wind turbine blades, ships, vehicles, buildings and the like can be easily obtained.

(Preparation of Resin Composition for Impregnation)

The resin composition for impregnation is prepared by uniformly mixing the above-described epoxy resin (A) and radical polymerizable unsaturated compound (B), and the epoxy resin curing agent (C), the radical polymerization initiator (D), and other components (optional components) that are used as necessary. As long as various components are uniformly kneaded to obtain a uniform resin composition for impregnation, any general method that has been traditionally used can be employed.

For example, the resin composition for impregnation may be prepared by simultaneously mixing the various components that constitute the resin composition for impregnation, or if necessary, a master batch having an epoxy resin curing agent (C), a radical polymerization initiator (D), and other additives appropriately dispersed in advance in an epoxy resin (A) or a radical polymerizable unsaturated compound (B), may be prepared so that the resin composition for impregnation can be prepared using this master batch. For the mixing operation, mixing machines such as a three-roll mill, a planetary mixer, a kneader, a universal stirring machine, a homogenizer, and a homodispenser can be used.

(Reinforcing Fiber Substrate)

The reinforcing fiber substrate according to the first embodiment is a substrate in a sheet form or a tape form, which is composed of a large number of reinforcing fibers. Also, for convenience, a substrate having a relatively large width is called a sheet, and a substrate having a narrow width is called a tape; however, there are no limitations on the size of the reinforcing fiber substrate.

Examples of the form of the reinforcing fiber substrate used in the first embodiment include a form in which continuous fibers are aligned in one direction, a form in which continuous fibers are warped and woofed into a woven fabric, a form in which tows are aligned in one direction and are maintained by weft auxiliary yarns, a form in which plural sheets of reinforcing fiber sheets arranged in one direction are stacked up in different directions and stitched with auxiliary yarns into a multiaxial warp knit fabric, and a form in which the reinforcing fibers are processed into a non-woven fabric.

Among them, a form in which continuous fibers are aligned in one direction, a form in which continuous fibers are warped and woofed into a woven fabric, a form in which tows are aligned in one direction and are maintained by weft auxiliary yarns, and a form in which plural sheets of reinforcing fiber sheets arranged in one direction are stacked up in different directions and stitched with auxiliary yarns into a multiaxial warp knit fabric are preferred.

From the viewpoint of manifesting the strength of the fiber-reinforced composite material obtainable by curing the prepreg according to the first embodiment, the form in which continuous fibers are aligned in one direction is more preferred.

The basis weight of the reinforcing fiber substrate can be freely set according to the purpose of use of the fiber-reinforced composite material formed using the prepreg obtainable by the first embodiment; however, a practically preferred range of the basis weight is 50 g/m$^2$ to 2000 g/m$^2$.

Meanwhile, in order to impart drape properties to the prepreg according to the first embodiment, it is preferable to apply a low viscosity matrix resin composition having a viscosity at 30° C. of 50 Pa·s to 20,000 Pa·s such as described above, and in that case, the basis weight of the reinforcing fiber substrate is preferably 250 g/m$^2$ to 2000 g/m$^2$, more preferably 500 g/m$^2$ to 2000 g/m$^2$, and particularly preferably 600 g/m$^2$ to 2000 g/m$^2$.

The reinforcing fibers that constitute the reinforcing fiber substrate according to the first embodiment can be selected from a wide variety of appropriate materials; however, in order to supply a particularly excellent prepreg by the production method of the first embodiment, carbon fiber or graphite fiber is suitable.

Regarding the carbon fiber or graphite fiber that can be used in the first embodiment, all kinds of carbon fibers or graphite fibers can be used in accordance with the use; however, from the viewpoint that a fiber-reinforced composite material having high strength is obtained, carbon fiber is more preferred. The fiber diameter of the carbon fiber used is preferably 3 μm to 20 μm because it is easy to produce the carbon fiber, and the fiber has high strength. Here, the fiber diameter is a diameter corresponding to that of a circle having an area equivalent to the cross-section of each single fiber. Furthermore, a high strength carbon fiber having a tensile elongation of 1.5% or more but less than 3.0% is suitable for the manifestation of strength of the fiber-reinforced composite material.

(Pattern)

At least one surface of the prepreg according to the first embodiment has a pattern of plural regions that are classified into plural levels of the reaction ratio of the matrix resin composition at the prepreg surface. That is, the prepreg according to the first embodiment has, in at least one surface, plural regions having mutually different reaction ratios of the matrix resin composition.

Figure 2:
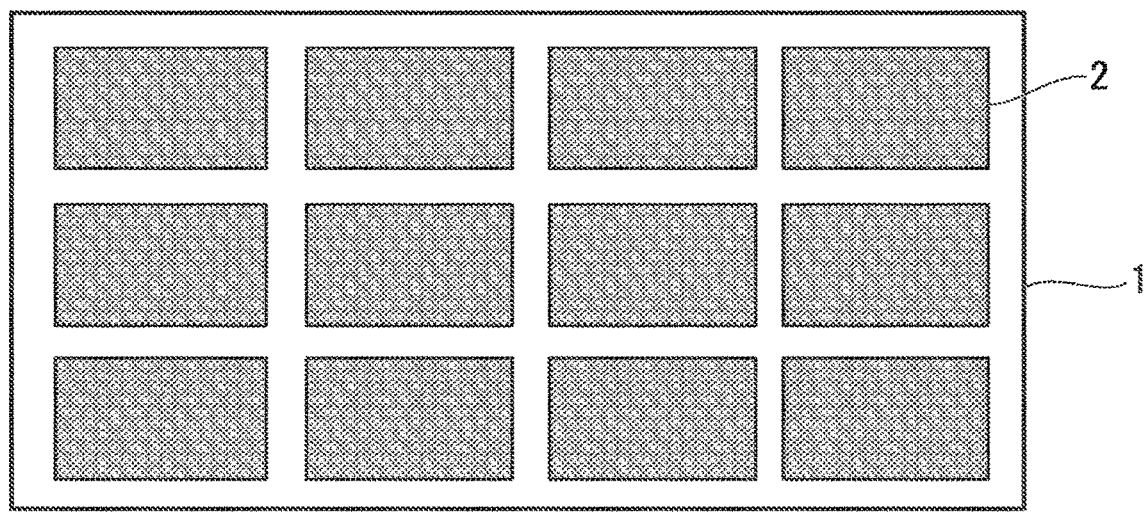
FIG. 2 is a diagram illustrating another example of the sea-island structure pattern as an exemplary pattern of the surface of the prepreg related to the first embodiment of the present invention showing regions of a relatively larger content of the component (B) and regions of a relatively larger content of the component (E)

The pattern shape of the regions may be any arbitrary shape as necessary, and examples thereof include a striped structure configured by boundary lines such as straight lines, curved lines, polygonal lines and broken lines as illustrated in FIG. 3 and FIG. 4; and a sea-island structure in which island regions surrounded by closed curves or polygonal lines are non-continuously distributed as illustrated in FIG. 1 and FIG. 2. These may be used singly, or two or more kinds may be used in combination.

A region having a high reaction ratio of the matrix resin composition, that is, a region having a large content of the component (E) (that is, a polymer formed by radical polymerization of the component (B): radical polymerizable unsaturated compound), has lower tackiness compared with a region having a low reaction ratio of the matrix resin composition. Therefore, when the region having a high reaction ratio of the matrix resin composition reaches the outer periphery of the prepreg, it is preferable because the pathways intended for the escape of the air entrapped in the laminated body (laminated prepreg) or volatile substances are in communication with the outside of the laminated body, and thus the generation of voids in the resulting molded product can be suppressed.

The number of levels for classifying the reaction ratios of the matrix resin composition can be any arbitrary natural number of one or more in addition to the reference level; however, when the regions are classified into two levels including the reference level, the effects of the first embodiment can be sufficiently obtained from a practical viewpoint. It is also possible to form a more complicated pattern, or to produce a gradation of the reaction ratio at the prepreg surface, by increasing the number of levels.

In regard to the case of the exemplary embodiment in which at least one surface of the prepreg according to the first embodiment has two classifications with respect to the level of the reaction ratio of the matrix resin composition at the prepreg surface (regions of a relatively higher reaction ratio and regions of a relatively lower reaction ratio), in the case of a pattern having a striped structure, the width of the pattern of the striped structure, that is, the widths of the regions having a relatively lower reaction ratio of the matrix resin composition and the widths of the regions having a relatively higher reaction ratio are each preferably from 1 mm to 100 mm, and more preferably from 5 mm to 50 mm.

In regard to the same exemplary embodiment, in the case of a pattern having a sea-island structure, the size of the individual island regions is preferably from 0.01 cm$^2$ to 100 cm$^2$, and it is preferable that the regions of a relatively higher reaction ratio (that is, the regions having a low level of tackiness) form the sea region. Also, the width of the sea region between an island region and another island region is preferably from 1 mm to 100 mm, and more preferably from 5 mm to 50 mm.

In a prepreg that is obtainable by a preferred exemplary embodiment, for the respective regions where the reaction ratio of the matrix resin composition is at particular levels, the difference in tackiness can be checked based on the sense of touch felt when a pillar-like rod, for example, a glass rod, having a sufficiently small cross-sectional area and having a highly smooth bottom is pressed and detached in the regions of the pattern at the prepreg surface. This method for measuring the difference in tackiness will be described in detail below.

(Method for Producing Prepreg)

The prepreg according to the first embodiment is obtained by producing a prepreg precursor by impregnating a reinforcing fiber substrate containing the reinforcing fiber described above, with a resin composition for impregnation containing component (A): an epoxy resin, component (B): a radical polymerizable unsaturated compound, and component (C): an epoxy resin curing agent; irradiating a portion of at least one surface of the prepreg precursor with at least one energy wave selected from the group consisting of ultraviolet radiation, infrared radiation, visible light and electron beam to thereby react a portion of the component (B); and thus producing component (E): a polymer formed by radical polymerization of the component (B) at the surface of the prepreg precursor.

The prepreg precursor is obtained by impregnating a reinforcing fiber substrate with a resin composition for impregnation by a known method. The prepreg precursor can be produced by, for example, impregnating a reinforcing fiber substrate with a resin composition for impregnation by means of a technique such as applying a predetermined amount of the resin composition for impregnation on the surface of a process peelable material such as a release paper, supplying the reinforcing fiber substrate on the surface, and then passing the assembly between pressing rolls; or by impregnating a reinforcing fiber substrate with a resin composition for impregnation by means of a technique such as applying a predetermined amount of the resin composition for impregnation directly on the reinforcing fiber substrate, subsequently sandwiching the reinforcing fiber substrate between process peelable materials if necessary, and then passing the assembly between pressing rolls.

The prepreg according to the first embodiment has, on at least one surface, plural regions having different reaction ratios of the matrix resin composition.

On the prepreg precursor surface, the component (B) included in the region irradiated with the energy wave described above undergoes radical polymerization and becomes the component (E). Therefore, tackiness of the region surface is decreased.

As such, regions that have been irradiated with an energy wave and have reduced tackiness and regions that have not been irradiated and maintain high tackiness form a pattern at the surface of the prepreg according to the first embodiment as described above. That is, the prepreg has a pattern formed from plural regions that are classified based on plural levels of the reaction ratio on at least one surface of the prepreg.

The pattern can be obtained by stimulating (specifically, irradiating the energy wave described above) regions of a shape corresponding to a desired pattern on the surface of a reinforcing fiber substrate impregnated with a resin composition for impregnation containing a polymerizable component (that is, component (B)), and thereby controlling the reaction ratio of the component (B) in the resin composition for impregnation.

In the case of using a rein composition for impregnation containing a photopolymerization initiator as the radical polymerization initiator (D), the pattern can be obtained by an irradiation method of irradiating ultraviolet radiation or visible light through a photomask, or an irradiation method of scanning or flashing with a shutter of laser light. It is desirable that the wavelength of the ultraviolet radiation or visible light used, the amount of irradiation, and the irradiation time are appropriately set to have a desired prepreg surface state.

In the case of using a resin composition for impregnation containing a thermal polymerization initiator, the pattern can be obtained by local heating by irradiation with infrared radiation or electron beam through a mask, local heating using an ultrasonic horn, or local heating using a heating roll or a heating plate having convexities and concavities of the shape of the pattern. The temperature and time of the prepreg heated by the heating apparatuses described above may be appropriately set to obtain a desired prepreg surface state.

Moreover, in the case of forming a pattern by electron beam irradiation, which does not require the radical polymerization initiator (D), the pattern can be obtained by an irradiation method of scanning or flashing with a shutter of an electron beam over a reinforcing fiber sheet impregnated with a rein composition for impregnation. The irradiation energy and the irradiation dose of the electron beam used may be appropriately set to have a desired prepreg surface state.

For the photomask used to form a pattern, for example, a photomask produced by disposing absorbing or shielding parts formed of a material that absorbs or shields the irradiated energy rays, on a substrate sheet formed of a material that transmits most of the irradiated energy ray can be used, and for example, in the case of ultraviolet radiation, a photomask produced by forming absorbing and/or shielding sections with a metal foil or a pigment such as metal particles or inorganic particles, on a quartz plate or an ultraviolet-transmitting film of polyester or the like, can be used. Alternatively, a photomask produced by providing openings on a material capable of shielding the irradiated energy rays, such as a metal plate, can be used.

The dose of the energy rays irradiated on the reinforcing fiber sheet impregnated with a matrix resin composition, which is the prepreg precursor of the first embodiment, can be controlled by controlling the transmittance of the energy radiation in the absorbing or shielding parts with the material or thickness of the absorbing or shielding sections.

A preferred exemplary embodiment of the prepreg of the first embodiment is such that a matrix resin composition having a high reaction ratio is localized only at the surface layer section of the prepreg (that is, the component (E) is localized at the prepreg surface layer section).

Therefore, it is desirable to select the kind of the reinforcing fibers according to the kind of the stimulation (preferably, energy wave irradiation) for subjecting the component (B) to a radical reaction, and in consideration of the strength required from the resulting molded article.

For example, in the case of irradiating visible light or ultraviolet radiation so as to cause the component (B) to react, it is preferable to use carbon fiber, graphite fiber or the like that does not transmit these radiations. Also, in the case of irradiating infrared irradiation or bringing a heating roll or heating plate into contact, a low heat conductive fiber such as glass fiber is preferred.

(2) Second Embodiment

The second embodiment relates to a prepreg containing reinforcing fibers and a matrix resin composition, in which the reinforcing fibers constitute a reinforcing fiber sheet, the matrix resin composition includes component (A): an epoxy resin, component (B): a radical polymerizable unsaturated compound, and component (E): a polymer formed by radical polymerization of the component (B), as well as component (C): an epoxy resin curing agent and component (D): a polymerization initiator that generates a radical, and for at least one surface of the prepreg, the tack value measured at a pressing pressure of 40 kPa is 70 kPa, while the tack value measured at a pressing pressure of 80 kPa is 150 kPa or more.

Furthermore, the prepreg roll related to the second embodiment is a prepreg roll in which a continuous prepreg is wound plural turns into a roll shape and form a multilayer roll, in which the prepregs that constitute adjacent layers in the prepreg roll are in contact with each other. Meanwhile, the prepreg that constitutes the prepreg roll is preferably the prepreg related to the second embodiment described above.

Furthermore, the second embodiment of the present invention can also be expressed as follows.

(2-i) A prepreg containing a matrix resin composition and a reinforcing fiber sheet, in which for at least one surface of the prepreg, the tack value of the prepreg measured at a pressing pressure to the prepreg of 40 kPa is 70 kPa or less, and the tack value of the prepreg measured at a pressing pressure to the prepreg of 80 kPa is 150 kPa or more.

(2-ii) The prepreg described in the above item (2-i), in which the matrix resin composition (I) includes component (A): an epoxy resin, component (B): a radical polymerizable unsaturated compound, component (C): an epoxy resin curing agent, component (D): a polymerization initiator that generates a radical, and component (E): a polymer containing a radical polymerizable unsaturated compound as a monomer.

(2-iii) The prepreg described in the above item (2-ii), in which the component (E) is localized at the surface layer portion of the prepreg.

(2-iv) The prepreg described in the above item (2-ii) or (2-iii), in which when the sum of the contents of the component (A): an epoxy resin, the component (B): a radical polymerizable unsaturated compound, and the component (E): a polymer containing a radical polymerizable unsaturated compound as a monomer is designated as 100 parts by mass, the sum of the contents of the component (B) and the component (E) is 10 parts by mass to 25 parts by mass.

(2-v) The prepreg described in any one of the above items (2-i) to (2-iv), in which the reinforcing fibers are in the form of a reinforcing fiber sheet obtained by gathering and arranging reinforcing fiber bundles.

(2-vi) A method for producing a prepreg, the method including producing a prepreg precursor sheet by impregnating a reinforcing fiber sheet with a resin composition for impregnation containing component (A): an epoxy resin, component (B): a radical polymerizable unsaturated compound, component (C): an epoxy resin curing agent, and component (D1): a photopolymerization initiator that generates a radical when irradiated with ultraviolet radiation or visible light, and irradiating a portion of the surface of at least one of the prepreg precursor sheets with ultraviolet radiation or visible light.

(2-vii) A prepreg roll having a continuous prepreg wound plural turns into a roll shape to form a multilayer roll, in which the prepreg and the prepreg that constitute adjacent layers in the prepreg roll are directly in contact with each other.

(2-viii) The prepreg roll described in the above item (2-vii), which is formed from the prepreg described in any one of the above items (2-i) to (2-v).

In general, tackiness of the prepreg is evaluated and measured by an inclined ball tack method (for example, JIS Z 0237), a rolling ball tack method, a probe tack method (for example, ASTM D2979) or the like, in addition to the sensory test based on the sense of touch. Among them, the probe tack method is an excellent method for characterizing the characteristic of the prepreg surface since the method is capable of digitize the tackiness of a particular surface of a prepreg. Measurement of the tack value of the prepreg according to the second embodiment is carried out by a measurement method that brings the same results as those of the probe tack method based on ASTM D2979. Regarding a tack measuring apparatus employing the probe tack method, a probe tack tester (manufactured by Tester Sangyo Co., Ltd., product name: TE-6001), a tack tester (manufactured by UBM plc, product name: TA-500), and the like are commercially available.

The tack value of the prepreg according to the second embodiment is the peeling resistance force per contact area between a probe and a prepreg measured by a probe tack method under the measurement conditions described below. The probe used for the measurement of the tack value is a pillar-like product having a predetermined diameter, with one of the ends being made of stainless steel product, and the end face serves as a detection surface that is smooth and perpendicular to the axis of the pillar. In a predetermined measurement environment, the prepreg is maintained such that the surface of the prepreg is parallel to the detection surface of the probe, the probe is caused to move forward at a predetermined rate to the prepreg side in the axial direction of the probe pillar, and the detection surface is adhered closely to the prepreg. A load is applied on the prepreg side in the axial direction of the probe pillar, and a predetermined pressing pressure is applied over a predetermined pressing time. Immediately thereafter, the probe is retreated from the prepreg at a predetermined rate, and is detached from the prepreg surface. During this series of operations, the value of the maximum force required to detach the prepreg and the probe per area of the detection surface of the probe is designated as the tack value.

The diameter of the detection surface of the probe used for the measurement of the tack value is 8 mm or 20 mm. The measurement environment is set to 25±3° C. and a humidity of 50±10% RH. The speed of movement of the probe employed was 0.2 mm/s for both advance and retreat; however, a speed of 0.02 mm/s to 2 mm/s does not largely affect the measurement results of the tack value. For the pressing time for closely adhering the prepreg and the detection surface of the probe, 30 seconds was employed; however, a pressing time of 15 seconds to 60 seconds does not largely affect the measurement results of the tack value. The pressing pressure to the prepreg that closely adheres the prepreg and the detection surface of the probe largely affects the measurement value of the tack value, and therefore, it is necessary to control the pressing pressure to the range of about 10 kPa to 500 kPa, and preferably to about ±1 kPa. The tack values of the prepreg of the second embodiment are values measured in the case where the pressing pressure to the prepreg is 40 kPa, and in the case where the pressing pressure to the prepreg is 80 kPa.

When the tack value of the prepreg is an appropriate value, in the operation of laminating the prepreg, the adhesion to a mold and the adhesion between prepregs can be made stronger by strongly pressing the prepreg against a molding mold or against another prepreg. Only by lightly pressing a prepreg against a molding mold or another prepreg, the prepreg can be easily provisionally fixed, and the prepreg in a provisionally fixed state can also be easily replaced.

Specifically, when the tack value measured at a pressing pressure to the prepreg of 80 kPa is 150 kPa or more, the adhesion of the prepreg to a molding mold and the adhesion between prepregs can be made stronger by pressing the prepreg against a molding mold or another prepreg. There are no particular limitations on the upper limit of the tack value measured at a pressing pressure of 80 kPa, and a higher tack value is more preferable.

When the tack value measured at a pressing pressure of 40 kPa is 70 kPa or less, the prepreg can be easily provisionally fixed to a molding mold or another prepreg only by lightly pressing, and the prepreg in a provisionally fixed state can be easily replaced. There are no particular limitations on the lower limit of the tack value measured at a pressing pressure of 40 kPa, but when the tack value is 1 kPa or more, the prepreg can be easily fixed provisionally only by lightly pressing the prepreg against a molding mold or another prepreg. That is, the tack value measured at a pressing pressure of 40 kPa is preferably from 1 kPa to 70 kPa.

Meanwhile, from the viewpoint of satisfactorily performing provisional fixation and replacement, the tack value measured at a pressing pressure of 40 kPa is more preferably from 20 kPa to 70 kPa.

(Reinforcing Fiber Sheet)

For the reinforcing fibers that constitute the reinforcing fiber sheet of the second embodiment, various reinforcing fibers can be used according to the use purpose of the fiber-reinforced composite material, and specific examples thereof include carbon fiber, graphite fiber, aramid fiber, silicon carbide fiber, alumina fiber, boron fiber, tungsten carbide fiber, and glass fiber. These may be used singly, or two or more kinds thereof may be used in combination. Among these, carbon fiber or graphite fiber is suitable from the viewpoint of having excellent specific strength and specific elastic modulus.

Regarding the carbon fiber or graphite fiber that can be used in the second embodiment, all kinds of carbon fibers and graphite fibers can be used in accordance with the use. However, a high strength carbon fiber having a tensile elongation of 1.5% or more but less than 3.0% is suitable for manifesting the strength of the fiber-reinforced composite material.

Examples of the form of the reinforcing fiber sheet used in the second embodiment include the same forms as those described in the section of (Reinforcing fiber sheet) according to the first embodiment. Preferred examples are also as described below.

(Matrix Resin Composition)

The matrix resin composition of the second embodiment includes component (A): an epoxy resin, component (B): a radical polymerizable unsaturated compound, component (C): an epoxy resin curing agent, component (D): a polymerization initiator that generates a radical, and component (E): a polymer formed by radical polymerization of the component (B).

The components (A) to (E) are the same as those described in the section of (Matrix resin composition) according to the first embodiment, and preferred examples are also the same. Also, the optional components that can be incorporated into the matrix resin composition of the second embodiment are the same as those used in the matrix resin composition of the first embodiment described above.

Meanwhile, it is preferable that the matrix resin composition includes a compound having a (meth)acrylate group as the component (B), and a radical polymerization initiator that generates a radical by ultraviolet radiation as the component (D).

(Viscosity of Resin Composition for Impregnation)

The viscosity of the resin composition for impregnation according to the second embodiment is the same as the viscosity of the resin composition for impregnation according to the first embodiment, and the preferred viscosity range and the reasons are also the same.

(Preparation of Resin Composition for Impregnation)

The resin composition for impregnation according to the second embodiment can be prepared by the same method as that used for the resin composition for impregnation according to the first embodiment.

(Method for Producing Prepreg)

The prepreg related to the second embodiment can be produced by the same method as that used for the prepreg related to the first embodiment. That is, when a prepreg precursor is produced by impregnating a reinforcing fiber sheet with a matrix resin composition, and irradiating the prepreg precursor with an energy wave, a portion of the component (B) existing at the prepreg precursor surface is subjected to radical polymerization, and thus a prepreg is produced. Specific exemplary embodiments such as the conditions for energy wave irradiation are as described in the first embodiment.

Particularly, it is preferable for the prepreg of the second embodiment to use ultraviolet radiation or visible light as the energy wave.

Specifically, the method is a method for producing a prepreg, the method including producing a prepreg precursor sheet by impregnating a reinforcing fiber sheet with a resin composition for impregnation containing component (A): an epoxy resin, component (B): a radical polymerizable unsaturated compound, component (C): an epoxy resin curing agent, and component (D1): a photopolymerization initiator that generates a radical when irradiated with ultraviolet radiation or visible light; and irradiating a portion of the surface of at least one of the prepreg precursor sheets with ultraviolet radiation or visible light.

In a case in which a prepreg is produced by irradiation with ultraviolet radiation or visible light, a photopolymerization initiator that causes a reaction such as cleavage, hydrogen abstraction or electron transfer when irradiated with ultraviolet radiation or visible light, that is, component (D1): a photopolymerization initiator that causes a radical when irradiated with ultraviolet radiation or visible light, is used as the radical polymerization initiator (D). When the prepreg precursor is irradiated with ultraviolet radiation or visible light using the component (D1), it is preferable because production of a prepreg in which the component (E) is localized at the prepreg surface can be easily realized.

When the component (E) is localized at the prepreg surface layer portion, the viscosity of the matrix resin composition of the surface layer portion is high, and the viscosity of the matrix resin composition in the interior is lowered. Therefore, it is preferable that the tack of the prepreg surface can be controlled while the drape properties of the prepreg are maintained.

The amount of irradiation of ultraviolet radiation or visible light may be appropriately set such that the tack value of the prepreg measured at a pressing pressure to the prepreg of 40 kPa is 70 kPa or less, and the tack value of the prepreg measured at a pressing pressure to the prepreg of 80 kPa is 150 kPa or more. The amount of irradiation of ultraviolet radiation or visible light is preferably 300 to 700 $mJ/cm^2$.

(Prepreg Roll)

The prepreg roll related to the second embodiment is a prepreg roll in which a continuous prepreg is wound plural turns into a roll shape, and a prepreg in which the prepreg and the prepreg that constitute adjacent layers in the prepreg roll are in contact with each other.

There are no particular limitations on the form of the prepreg roll, but for example, a prepreg roll in which a prepreg having a prepreg width of 0.1 m to 2 m and a prepreg length of about 5 m to 200 m is wound around a core having a diameter of 20 cm to 100 cm into a roll shape, may be used.

Since the prepreg roll of the second embodiment does not have any separating film or release paper disposed on the prepreg surface, no work time or work labor is needed to remove these. Also, since these separating film and release paper are absent, waste materials thereof are not produced.

The prepreg roll of the second embodiment is easily obtained by winding a continuous prepreg around a cylindrical or pillar-like core material. Regarding the core material, a paper tube, a plastic tube, a plastic pillar, a metal tube, a metal pillar or the like can be used. Since a lightweight core material is preferred, a cylinder is preferred. Among them, a paper tube is particularly preferred from the viewpoint of being available at low cost.

For the prepreg roll of the second embodiment, the prepreg related to the second embodiment as described above is suitably used.

Since the prepreg related to the second embodiment described above has a surface that exhibits adequate tackiness, the prepreg can be stored and transported by having only the prepreg wound into a roll form, without laminating a separating film, a release paper, a protective film or the like thereon. Also, since the prepregs that are in contact with each other in the roll are not excessively strongly adhering to each other, the prepreg can be used by winding off from the roll-shaped prepreg. Thus, the time or labor required for the operation of prepreg lamination at the time of molding can be reduced, and reduction of waste material in the process for producing a fiber-reinforced composite material is enabled.

(3) Third Embodiment

The third embodiment relates to a prepreg containing reinforcing fibers and a matrix resin composition, the prepreg being in a sheet form or a tape form, in which a protective film is laminated on at least one surface of the prepreg, and the index of tackiness obtained in an evaluation of tackiness of the prepreg is 50 g or more.

(Evaluation of Tackiness)

A polyethylene film having a thickness of 25 μm, a width of 50 mm, and a length of 250 mm, and a prepreg having a width of 50 mm or more and a length of 50 mm or more are superimposed only under the weight of the polyethylene film itself, such that one edge of the prepreg is perpendicular to the longitudinal direction of the polyethylene film, and the prepreg and the polyethylene film are brought into contact over an area having a width of 50 mm and a length of 50 mm. A weight is loaded such that a load is uniformly applied to the area of superimposition, the prepreg and the film are maintained for 60 seconds, and then the weight is removed.

Subsequently, among the sides having a length of 50 mm of the polyethylene film, the sides that are not in contact with the prepreg are clamped, and this polyethylene film is moved in the direction to be peeled off, to the extent that peeling force is not exerted over the area of superimposition of the polyethylene film and the prepreg.

Within 3 seconds thereafter, the prepreg laminated with the polyethylene film is gently vertically lifted and maintained.

Within 10 seconds after initiating the maintenance in a vertical position, it is determined whether the polyethylene film is completely peeled off from the prepreg.

The test is carried out using 9 kinds of weights such as 5 g, 7 g, 15 g, 30 g, 60 g, 150 g, 300 g, 600 g and 1200 g, and the weight of the lightest weight that does not cause peel-off of the polyethylene film within 10 seconds is designated as the baseline value of the index of tackiness. Furthermore, even in a case in which determination is made using a weight of 1200 g, when the polyethylene film is detached within 10 seconds, 1200 g is designated as the baseline value of the index of tackiness.

This is repeated three times, and the arithmetic mean of the baseline values of the index of tackiness thus obtained is designated as the index of tackiness.

In order to prevent bending of the prepreg, a stainless steel plate having a thickness of 1 mm, a length of 35 cm and a width of 20 cm is laminated on the surface of the prepreg that is opposite to the polyethylene film-laminated surface. Regarding the polyethylene film, a POLYLON FILM LD (product name) of Hiroseki Kako Co., Ltd. is used. Meanwhile, the environment of the present evaluation is set to an air temperature of 23±3° C. and a humidity of 50±10% RH.

Also, the third embodiment can be expressed as follows.

(3-i) A prepreg in a sheet form or a tape form, containing reinforcing fibers and a matrix resin including an epoxy resin and a (meth)acrylate resin, the prepreg having relatively low tackiness such that the index of tackiness obtained in an evaluation of tackiness is 50 g or more, and having a film attached on at least one surface.

(3-ii) A method for producing a prepreg, the method including a step of placing a protective film on a prepreg precursor in a sheet form or a tape form, which contains reinforcing fibers and a matrix resin including an epoxy resin and a (meth)acrylate resin, in which the matrix resin is caused to react by irradiating a portion of the single surface of the prepreg precursor on which at least a protective film is placed, with one kind or plural kinds of energy waves selected from ultraviolet radiation, infrared radiation, visible light, and electron beam.

(3-iii) The production method described in the above item (3-ii), in which the method for producing a prepreg includes a step of impregnating reinforcing fibers with a matrix resin.

The protective film-attached prepreg related to the third embodiment is such that although the prepreg surface having the protective film detached therefrom has low tackiness, the protective film placed during the production process is maintained in a state of being satisfactorily closely adhered to the prepreg surface, and since the protective film is not easily detached, foreign materials do not attach to the prepreg surface, while deterioration of the properties and the external appearance quality of the fiber-reinforced composite material can be avoided. Furthermore, when the prepreg is cut to a desired shape, since the protective film is not easily detached, excellent handleability is obtained.

(Matrix Resin Composition)

The matrix resin composition used in the protective film-attached prepreg of the third embodiment contains component (A): an epoxy resin, component (B): a radical polymerizable unsaturated compound, component (C): an epoxy resin curing agent, component (D): a radical polymerization initiator, and component (E): a polymer formed by radical polymerization of the component (B).

The components (A) to (E) are the same as those described in the section of (Matrix resin composition) according to the first invention, and preferred examples are also the same. Furthermore, the optional components that can be incorporated into the matrix resin composition of the third invention are also the same as those for the matrix resin composition of the first invention.

Meanwhile, it is preferable that the matrix resin composition include a compound having a (meth)acrylate group as the component (B), and includes a radical polymerization initiator that generates a radical by ultraviolet radiation as the component (D).

(Reinforcing Fibers)

Examples of the reinforcing fibers used in the prepreg of the third embodiment include the same reinforcing fibers as those described in the section of (Reinforcing fiber substrate) of the first embodiment. Preferred examples of the material also include the same. It is preferable that the reinforcing fibers constitute a reinforcing fiber substrate as in the case of the first embodiment.

(Viscosity of Resin Composition for Impregnation)

The viscosity of the resin composition for impregnation according to the third embodiment is the same as the viscosity of the resin composition for impregnation according to the first embodiment, and the preferred viscosity range and the reasons are also the same.

(Preparation of Resin Composition for Impregnation)

The resin composition for impregnation according to the third embodiment can be prepared by the same method as that for the resin composition for impregnation according to the first embodiment.

(Protective Film)

There are no particular limitations on the material of the protective film used in the third embodiment. Any protective film which allows the energy radiation (having the same definition as the "energy wave" according to the first embodiment) to penetrate into the protective film and causes the radical polymerization initiator (D) in the matrix resin to generate a radical, may be used.

Specific examples of such a material include low density polyethylene (LDPE), high density polyethylene (HDPE), polypropylene (PP), polyethylene terephthalate (PET), an ionomer, polyvinyl chloride, polyvinylidene chloride, polyvinyl alcohol, polycarbonate, polystyrene, polyacrylonitrile, an ethylene-vinyl acetate copolymer, an ethylene-vinyl alcohol copolymer, an ethylene-methacrylic acid copolymer, various polyamides, and cellophane.

The material of the protective film is selected from a combination of the penetrability of the energy radiation used, and the radical polymerization initiator (D) that generates a radical when stimulated by the energy radiation.

For example, when ultraviolet radiation is used as the energy radiation, the main wavelength 365 nm of ultraviolet radiation that is emitted from a mercury lamp as the light source has sufficient penetrability to a polyethylene film or a polypropylene film, both of which do not have a π-electron conjugated system in the structure. Also, for ultraviolet radiation having a spectrum extending widely from 200 nm to 450 nm, such as the ultraviolet radiation emitted from a metal halide lamp as the light source, even a film having a π-electron conjugated system such as a polyethylene terephthalate film, has sufficient ultraviolet transmitting properties for the radical polymerization initiator to initiate a reaction.

Among them, a film made of LDPE or a film made of PP is suitably used as the protective film.

There are no particular limitations on the thickness of the protective film; however, when the protective function of the protective film and the ease of handling of the film are considered, a thickness of 20 μm or more is suitably used, and a thickness of 25 μm or more is more preferred. When the protective film thickness is excessive, the protective function may be excellent but the product weight of the protective film-attached prepreg is excessively increased, causing a waste of resources, and also the transmittance of the energy radiation is decreased. Therefore, a thickness of 100 μm or less is suitably used, and a thickness of 75 μm or less is more preferred.

(Method for Producing Prepreg)

The method for producing a prepreg related to the third embodiment includes a resin composition for impregnation preparation step, an impregnation step, a film placement step, and an energy ray irradiation step.

<Resin Composition for Impregnation Preparation Step>

A resin composition for impregnation can be prepared by the method described in the section (Preparation of resin composition for impregnation) of the first embodiment.

<Impregnation Step>

The impregnation step can be produced by impregnating a reinforcing fiber substrate with a resin composition for impregnation by means of a technique such as applying a predetermined amount of the resin composition for impregnation on the surface of a process peelable material such as a process peelable paper or a separating film, supplying a reinforcing fiber substrate on that surface, and then passing the assembly between pressing rolls; or by impregnating a reinforcing fiber substrate with a resin composition for impregnation by means of a technique such as applying a predetermined amount of a resin composition for impregnation directly on a reinforcing fiber substrate, subsequently sandwiching the reinforcing fiber substrate between process peelable materials as necessary, and then passing the assembly between pressing rolls.

<Protective Film Lamination Step>

The protective film placement step is a step of placing a protective film in a closely adhesive manner on the prepreg precursor obtained by the resin preparation step and the impregnation step described above, and laminating the prepreg precursor and the protective film by pressing the assembly.

Regarding the placement operation, general methods that have been traditionally used can be employed as long as air is not entrapped between the prepreg precursor and the protective film. For example, methods such as pressing with rolls made of metal, or rolls treated by rubber winding on the surface can be used.

The protective film may be placed and pressed on both surfaces of the prepreg precursor, or may be placed and pressed on one surface only.

Furthermore, in the third embodiment, the present step may be omitted by using a protective film as the separating film in the impregnation step.

<Energy Ray Irradiation Step>

The energy ray irradiation step is a step of obtaining a prepreg in which the radical polymerizable unsaturated compound (B) is polymerized only at the surface layer portion of the prepreg precursor without polymerizing the component (B) present in the core of the prepreg precursor, by irradiating a portion of the prepreg precursor laminated with a protective film, which has been obtained by the various steps described above, with energy radiation through the protective film, and generating a radical from the radical polymerization initiator (D) present at the surface layer portion of the surface of the prepreg precursor laminated with the protective film.

Here, the core of the prepreg precursor refers to the portion deeper than 40% of the thickness of the prepreg precursor from the surface laminated with the protective film, relative to 100% of the thickness of the prepreg precursor. Furthermore, the surface layer portion of the prepreg precursor refers to the space filled by the resin composition for impregnation, extending from an arbitrary point at the surface of the prepreg precursor in contact with the protective film, to the surface of the reinforcing fibers that is reached for the first time along the thickness direction of the prepreg precursor.

Since the reaction ratios of the radical polymerizable unsaturated compound at the surface layer portion of the prepreg and the prepreg core after the energy ray irradiation are determined as a result of comprehensive action of the irradiation dose of energy radiation, the energy ray transmitting properties of the protective film, reactivity of the radical polymerization initiator to energy radiation, reactivity of the radical polymerizable unsaturated compound, the coefficient of energy ray absorption of the prepreg precursor and the like, the conditions for the irradiation of energy radiation are appropriately determined in consideration of these factors.

Absorption of the energy radiation follows the Lambert-Beer Law. That is, when the intensity of energy radiation before incidence is designated as $I_0$; the intensity of energy radiation that has penetrated through a sample having a thickness d is designated as I; and the coefficient of absorption is designated as $\alpha$, the following relationship is established.

$$\mathrm{Log}(I_0/I) = \alpha \cdot d$$

Therefore, in regard to this relationship, when energy radiation is irradiated under the conditions in which I at a particular depth, that is, at a depth of 40% of the thickness of the prepreg precursor from the surface in contact with the protective film relative to 100% of the thickness of the prepreg precursor, is substantially zero, that is, under the conditions in which the polymerization reaction of the radical polymerizable unsaturated compound (B) is substantially not initiated, a prepreg containing the component (E): a polymer formed by radical polymerization of the component (B) in the matrix resin composition, only at the surface layer portion of the prepreg precursor can be obtained without polymerizing the radical polymerizable unsaturated compound (B) that is present at the core of the prepreg precursor.

In the method for producing the protective film-attached prepreg of the third embodiment, at least one energy radiation selected from the group consisting of ultraviolet radiation, infrared radiation, visible light, and electron beam can be used as the energy radiation.

Meanwhile, since carbon fibers and graphite fibers do not transmit ultraviolet radiation, infrared radiation and visible light, when these light rays are used for a prepreg precursor containing carbon fibers or graphite fibers as the reinforcing fibers, the conditions of polymerizing the radical polymerizable unsaturated compound (B) only at the surface layer portion of the prepreg precursor are easily realized, which is preferable.

However, since the visible light is needed for the work and monitoring of the prepreg production step, technical difficulties are faced in order to strictly control the irradiation dose by irradiating visible light only in a desired stage. Furthermore, since a radical polymerization initiator (D) that reacts under infrared radiation also reacts under the effect of temperature, in order to control the radical polymerization reaction in the depth direction of the prepreg precursor, it is necessary to remove heat at the time of infrared irradiation. Therefore, ultraviolet radiation is most suitably used in the third embodiment.

(4) Fourth Embodiment

The fourth embodiment resides in a method for producing a prepreg, the method including the following steps (1) to (4), and reutilization of a light transmitting film collected from the step (4):

(1) a step of mixing component (A): an epoxy resin, component (B): a radical polymerizable unsaturated compound, component (C): an epoxy resin curing agent, and component (D): a radical polymerization initiator, and preparing a resin composition for impregnation;

(2) a step of producing a first laminated body having a light transmitting film laminated on at least one surface of a prepreg precursor, the step including an impregnation operation of producing a prepreg precursor by impregnating a reinforcing fiber substrate in a sheet form or a tape form with the resin composition for impregnation, and an operation of laminating a light transmitting film on at least one surface of the reinforcing fiber substrate before the impregnation operation, or an operation of laminating a light transmitting film on at least one surface film of the prepreg precursor obtained after the impregnation operation;

(3) a step of irradiating at least one side of the surfaces laminated with a light transmitting film of the first laminated body, with at least one energy radiation selected from the group consisting of ultraviolet radiation, infrared radiation, visible light and electron beam, causing the component (B) to react, and thereby producing a prepreg, meanwhile, the prepreg being obtained as a second laminated body formed by laminating a light transmitting film on at least one of the surfaces of the prepreg; and (4) a step of collecting, by detaching, at least one of the light transmitting films of the surfaces irradiated with energy radiation in the step (3), from the second laminated body.

Meanwhile, it is preferable to reutilize the film collected in the step (4) as the light transmitting film for the step (2).

The light transmitting film according to the fourth embodiment corresponds to a separating film having light transmitting properties. Furthermore, the light transmitting film may also accomplish the role of protecting the prepreg thus obtained (that is, the same role as that of the protective film according to the third embodiment), by leaving the light transmitting film laminated, without detaching, after using the light transmitting film as a separating film during the production of the prepreg precursor and the prepreg.

In the step (4) according to the method for producing a prepreg of the fourth embodiment, even if a low viscosity matrix resin composition is used, the light transmitting film can be easily detached from the prepreg, and the external appearance quality of the prepreg or the uniform surface layer resin that imparts stable tackiness to the prepreg is not partially taken away. Therefore, a prepreg having satisfactory external appearance and handleability can be provided.

The light transmitting film collected in the step (4) has satisfactory recyclability because attachment of the prepreg surface layer and the matrix resin composition that is bled out (exudes) from the two edges of the prepreg is suppressed.

Hereinafter, the fourth embodiment is explained in detail.

[Step (1)]

Step (1) according to the method for producing a prepreg of the fourth embodiment is as follows:

(1) a step of mixing component (A): an epoxy resin, component (B): a radical polymerizable unsaturated compound, component (C): an epoxy resin curing agent, and component (D): a radical polymerization initiator, and preparing a resin composition for impregnation.

(Resin Composition for Impregnation)

The resin composition for impregnation according to the fourth embodiment includes component (A): an epoxy resin, component (B): a radical polymerizable unsaturated compound, component (C): an epoxy resin curing agent, and component (D): a radical polymerization initiator.

The components (A) to (D) are the same as those described in the section (Resin composition for impregnation) according to the first embodiment, and preferred materials are also the same. Furthermore, the optional components that can be incorporated into the resin composition for impregnation of the fourth embodiment are also the same as those for the resin composition for impregnation of the first embodiment.

(Viscosity of Resin Composition for Impregnation)

The viscosity of the resin composition for impregnation according to the fourth embodiment is as described in the section (Viscosity of resin composition for impregnation) of the first embodiment; however, particularly, the method for producing a prepreg related to the fourth embodiment is advantageous in that even in the case of using a low viscosity resin composition for impregnation, the peelable material (light transmitting film) used during the process can be suitably reutilized.

For example, in a case in which a low viscosity resin for impregnation having a viscosity at 30° C. of 12 Pa·s to 1500 Pa·s, and particularly 12 Pa·s to 1000 Pa·s, is used, the light transmitting film can be easily detached from the prepreg in the step (4) described below, and the external appearance quality of the prepreg or the uniform surface layer resin that imparts stable tackiness to the prepreg is not partially taken away. Therefore, a prepreg having satisfactory external appearance quality and handleability can be provided. That is, the effect of the fourth embodiment is more significant.

(Preparation of Resin Composition for Impregnation)

The resin composition for impregnation according to the fourth embodiment can be prepared by the same method as that used for the resin composition for impregnation according to the first embodiment.

[Step (2)]

Step (2) according to the method for producing a prepreg of the fourth embodiment is as follows:

(2) a step of producing a first laminated body having a light transmitting film laminated on at least one surface of a prepreg precursor, the step including an impregnation operation of impregnating a reinforcing fiber substrate in a sheet form or a tape form with the matrix resin composition, and producing a prepreg precursor, and an operation of laminating a light transmitting film on at least one surface of the reinforcing fiber substrate before the impregnation operation, or an operation of laminating a light transmitting film on at least one surface of the prepreg precursor obtained after the impregnation operation.

(Reinforcing Fiber Substrate)

The reinforcing fiber substrate according to the fourth embodiment is a substrate in a sheet form or a tape form, which is composed of a large number of reinforcing fibers. Furthermore, for convenience, a substrate having a relatively large width is called a sheet, while a substrate having a narrow width is called a tape; however, there are no limitations on the size of the reinforcing fiber substrate.

Regarding the reinforcing fiber substrate and the reinforcing fibers constituting this, the same materials as those described in the section (Reinforcing fiber substrate) of the first embodiment may be used. Preferred materials are also the same.

(Light Transmitting Film)

The light transmitting film used in the fourth embodiment is not particularly limited in terms of material as long as the film can transmit ultraviolet radiation; however, a light transmitting film which has mold releasability by having a silicon coating film on at least one surface, has dimensional stability, tensile modulus, tensile strength and heat resistance in an environment with large temperature changes, and is capable of withstanding the passage of the prepreg production step, is preferred. Furthermore, a light transmitting film which has satisfactory smoothness that affects the product quality of the resulting prepreg, and transmits the energy radiation irradiated in the step (3) described below, thereby enabling the radical polymerization initiator (D) in the matrix resin composition to initiate a radical generating reaction, is desirable.

To explain the wavelength of the energy radiation and the light transmitting properties and film penetrability of the energy radiation, for example, the main wavelength 365 nm of ultraviolet radiation emitted from a mercury lamp as a light source, has sufficient penetrability to a polyethylene film or a polypropylene film, both of which do not have a π-electron conjugated system in the structure. Also, for ultraviolet radiation having a spectrum extending widely from 200 nm to 450 nm, such as the ultraviolet radiation emitted from a metal halide lamp as the light source, has sufficient penetrability for the radical polymerization initiator (D) to initiate a reaction, even in a film having π-electron conjugated system, such as a polyethylene terephthalate film.

Known examples of a thermoplastic resin appropriate for the film include polyolefin resins such as medium density polyethylene, high density polyethylene, and polypropylene; polyethylene terephthalate, polyamide, polycarbonate, polyvinylidene chloride, polystyrene, polyvinyl alcohol, and polyimide. Among them, for the light transmitting film that is used as a peelable material during the production of a prepreg precursor, a polyester film or a polypropylene film is suitably used from the viewpoint of tensile strength and heat resistance.

There are no particular limitations on the thickness of the light transmitting film; however, when the strength, process passage reliability and handleability of the film are considered, a thickness of 19 μm or more is suitably used, and a thickness of 25 μm or more is more preferred. On the other hand, if the thickness of the light transmitting film is excessively large, even though the process passage reliability is increased in view of the elastic modulus and strength, the product weight of the prepreg having a process film mounted thereon is increased in vain, thus causing a waste of resources, and the thermal conductivity required when the matrix resin composition is impregnated into the reinforcing fibers, and the penetrability of the light irradiated to the prepreg precursor are also decreased. Therefore, a thickness of 150 μm or less is suitably used, and a thickness of 100 μm or less is more preferred. That is, the thickness of the light transmitting film is preferably from 19 μm to 150 μm, and more preferably from 25 μm to 100 μm.

(Method for Producing First Laminated Body)

The first laminated body is a product obtained by laminating the light transmitting film on at least one surface of the reinforcing fiber substrate that has been impregnated with the resin composition for impregnation, that is, a prepreg precursor.

There are no particular limitations on the operation of impregnating the reinforcing fiber substrate with the resin for impregnation, but for example, the following methods may be used.

(a) A method of forming a layer of the resin composition for impregnation on at least one of mutually facing surfaces of a pair of peelable materials, subsequently sandwiching the reinforcing fiber substrate in a sheet form or a tape form between the pair of peelable materials, pressing the assembly by a technique such as passing the assembly between pressing rolls, and impregnating the reinforcing fiber substrate with the resin composition for impregnation by.

(b) A method of applying the resin composition for impregnation directly on at least one surface of the reinforcing fiber substrate in a sheet form or a tape form, forming a layer of the resin composition for impregnation, subsequently pressing the assembly by a technique such as pressing the assembly between pressing rolls, and impregnating the reinforcing fiber substrate with the resin composition for impregnation.

In the method (a), the light transmitting film or a peelable paper can be used as the peelable material. As the peelable material, known peelable papers (release papers) that are used in the production of a prepreg precursor, such as a high quality paper having a silicon coating film on at least one surface, can be used. Meanwhile, when a light transmitting film is used as the peelable material, it is preferable because a first laminated body can be obtained with fewer operations.

More specific examples of the step (2) of the fourth embodiment are described as step (2-1) to (2-6):

(2-1) a step of using a pair of peelable materials, one of them being a light transmitting film and the other being a light transmitting film or a peelable paper, forming a layer of the resin composition for impregnation on at least one mutually facing surfaces of the pair of peelable materials, subsequently sandwiching a reinforcing fiber substrate in a sheet form or a tape form between the pair of peelable materials, pressing the assembly, thereby impregnating the reinforcing fiber substrate with the resin composition for impregnation to produce a prepreg precursor, and producing a first laminated body having a light transmitting film laminated on at least one surface of the prepreg precursor;

(2-2) a step of forming a layer of the resin composition for impregnation on at least one of mutually facing surfaces of a pair of peelable papers, subsequently sandwiching a reinforcing fiber substrate in a sheet form or a tape form between the pair of peelable papers, pressing the assembly, thereby impregnating the reinforcing fiber substrate with the matrix resin composition to produce a prepreg precursor, detaching the peelable paper from at least one surface of the prepreg precursor, laminating a light transmitting film thereon instead of the peelable paper, and thereby producing a first laminated body;

(2-3) a step of forming a layer of the resin composition for impregnation on at least one of mutually facing surfaces of a pair of reinforcing fiber substrates in a sheet form or a tape form, subsequently closely adhering the reinforcing fiber substrates, sandwiching the adhered pair of reinforcing fiber substrates between a pair of peelable materials, one of them being a light transmitting film and the other being a light transmitting film or a peelable paper, pressing the assembly, thereby impregnating the matrix resin composition into the pair of reinforcing fiber substrates with the matrix resin composition to produce a prepreg precursor, and producing a first laminated body having a light transmitting film laminated on at least one surface of the prepreg precursor;

(2-4) a step of forming a layer of the resin composition for impregnation on at least one of mutually facing surfaces of a pair of reinforcing fiber substrates in a sheet form or a tape form, subsequently closely adhering and pressing the reinforcing fiber substrates, thereby impregnating the pair of reinforcing fiber substrates with the resin composition for impregnation to produce a prepreg precursor, laminating a light transmitting film on at least one surface of the prepreg precursor, and producing a first laminated body;

(2-5) a step of forming a layer of the resin composition for impregnation on at least one surface of a reinforcing fiber substrate in a sheet form or a tape form, subsequently sandwiching the reinforcing fiber substrate between a pair of other reinforcing fiber substrates in a sheet form or a tape form, further sandwiching this between a pair of peelable materials, one of them being a light transmitting film and the other being a light transmitting film or a peelable paper, pressing the assembly, thereby impregnating the three sheets of reinforcing fiber substrates with the resin composition for impregnation to produce a prepreg precursor, and producing a first laminated body having a light transmitting film laminated on at least one surface of the prepreg precursor; and (2-6) a step of forming a layer of the resin composition for impregnation on at least one surface of a reinforcing fiber substrate in a sheet form or a tape form, subsequently sandwiching the reinforcing fiber substrate between a pair of other reinforcing fiber substrates in a sheet form or a tape form, pressing the assembly, thereby impregnating the three sheets of reinforcing fiber substrates with the resin composition for impregnation to produce a prepreg precursor, laminating a light transmitting film on at least one surface of the prepreg precursor, and producing a first laminated body.

From the viewpoint that a very low viscosity resin composition for impregnation can be used as it is difficult to form the resin composition film on the surface of a peelable material, by directly forming a layer of a resin composition for impregnation on a reinforcing fiber substrate, steps (2-3), (2-4), (2-5) and (2-6) are preferred, and step (2-3) is more preferred.

Furthermore, from the viewpoint that inhibition of the adhesiveness between the prepreg precursor and the peelable material, or inhibition of radical polymerization by oxygen can be suppressed by preventing incorporation of air into the interface of a peelable material and a prepreg precursor, steps (2-1), (2-3) and (2-5) are preferred, and step (2-3) is more preferred.

Meanwhile, when the first laminated body is produced by laminating a light transmitting film on both surfaces of the prepreg precursor, the both surfaces of the prepreg precursor can be thickened in the subsequent step (3) (prepreg precursor surface thickening step). The prepregs thus obtained as a result do not fuse with each other, and when this is wound into a prepreg roll, a process peelable material or the like as a separating material is not needed, which is preferable.

In order to obtain such a first laminated body, for example, the first laminated body can be obtained by selecting light transmitting films for both of the pair of peelable materials in the step (2-1), (2-3) or (2-5) of step (2), or by producing the prepreg precursor in the step (2-2), (2-4) or (2-6) and then laminating light transmitting films on both surfaces of the prepreg precursor.

In the step (2) of the fourth embodiment, thickening of the prepreg surface is enabled by energy ray irradiation in the subsequent step (3) by appropriately selecting the material of the light transmitting film used in the laminated body. That is, it is possible to generate a radical from the radical polymerization initiator (D) present in the resin composition for impregnation that is included in the surface layer portion of the prepreg precursor, and to polymerize the radical polymerizable unsaturated compound (B) only at the surface layer portion of the prepreg precursor. Furthermore, the light transmitting film can play the role as a protective film of the prepreg that is obtainable by the production method of the fourth embodiment.

[Step (3)]

Step (3) according to the method for producing a prepreg of the fourth embodiment is as follows:

(3) a step of irradiating at least one side of the surface laminated with a light transmitting film of the first laminated body, with at least one energy radiation selected from ultraviolet radiation, infrared radiation, visible light, and electron beam, causing the component (B) to react, and thereby producing a prepreg.

Meanwhile, the prepreg is obtained as a second laminated body formed by laminating a light transmitting film on at least one surface of the prepreg.

(Energy Radiation)

The energy radiation used in the step (3) is at least one selected from ultraviolet radiation, infrared radiation, visible light, and electron beam. Among these, ultraviolet radiation or visible light is preferred from the viewpoint of thickening the prepreg by causing only the resin composition for impregnation at the surface layer of the prepreg to react, while not allowing any reaction of the resin composition for impregnation in the internal layer (core), and easily obtaining a prepreg having drape properties. From the viewpoint of handleability or reaction control of preventing unintended initiation of reaction, ultraviolet radiation is particularly preferred.

In the case of using ultraviolet radiation, there are no particular limitations on the light source thereof, and examples include lamp light sources such as a xenon lamp, a halogen lamp, a tungsten lamp, a high pressure mercury lamp, an ultrahigh pressure mercury lamp, a metal halide lamp, a medium pressure mercury lamp, a low pressure mercury lamp, a carbon arc, and a fluorescent lamp; and laser light sources such as an argon ion laser, a YAG laser, an excimer laser, a nitrogen laser, a helium cadmium laser, and a semiconductor laser.

Furthermore, as described above, regarding the light transmitting film carried by the first laminated body obtainable in the step (2), it is preferable to select a light transmitting film having high transmittance to the light from the light source used in step (3).

(Surface Thickening)

In the step (3), by irradiating energy radiation to the surface laminated with a light transmitting film of the first laminated body (A), a radical is generated only from the radical polymerization initiator (D) present in the surface layer portion, without polymerizing the radical polymerizable unsaturated compound (B) present in the core of the prepreg precursor, and a prepreg in which the radical polymerizable unsaturated compound (B) is polymerized only at the surface layer portion is obtained. Meanwhile, since the polymerization reaction occurs only at the surface layer portion of the prepreg, it can be consequently said that the surface of the prepreg has been thickened.

Here, the core of a prepreg precursor means a portion deeper than 40% in the thickness direction of the prepreg precursor from the surface laminated with a light transmitting film of the prepreg precursor, relative to 100% of the thickness of the prepreg precursor.

Furthermore, the surface layer portion of the prepreg precursor means the space filled by the resin composition for impregnation, extending from an arbitrary point at the surface laminated with a light transmitting film of the prepreg precursor, to the surface of the reinforcing fibers that is reached for the first time along the thickness direction of the prepreg precursor.

Since the reaction ratios of the radical polymerizable unsaturated compound (B) at the surface layer portion and the core of the prepreg after the energy ray irradiation are determined as a result of comprehensive action of the irradiation dose of energy radiation (irradiated energy), the energy ray transmitting properties of the light transmitting film, reactivity of the radical polymerization initiator (D) to energy radiation, reactivity of the radical polymerizable unsaturated compound (B), the coefficient of energy ray absorption of the prepreg precursor and the like, the conditions for the irradiation of energy radiation are appropriately determined in consideration of these factors.

When the energy radiation is ultraviolet radiation, the coefficient of ultraviolet absorption of the prepreg precursor follows the Lambert-Beer Law. That is, when the intensity of ultraviolet radiation before incidence is designated as $I_0$; the intensity of ultraviolet radiation that has penetrated through a sample having a thickness d is designated as I; and the coefficient of absorption is designated as $\alpha$, the following relationship is established.

$$\mathrm{Log}(I_0/I) = \alpha \cdot d$$

Therefore, in regard to this relationship, when ultraviolet radiation is irradiated under the conditions in which I at a particular depth, that is, at a depth of 40% in the thickness direction of the prepreg precursor from the surface laminated with a light transmitting film of the prepreg precursor, relative to 100% of the thickness of the prepreg precursor, is substantially zero, that is, under the conditions in which the polymerization reaction of the radical polymerizable unsaturated compound is substantially not initiated, a prepreg in which the radical polymerizable unsaturated compound (B) has been polymerized only at the surface layer portion, without polymerizing the radical polymerizable unsaturated compound (B) that is present at the core of the prepreg precursor, can be obtained.

Meanwhile, since carbon fiber and graphite fiber do not transmit ultraviolet radiation, in the case of using ultraviolet radiation as the energy radiation for the step (3), when a reinforcing fiber substrate formed of carbon fiber or graphite fiber is used, the conditions for polymerizing the radical polymerizable unsaturated compound (B) only at the surface layer portion of the prepreg that includes this reinforcing fiber substrate are easily realized, which is preferable.

When the first laminated body used in the step (3) has light transmitting films laminated on both surfaces of the prepreg precursor, the energy radiation is preferably irradiated on both surfaces of the first laminated body. When both surfaces are irradiated, for example, tackiness of the surface of the prepreg, from which the light transmitting film is not detached, is also satisfactorily controlled in the step (4) that is described below. Therefore, handleability is further enhanced when a fiber-reinforced composite material is produced using the prepreg.

In an industrial prepreg production process, when the first laminated body is produced, a light transmitting film that is larger than the prepreg precursor is used in some occasions. In such a first laminated body, there are occasions in which the resin composition for impregnation exudes from the edges of the prepreg precursor and attaches to the light transmitting film.

According to the method for producing a prepreg of the fourth embodiment, in the present step (3), when even the resin composition for impregnation that has exuded and attached to the light transmitting film is irradiated with energy radiation, this can be cured, and in the subsequent step (4), a light transmitting film in a state appropriate for reutilization, which does not have a matrix resin composition attached thereto, can be collected.

[Step (4)]

The step (4) according to the method for producing a prepreg of the fourth embodiment is as follows:

(4) a step of detaching and collecting at least one of the light transmitting films of the surface irradiated with energy radiation in the step (3), from the second laminated body.

For the operation of detaching the light transmitting film, general methods that have been traditionally used can be employed. For example, a method of pressing film detachment guide rolls against the second laminated body and pulling the light transmitting film, while taking off the prepreg from the second laminated body, and continuously detaching the film using a winding apparatus at the same speed as that of the prepreg production line, can be used.

The second laminated body is a product having a light transmitting films laminated on either surface of the prepreg, and when the second laminated body is a product obtained by irradiating energy radiation to both surfaces, it is preferable to detach and collect only a light transmitting film laminated on one surface in the present step (4).

Particularly, when the matrix resin composition has low viscosity, the force by which the composition in the prepreg tethers reinforcing fibers is weak, and the prepreg is prone to be frayed. Furthermore, when the light transmitting film laminated on the other surface is left unpeeled, there is an advantage that the film serves as a support, and the shape retainability of the prepreg is increased.

[Reutilization of Light Transmitting Film]

In the light transmitting film collected in the step (4), attachment of the prepreg surface layer and the matrix resin composition protruded from both edges of the prepreg is suppressed, and the light transmitting film has satisfactory recyclability. The film collected in a satisfactory state as such can be repeatedly reutilized as the light transmitting film for the step (2). Meanwhile, the number of reutilizations may vary depending on the kind and shape of the light transmitting film, fixing stability of the peelable material, and the like; however, from the viewpoint of durability of the light transmitting film, the number of reutilizations is usually about 1 to 4 times.

Specifically, the light transmitting film may be used as the peelable material used in the impregnation operation of the matrix resin to the reinforcing fiber substrate in the steps (2-1), (2-3) and (2-5), or the light transmitting film may be used as the light transmitting film that is laminated on the surface of the prepreg precursor thus obtained, in the steps (2-2), (2-4) and (2-6).

Furthermore, the second laminated body obtained in the step (3) is obtained by having a light transmitting film laminated on both surfaces of the prepreg, and irradiating the two surfaces with energy radiation. Thus, in the subsequent step (4), in the case of detaching and collecting the light transmitting film laminated on only one surface of the second laminated body, the collected light transmitting film may be reutilized as the light transmitting film that is not collected in the step (4), or may be reutilized as the light transmitting film that is detached and collected. Also, as described above, the collected light scattering film may also be reutilized as the light transmitting film that is not peeled off from the prepreg and is not collected in the step (4) (released as a manufactured product while being laminated on a prepreg).

In the present exemplary embodiment, an example of repeatedly reutilizing the light transmitting film collected in the step (4) as the light transmitting film for the step (2) has been explained; however, the present exemplary embodiment is not intended to be limited to this. For example, the light transmitting film thus collected can also be utilized in the production lines of other products.

Another embodiment of the first aspect of the present invention relates to a prepreg containing reinforcing fibers and a matrix resin composition, the prepreg being a prepreg in a sheet form or a tape form, in which the matrix resin composition includes at least:

component (A): a bisphenol A type epoxy resin, component (B): a bisphenol A type diglycidyl ether(meth)acrylic acid adduct, and component (E): a polymer formed by radical polymerization of the component (B), and one surface of the prepreg has plural regions having mutually different reaction ratios of the matrix resin composition.

This prepreg may further include component (C): a resin composition containing an amine type epoxy resin curing agent.

This prepreg may further include component (C): a resin composition containing an aminodiphenylsulfone.

Another embodiment of the first aspect of the present invention relates to a prepreg containing reinforcing fibers and a matrix resin composition, the prepreg being a prepreg in a sheet form or a tape form, in which the matrix resin composition includes at least:

component (A): an isocyanate-modified epoxy resin, component (B): a bisphenol A type diglycidyl ether(meth)acrylic acid adduct, and component (E): a polymer formed by radical polymerization of the component (B), and the prepreg has, on one surface, plural regions having mutually different reaction ratios of the matrix resin composition.

This prepreg may further contain component (C): a resin composition including an amine type epoxy resin curing agent.

This prepreg may further contain component (C): a resin composition including aminodiphenylsulfone.

Another embodiment of the first aspect of the present invention relates to a prepreg containing reinforcing fibers and a matrix resin composition, the prepreg being a prepreg in a sheet form or a tape form, in which the matrix resin composition containing at least:

component (A): a bisphenol A type epoxy resin and an isocyanate-modified epoxy resin, component (B): a bisphenol A type diglycidyl ether(meth)acrylic acid adduct, and component (E): a polymer formed by radical polymerization of the component (B), and the prepreg has, on one surface, plural regions having mutually different reaction ratios of the matrix resin composition.

This prepreg may further contain component (C): a resin composition including an amine type epoxy resin curing agent.

This prepreg may further contain component (C): a resin composition including aminodiphenyl sulfone.

Another embodiment of the first aspect of the present invention relates to a production method including:

producing a prepreg precursor by impregnating a reinforcing fiber substrate containing reinforcing fibers with a resin composition for impregnation containing component (A): a bisphenol A type epoxy resin, component (B): a bisphenol A type diglycidyl ether(meth)acrylic acid adduct, and component (C): an amine type epoxy resin curing agent;

irradiating a portion of at least one surface of the prepreg precursor with at least one energy wave selected from the group consisting of ultraviolet radiation, infrared radiation, visible light and electron beam to cause a portion of the component (B), and thereby producing the component (E): a polymer formed by radical polymerization of the component (B), on the surface of the prepreg precursor.

In the process for producing a prepreg precursor, the resin composition for impregnation may further include a urea derivative.

Another embodiment of the first aspect of the present invention relates to a production method including:

producing a prepreg precursor by impregnating a reinforcing fiber substrate containing reinforcing fibers with a resin composition for impregnation including component (A): an isocyanate-modified epoxy resin, component (B): a bisphenol A type diglycidyl ether (meth)acrylic acid adduct, and component (C): an amine type epoxy resin curing agent;

irradiating a portion of at least one surface of the prepreg precursor with at least one energy wave selected from the group consisting of ultraviolet radiation, infrared radiation, visible light and electron beam to cause a portion of the component (B), and thereby producing the component (E): a polymer formed by radical polymerization of the component (B) at the surface of the prepreg precursor.

In regard to the process for producing the prepreg precursor, the resin composition for impregnation may further include a urea derivative.

Another embodiment of the first aspect of the present invention relates to a production method including:

producing a prepreg precursor by impregnating a reinforcing fiber substrate containing reinforcing fibers with a resin composition for impregnation including component (A): a bisphenol A type epoxy resin and an isocyanate-modified epoxy resin, component (B): a bisphenol A type diglycidyl ether(meth)acrylic acid adduct, and component (C): an amine type epoxy resin curing agent;

irradiating a portion of at least one surface of the prepreg precursor with at least one energy wave selected from the group consisting of ultraviolet radiation, infrared radiation, visible light and electron beam to cause a portion of the component (B), and thereby producing the component (E): a polymer formed by radical polymerization of the component (B) at the surface of the prepreg precursor.

In regard to the process for producing the prepreg precursor, the resin composition for impregnation may further include a urea derivative.

Another embodiment of the second aspect of the present invention relates to a prepreg containing reinforcing fibers and a matrix resin composition, the prepreg being a prepreg in a sheet form or a tape form, in which the matrix resin composition includes at least:

component (A): a bisphenol A type epoxy resin,
component (B): a bisphenol A type diglycidyl ether(meth) acrylic acid adduct),
component (E): a polymer formed by radical polymerization of the component (B),
component (C): a resin composition including an amine type epoxy resin curing agent, and
component (D): α-hydroxyphenone,
the prepreg is in a sheet form or a tape form, and in at least one surface of the prepreg, the tack value measured at a pressing pressure of 40 kPa is 70 kPa or less, while the tack value measured at a pressing pressure of 80 kPa is 150 kPa or more.

Another embodiment according to the second aspect of the present invention relates to a prepreg containing reinforcing fibers and a matrix resin composition, the prepreg being a prepreg in a sheet form or a tape form, in which the matrix resin composition includes at least:

component (A): an isocyanate-modified epoxy resin,
component (B): a bisphenol A diglycidyl ether(meth) acrylic acid adduct,
component (E): a polymer formed by radical polymerization of the component (B),
component (C): a resin composition including an amine type epoxy resin curing agent, and
component (D): α-hydroxyphenone,
the prepreg is in a sheet form or a tape form, and in at least one surface of the prepreg, the tack value measured at a pressing pressure of 40 kPa is 70 kPa or less, while the tack value measured at a pressing pressure of 80 kPa is 150 kPa or more.

Another embodiment of the second aspect of the present invention relates to a prepreg containing reinforcing fibers and a matrix resin composition, the prepreg being a prepreg in a sheet form or a tape form, in which the matrix resin composition includes at least:

component (A): a bisphenol A type epoxy resin and an isocyanate-modified epoxy resin,
component (B): a bisphenol A type diglycidyl ether(meth) acrylic acid adduct,
component (E): a polymer formed by radical polymerization of the component (B),
component (C): a resin composition including an amine type epoxy resin curing agent, and
component (D): α-hydroxyphenone,
the prepreg is in a sheet form or a tape form, and in at least one surface of the prepreg, the tack value measured at a pressing pressure of 40 kPa is 70 kPa or less, while the tack value measured at a pressing pressure of 80 kPa is 150 kPa or more.

Another embodiment of the second aspect of the present invention relates to a method for producing a prepreg, the method including producing a prepreg precursor sheet by impregnating a reinforcing fiber sheet with a resin composition for impregnation including component (A): a bisphenol A type epoxy resin, component (B): a bisphenol A diglycidyl ether(meth)acrylic acid adduct, component (C): an amine type epoxy resin curing agent, and component (D1): α-hydroxyphenone; and irradiating a portion of at least one surface of the prepreg precursor sheet with ultraviolet radiation or visible light.

In regard to the process for producing the prepreg precursor, the resin composition for impregnation may further include a urea derivative.

Another embodiment of the second aspect of the present invention relates to a method for producing a prepreg, the method including producing a prepreg precursor sheet by impregnating a reinforcing fiber sheet with a resin composition for impregnation including component (A): an isocyanate-modified epoxy resin, component (B): a bisphenol A type diglycidyl ether(meth)acrylic acid adduct, component (C): an amine type epoxy resin curing agent, and component (D1): α-hydroxyphenone; and irradiating a portion of at least one surface of the prepreg precursor sheet with ultraviolet radiation or visible light.

In regard to the process for producing the prepreg precursor, the resin composition for impregnation may further include a urea derivative.

Another embodiment according to the second aspect of the present invention relates to a method for producing a prepreg, the method including producing a prepreg precursor sheet by impregnating a reinforcing fiber sheet with a resin composition for impregnation including component (A): a bisphenol A type epoxy resin and an isocyanate-modified epoxy resin, component (B): a bisphenol A type diglycidyl ether(meth)acrylic acid adduct, component (C): an amine type epoxy resin curing agent, and component (D1): α-hydroxyphenone; and irradiating a portion of at least one surface of the prepreg precursor sheet with ultraviolet radiation or visible light.

In regard to the process for producing the prepreg precursor, the resin composition for impregnation may further include a urea derivative.

Another embodiment of the third aspect of the present invention relates to a prepreg containing reinforcing fibers and a matrix resin composition, the prepreg being a prepreg in a sheet form or a tape form, in which the matrix resin composition includes at least:
component (A): a bisphenol A type epoxy resin,
component (B): a bisphenol A type diglycidyl ether(meth) acrylic acid adduct, and
component (E): a polymer formed by radical polymerization of the component (B),
the prepreg is in a sheet form or a tape form,
a protective film is laminated on at least one surface of the prepreg, and
the index of tackiness obtained in an evaluation of tackiness of the prepreg is 50 g or more.

Another embodiment according to the third embodiment of the present invention relates to a prepreg containing reinforcing fibers and a matrix resin composition, the prepreg being a prepreg in a sheet form or a tape form, in which the matrix resin composition includes at least:
component (A): an isocyanate-modified epoxy resin,
component (B): a bisphenol A type diglycidyl ether(meth) acrylic acid adduct, and
component (E): a polymer formed by radical polymerization of the component (B),
the prepreg is in a sheet form or a tape form,
a protective film is laminated on at least one surface of the prepreg, and
the index of tackiness obtained in an evaluation of tackiness of the prepreg is 50 g or more.

Another embodiment of the third aspect of the present invention relates to a prepreg containing reinforcing fibers and a matrix resin composition, the prepreg being a prepreg in a sheet form or a tape form, in which the matrix resin composition includes at least:
component (A): a bisphenol A type epoxy resin and an isocyanate-modified epoxy resin,
component (B): a bisphenol A type diglycidyl ether(meth) acrylic acid adduct, and
component (E): a polymer formed by radical polymerization of the component (B),
the prepreg is in a sheet form or a tape form,
a protective film is laminated on at least one surface of the prepreg, and
the index of tackiness obtained in an evaluation of the tackiness of the prepreg is 50 g or more.

Another embodiment of the third aspect of the present invention relates to a method for producing a prepreg, the method including:
producing a prepreg precursor by impregnating reinforcing fibers in a sheet form or a tape form, with a resin composition including component (A): a bisphenol A type epoxy resin, component (B): a bisphenol A type diglycidyl ether(meth)acrylic acid adduct, and component (C): an amine type epoxy resin curing agent;
laminating a protective film on at least one surface of the prepreg precursor;
irradiating a portion of the surface laminated with the protective film, with at least one energy wave selected from the group consisting of ultraviolet radiation, infrared radiation, visible light and electron beam, and thereby causing a portion of the component (B) to react.

In regard to the process for producing the prepreg precursor sheet, the resin composition for impregnation may further include component (D): α-hydroxyphenone.

In regard to the process for producing the prepreg precursor sheet, the resin composition for impregnation may further include a urea derivative.

Another embodiment according to the third aspect of the present invention relates to a method for producing a prepreg, the method including:
producing a prepreg precursor by impregnating reinforcing fibers in a sheet form or a tape form, with a resin composition including component (A): an isocyanate-modified epoxy resin, component (B): a bisphenol A type diglycidyl ether(meth)acrylic acid adduct, and component (C): an amine type epoxy resin curing agent;
laminating a protective film on at least one surface of the prepreg precursor;
irradiating a portion of the surface laminated with the protective film, with at least one energy wave selected from the group consisting of ultraviolet radiation, infrared radiation, visible light and electron beam, and thereby causing a portion of the component (B) to react.

In regard to the process for producing the prepreg precursor sheet, the resin composition for impregnation may further include component (D): α-hydroxyphenone.

In regard to the process for producing the prepreg precursor sheet, the resin composition for impregnation may further include a urea derivative.

Another embodiment according to the third aspect of the present invention relates to a method for producing a prepreg, the method including:
producing a prepreg precursor by impregnating reinforcing fibers in a sheet form or a tape form, with a resin composition including component (A): a bisphenol A type epoxy resin and an isocyanate-modified epoxy resin, component (B): a bisphenol A diglycidyl ether (meth)acrylic acid adduct, and component (C): an amine type epoxy resin curing agent;
laminating a protective film on at least one surface of the prepreg precursor;
irradiating a portion of the surface laminated with the protective film, with at least one energy wave selected from the group consisting of ultraviolet radiation, infrared radiation, visible light and electron beam, and thereby causing a portion of the component (B) to react.

In regard to the process for producing the prepreg precursor sheet, the resin composition for impregnation may further include component (D): α-hydroxyphenone.

In regard to the process for producing the prepreg precursor sheet, the resin composition for impregnation may further include a urea derivative.

Another embodiment of the fourth aspect of the present invention relates to a method for producing a prepreg, the method including:
- a step of preparing a resin composition for impregnation by mixing component (A): a bisphenol A type epoxy resin, component (B): a bisphenol A type diglycidyl ether(meth)acrylic acid adduct, component (C): an amine type epoxy resin curing agent, and component (D): α-hydroxyphenone;
- a step of producing a first laminated body having a light transmitting film laminated on at least one surface of a prepreg precursor,
- the step including an impregnation operation for impregnating a reinforcing fiber substrate in a sheet form or a tape form with the resin composition for impregnation, and thus producing a prepreg precursor, and including an operation of laminating a light transmitting film on at least one surface of the reinforcing fiber substrate before the impregnation operation, or
- including an operation of laminating the light transmitting film on at least one surface of the prepreg precursor obtained after the impregnation operation;
- a step of irradiating at least one side of the surfaces laminated with the light transmitting film of the first laminated body, with at least one energy radiation selected from the group consisting of ultraviolet radiation, infrared radiation, visible light and electron beam, causing the component (B) to react, and thus producing a second laminated body having at least one surface thereof laminated with the light transmitting film;
- a step of detaching and collecting, from the second laminated body, at least one of the light transmitting films on the surfaces irradiated with energy radiation in the step of producing the second laminated body; and
- a step of reutilizing the light transmitting film collected in the step of collecting the light transmitting film.

In regard to the process for preparing the resin composition for impregnation, the resin composition for impregnation may further include a urea derivative.

Another embodiment of the fourth aspect of the present invention relates to a method for producing a prepreg, the method including:
- a step of preparing a resin composition for impregnation by mixing component (A): an isocyanate-modified epoxy resin, component (B): a bisphenol A type diglycidyl ether(meth)acrylic acid adduct, component (C): an amine type epoxy resin curing agent, and component (D): α-hydroxyphenone;
- a step of producing a first laminated body having a light transmitting film laminated on at least one surface of a prepreg precursor,
- the step including an impregnation operation for impregnating a reinforcing fiber substrate in a sheet form or a tape form with the resin composition for impregnation, and thus producing a prepreg precursor, and including an operation of laminating a light transmitting film on at least one surface of the reinforcing fiber substrate before the impregnation operation, or
- including an operation of laminating the light transmitting film on at least one surface of the prepreg precursor obtained after the impregnation operation;
- a step of irradiating at least one side of the surfaces laminated with the light transmitting film of the first laminated body, with at least one energy radiation selected from the group consisting of ultraviolet radiation, infrared radiation, visible light and electron beam, causing the component (B) to react, and thus producing a second laminated body having at least one surface thereof laminated with the light transmitting film;
- a step of detaching and collecting, from the second laminated body, at least one of the light transmitting films on the surfaces irradiated with energy radiation in the step of producing the second laminated body; and
- a step of reutilizing the light transmitting film collected in the step of collecting the light transmitting film.

In regard to the process for preparing the resin composition for impregnation, the resin composition for impregnation may further include a urea derivative.

Another embodiment of the fourth aspect of the present invention relates to a method for producing a prepreg, the method including:
- a step of preparing a resin composition for impregnation by mixing component (A): a bisphenol A type epoxy resin and an isocyanate-modified epoxy resin, component (B): a bisphenol A type diglycidyl ether(meth)acrylic acid adduct, component (C): an amine type epoxy resin curing agent, and component (D): α-hydroxyphenone;
- a step of producing a first laminated body having a light transmitting film laminated on at least one surface of a prepreg precursor,
- the step including an impregnation operation for impregnating a reinforcing fiber substrate in a sheet form or a tape form with the resin composition for impregnation, and thus producing a prepreg precursor, and including an operation of laminating a light transmitting film on at least one surface of the reinforcing fiber substrate before the impregnation operation, or
- including an operation of laminating the light transmitting film on at least one surface of the prepreg precursor obtained after the impregnation operation;
- a step of irradiating at least one side of the surfaces laminated with the light transmitting film of the first laminated body, with at least one energy radiation selected from the group consisting of ultraviolet radiation, infrared radiation, visible light and electron beam, causing the component (B) to react, and thus producing a second laminated body having at least one surface thereof laminated with the light transmitting film;
- a step of detaching and collecting, from the second laminated body, at least one of the light transmitting films on the surfaces irradiated with energy radiation in the step of producing the second laminated body; and
- a step of reutilizing the light transmitting film collected in the step of collecting the light transmitting film.

In regard to the process for preparing the resin composition for impregnation, the resin composition for impregnation may further include a urea derivative.

EXAMPLES (1) Examples and Comparative Examples Corresponding to First Aspect

Hereinafter, some embodiments of the present invention will be described specifically by way of Examples, but the embodiments of the present invention are not intended to be limited thereto. Furthermore, the raw materials (resins and the like), reinforcing fibers, and various measurement and evaluation methods used in the respective examples are disclosed below.

(Raw Materials)
<Epoxy Resin (A) (Hereinafter, Referred to as "Component (A)")>
A-1: Bisphenol A type liquid epoxy resin (manufactured by Mitsubishi Chemical Corp., product name "jER828")
A-2: Isocyanate-modified epoxy resin (manufactured by Asahi Kasei Epoxy Co., Ltd., product name "AER4152")
<Radical Polymerizable Unsaturated Compound (B) (Hereinafter, Referred to as "Component (B)")>
B-1: Bisphenol A diglycidyl ether acrylic acid adduct (manufactured by Mitsubishi Rayon Co., Ltd., product name "DIABEAM UK6105")
B-2: Novolac type glycidyl ether acrylic acid adduct (manufactured by DIC Corp., product name: "DICLITE UE-8740")
<Epoxy Resin Curing Agent (C)>
Dicyandiamide (manufactured by Mitsubishi Chemical Corp., product name "DICY 15")
<Curing Aid>
DCMU: Diphenyldimethylurea (manufactured by Hodogaya Chemical Co., Ltd., product name "DCMU99")
<Radical Polymerization Initiator (D)>
α-Hydroxyalkylphenone (manufactured by BASF SE, product name "IRGACURE 184")
(Reinforcing Fiber Substrate)
Carbon fiber bundle 1: tensile strength 4.2 GPa, tensile modulus 235 GPa, number of filaments 50,000, basis weight 3.8 g/m (manufactured by Mitsubishi Rayon Co., Ltd.)
(Measurement and Evaluation Methods)
<Measurement of Viscosity Change of Resin Composition for Impregnation Caused by Ultraviolet Irradiation>
The viscosity change of a resin composition for impregnation caused by ultraviolet irradiation was measured under the following measurement conditions.
Measurement apparatus: (manufactured by Reologica Instruments A.B., product name: "VAR-100")
Test mode: High speed oscillation
Measurement temperature: 27° C.
Plate size: 8 mmϕ
Gap: 0.05 mm
Stress: 700 Pa
Frequency: 1.59 Hz
Ultraviolet intensity (λ=365 nm): 50 mW/cm$^2$
Duration of irradiation per round of irradiation: 6 seconds
Interval of irradiation: 120 seconds
<Measurement of Viscosity of Resin Composition for Impregnation>
The viscosity of a resin composition for impregnation was measured under the following measurement conditions.
Apparatus: Rheometer (manufactured by TA Instruments, Inc., product name: "DSR-200")
Plate used: 40ϕ parallel plates
Plate gap: 0.5 mm
Measurement frequency: 10 rad/sec
Rate of temperature increase: 2° C./min
Stress: 3000 dyne/cm$^2$
<Structural Analysis of Resin Distributed in Prepreg Surface>
In order to evaluate the reaction ratios of the matrix resin composition at the surface of the prepregs obtained in Examples, a structural analysis of the resin distributed in a prepreg surface was carried out under the following measurement conditions. Furthermore, the "reaction ratio of the matrix resin composition" means the reaction ratio of the component (B) in the matrix resin composition. Since the viscosity of the matrix resin composition changes locally as the component (B) reacts to become the component (E), the reaction ratio can be checked from the change in tackiness of the prepreg surface.
Apparatus: VARIAN 600 UMA FT-IR Microscope (manufactured by Varian, Inc.)
Crystal used for ATR: Ge
Resolution: 4 cm$^{-1}$
Number of integrations: 128 times
Measurement wavelength range: 4000 cm$^{-1}$ to 700 cm$^{-1}$
Measurement area: 120 μm×70 μm
[Preparation of Master Batch Containing Radical Polymerization Initiator (D) and Epoxy Resin Curing Agent (C)]
A component (B), an epoxy resin curing agent (C), a curing aid, and a radical polymerization initiator (D) were weighed in a container at the composition indicated in Table 1, and the components were mixed with stirring. This was more thoroughly mixed with a three-roll mill. Thus, master batches 1-1 and 1-2 were obtained.

TABLE 1

| Incorporated component (parts by mass) | | Master batch 1-1 | Master batch 1-2 |
|---|---|---|---|
| Component (B) | B-1 | 100 | 0 |
|  | B-2 | 0 | 100 |
| Component (C) | Dicy | 42 | 42 |
| Curing aid | DCMU | 28 | 28 |
| Component (D) | Irgacure 184 | 20 | 20 |

Example 1-1

<Preparation of Resin Composition>

50 Parts by mass of A-1 and 40 parts by mass of A-2 as component (A) were weighed in a melting pot. The melting pot was heated to 130° C., A-1 and A-2 were mixed, and then the mixture of A-1 and A-2 was cooled to about 60° C. Subsequently, 19 parts by mass of the master batch 1-1 previously prepared was added to this melting pot, the content was stirred at 60° C., and thus a resin composition for impregnation 1-11 was obtained.

For the resin composition for impregnation 1-11 thus obtained, the viscosity change caused by ultraviolet irradiation was measured. The viscosity before ultraviolet irradiation at 30° C. was 6×10$^2$ Pa·s, the viscosity obtained when ultraviolet radiation was irradiated one time was 9×10$^3$ Pa·s, and the viscosity obtained when ultraviolet radiation was irradiated two times was 1.5×10$^4$ Pa·s. From these results, it was confirmed that thickening of the resin can be controlled by the duration of irradiation or the number of irradiations of ultraviolet radiation.

<Production of Prepreg Precursor>

A reinforcing fiber sheet impregnated with the resin composition for impregnation 1-11, which was a prepreg precursor, was produced by the following procedure. As the reinforcing fiber substrate, two sheets of carbon fiber bundle sheets obtainable by mixing the carbon fiber bundle 1 were used. The carbon fiber bundle sheets were respectively referred to as reinforcing fiber sheet (I-1) and reinforcing fiber sheet (I-2).

The resin composition for impregnation 1-11 that had been maintained at 60° C. was discharged through a resin coating die, and thereby the resin composition for impregnation 1-11 was continuously attached to one surface of the reinforcing fiber sheet (I-1). Subsequently, the reinforcing fiber sheet (I-2) was superimposed on the surface of the reinforcing fiber sheet (I-1) where the resin composition for impregnation 1-11 was attached, and a protective film was supplied on either of the external surfaces of the reinforcing fiber sheet (I-1) and the reinforcing fiber sheet (I-2) to sandwich the reinforcing fiber sheets.

Subsequently, the reinforcing fiber sheet (I-1) and the reinforcing fiber sheet (I-2) interposed between the protective films were passed between pressing rolls three times, and thus a prepreg precursor having the reinforcing fiber substrate impregnated with the resin composition for impregnation 1-11 was obtained.

For the prepreg precursor thus obtained, the basis weight (FAW) of the reinforcing fiber and the resin percentage content were measured by a solvent method, and the FAW was 600 g/m$^2$, while the resin percentage content was 34% by mass.

<Pattern Formation>

A prepreg having, on one surface, a pattern of plural regions classified into two levels of the reaction ratio of the matrix resin composition was produced by the following method.

Figure 15:
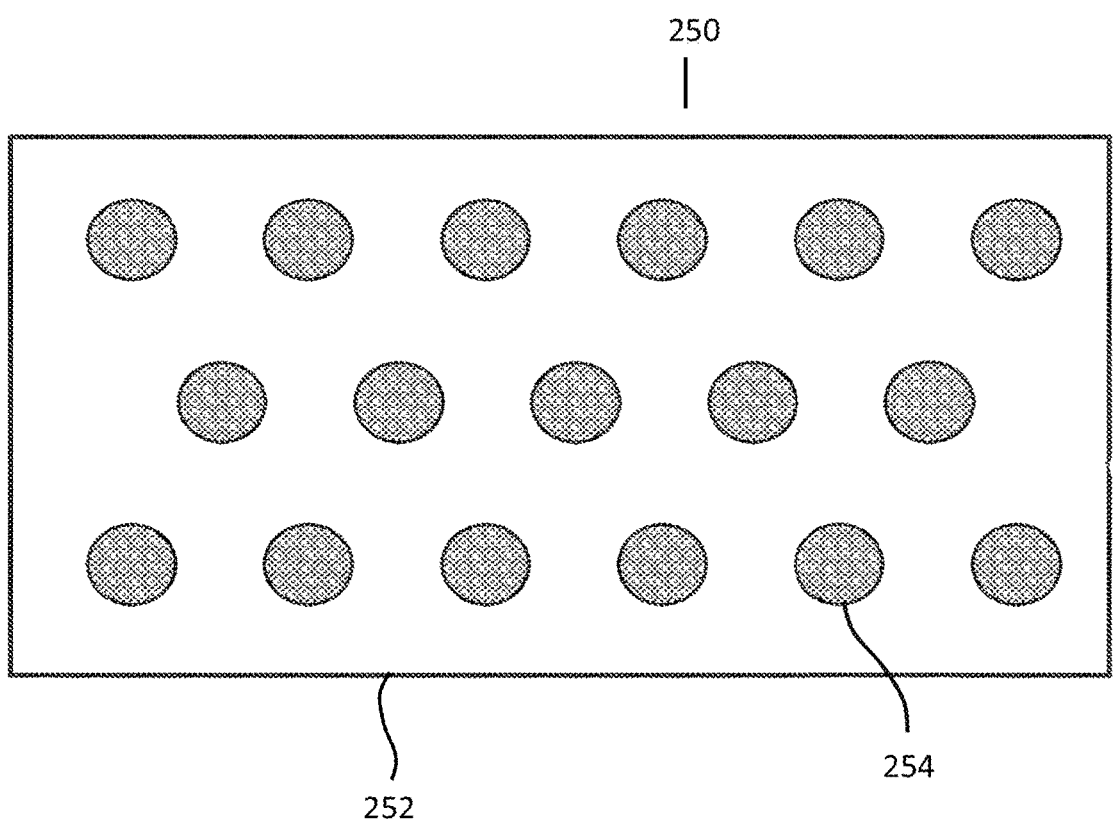

First, a photomask 250 having the shape illustrated in FIG. 15 was provided. The photomask 250 is a product obtained by adhering circular light-shielding sheets 254 each having a diameter of 5 mm to a polyester substrate 252 having a thickness of 100 μm at an interval of 5 mm. The photomask 250 was placed on the surface of the prepreg precursor obtained by the operation described above, ultraviolet radiation was irradiated over the photomask 250 using an ultraviolet irradiation apparatus equipped with a metal halide lamp (manufactured by Eye Graphics Co., Ltd.) at an irradiation dose of 320 mJ/cm$^2$ (the reference illuminometer was "ORCUV-351" of Orc Manufacturing Co., Ltd.), and the photomask was removed.

In this manner, a prepreg 1-12 having a pattern of a sea-island structure in which circular regions each having a diameter of 5 mm and having a low reaction ratio of the matrix resin formed island regions of the sea-island structure, and the interval between an island region and another island region was 5 mm, was obtained.

<Structure Analysis of Matrix Resin Composition in Various Regions Constituting Pattern>

The resin structures of the island regions of the sea-island structure, which were non-ultraviolet-irradiated portions of the prepreg 1-12, and the sea region of the sea-island structure, which was ultraviolet-irradiated portion, was analyzed by the ATR method described above (that is, the method described in <Structural analysis of resin distributed in prepreg surface>), and it was confirmed that the shape of the carbonyl-derived peak at near 1700 cm$^{-1}$ that was present in an acryloyl group changed significantly. Specifically, in the non-ultraviolet-irradiated portions which constituted the island regions, it was confirmed that the double-hill peak appearing near 1700 cm$^{-1}$ changed to a single-hill peak in the ultraviolet-irradiated portions which constituted the sea region. This change indicates that the carbonyl double bond conjugated with the carbon-carbon double bond in the acryloyl group changed to a non-conjugated double bond, and indicates that to the depth detected by the ATR method from the surface of the sea region, which is the ultraviolet-irradiated portion of the prepreg 1-12, the amount of the carbonyl derived from the "high molecular weight component produced by radical polymerization of the radical polymerizable unsaturated compound (B)" (that is, component (E)) is clearly larger than the amount of the radical polymerizable unsaturated compound (B).

<Analysis of Tackiness of Pattern Surface>

The difference in tackiness between the island regions as the non-ultraviolet-irradiated portions of the prepreg 1-12 and the sea region as the irradiated portion can be checked by the sense of touch at the time of pressing the bottom surface of a cylindrical glass rod (bottom surface area 0.28 cm$^2$ (diameter 3 mm), length 15 mm, weight about 10.6 g), which has a bottom surface having sufficiently high smoothness and having a smaller area than an island region, against the prepreg and detaching the glass rod. The non-ultraviolet-irradiated portions had stronger tackiness, and the ultraviolet-irradiated portion had weaker tackiness.

(2) Examples and Comparative Examples Corresponding to Second Embodiment

The raw materials used (resins and the like), reinforcing fibers, and various measurement and evaluation methods are disclosed below.

(Measurement of Tack Value)

Measurement of the tackiness of a prepreg was carried out under the following conditions.

Apparatus: Tack tester (manufactured by UBM plc, product name "TA-500")
Temperature: 25±3° C.
Humidity: 50±10% RH
Probe diameter: 8 mm or 20 mm (the tack value was measured with a probe diameter of 20 mm, and when the results thus obtained were 93.7 kPa or less, the measured value was employed as the tack value, and when the results thus obtained were more than 93.7 kPa, the results obtained by making measurement with a probe diameter of 8 mm were employed as the tack value)
Pressing pressure to prepreg: 20 kPa, 40 kPa, 60 kPa, 80 kPa, 93 kPa
Pressing time: 30 seconds
Speed of probe movement: 0.2 mm/s (Evaluation of Unwinding Properties of Prepreg Roll)

A prepreg roll thus produced was left to stand in a horizontal position in an environment at a temperature of 23±3° C. and a humidity of 50%±10 RH, and after the passage of a predetermined time period, it was evaluated whether the prepreg could be wound off from the prepreg roll. A prepreg that could be easily wound off without any problem was rated as "○", and a prepreg that could not be wound off was rated as "X".

(Evaluation of Strength of Adhesion of Prepreg)

A prepreg to be evaluated was cut to a size of 300 mm in length (0° direction, direction parallel to the reinforcing fibers)×300 mm in width (90° direction, direction perpendicular to the reinforcing fibers), and the strength of the adhesion to a mold and the adhesion between prepregs was evaluated. The prepreg to be evaluated was pressed strongly by hand against a molding mold or another prepreg, and then it was evaluated whether the pressed prepreg could be moved by hand. A prepreg that could be moved was rated as "0", and a prepreg that could not be moved was rated as "X". A molding mold made of aluminum was used.

(Evaluation of Replaceability)

A prepreg to be evaluated was cut to a size of 300 mm in length (0° direction, direction parallel to the reinforcing fibers)×300 mm in width (90° direction, direction perpendicular to the reinforcing fibers), and two sheets thereof were provided. One sheet was pasted by strongly pressing to a molding mold, and then the other sheet of prepreg was lightly attached thereto. Thereafter, it was evaluated whether the position of the prepreg adhered on top could be corrected (replaced). A prepreg that could be easily replaced was rated as "◯", and a prepreg which could not be replaced was rated as "X". A molding mold made of aluminum was used.

[Resin Composition for Impregnation]

The raw materials used in the resin composition for impregnation were as follows.

(Raw Materials)

<Component (A): Epoxy Resin>

A-1: Bisphenol A type liquid epoxy resin (manufactured by Mitsubishi Chemical Corp., product name "jER828")

A-2: Isocyanate-modified epoxy resin (manufactured by Asahi Kasei Epoxy Co., Ltd., product name: "AER4152")

<Component (B): Radical Polymerizable Unsaturated Compound>

B-1: Bisphenol A diglycidyl ether acrylic acid adduct (manufactured by Mitsubishi Rayon Co., Ltd., product name "DIABEAM UK6105")

<Component (C): Epoxy Resin Curing Agent>

Curing agent: Dicyandiamide (manufactured by Mitsubishi Chemical Corp., product name "DICY 15")

<Curing Aid>

Diphenyldimethylurea (DCMU) (manufactured by Hodogaya Chemical Co., Ltd., product name "DCMU99")

<Component (D): Radical Polymerization Initiator>

D-1: α-Hydroxyalkylphenone (manufactured by BASF SE, "IRGACURE 184")

(Reinforcing Fiber Substrate)

Carbon fiber bundle 1: tensile strength 4.2 GPa, tensile modulus 235 GPa, number of filaments 50,000, basis weight 3.8 g/m (manufactured by Mitsubishi Rayon Co., Ltd.)

<Measurement of Viscosity Change of Resin Composition for Impregnation Caused by Ultraviolet Irradiation>

Measurement was made under the same measurement conditions as those for the <Measurement of viscosity change of resin composition for impregnation caused by ultraviolet irradiation> in the above section [(1) Examples and Comparative Examples corresponding to first embodiment].

<Measurement of Viscosity of Resin Composition for Impregnation>

Measurement was made under the same measurement conditions as those for the <Measurement of viscosity of resin composition for impregnation> in the above section [(1) Examples and Comparative Examples corresponding to first embodiment].

[Preparation of Master Batch Containing Radical Polymerization Initiator and Epoxy Resin Curing Agent]

A component (B), a component (C), a curing aid, and a component (D) were weighed in a container at the composition indicated in Table 2, and the components were mixed with stirring. This was more thoroughly mixed with a three-roll mill. Thus, a master batch 2-1 containing a radical polymerization initiator and an epoxy resin curing agent was obtained.

TABLE 2

| Incorporated component (parts by mass) | | Master batch 2-1 |
|---|---|---|
| Component (B) | B-1 | 100 |
| Component (C) | Dicy | 42 |
| Curing aid | DCMU | 28 |
| Component (D) | Irgacure 184 | 20 |

Example 2-1

<Preparation of Resin Composition for Impregnation>

50 Parts by mass of A-1 and 40 parts by mass of A-2 as component (A) were weighed in a melting pot. The melting pot was heated to 130° C., A-1 and A-2 were mixed, and then the mixture of A-1 and A-2 was cooled to about 60° C. Subsequently, 19 parts by mass of the master batch 2-1 previously prepared was added to this melting pot, the content was stirred at 60° C., and thus a resin composition for impregnation 2-11 was obtained.

The viscosity change caused by ultraviolet irradiation of the resin composition for impregnation 2-11 thus obtained, was measured. The viscosity before ultraviolet irradiation at 30° C. was $6\times10^2$ Pa·s, the viscosity obtained when ultraviolet radiation was irradiated one time was $9\times10^3$ Pa·s, and the viscosity obtained when ultraviolet radiation was irradiated two times was $1.5\times10^4$ Pa·s. From these results, it was confirmed that thickening of the resin can be controlled by the duration of irradiation or the number of irradiations of ultraviolet radiation.

<Production of Prepreg Precursor>

Figure 5:
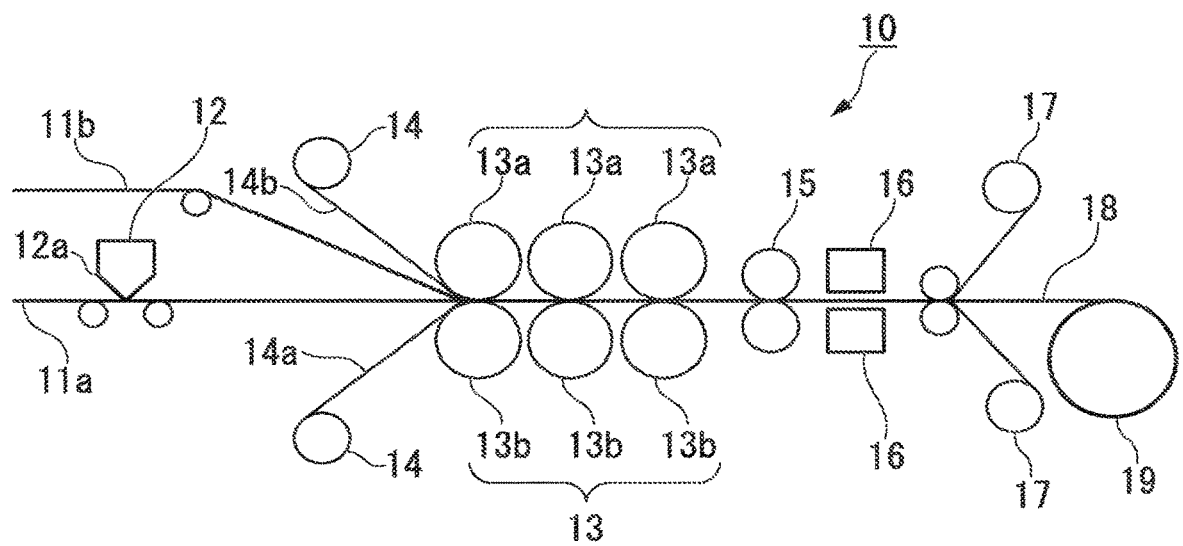
FIG. 5 is a schematic diagram illustrating an example of the method for producing a prepreg related to the second embodiment of the present invention.

A prepreg was produced as described below, using the prepreg production apparatus 10 illustrated in FIG. 5. Two sheets of carbon fiber bundle sheets obtainable by mixing carbon fiber bundles were used as the reinforcing fiber substrate. The carbon fiber bundle sheets are respectively referred to as reinforcing fiber sheet 11a (II-1) and reinforcing fiber sheet 11b (II-2).

The resin composition for impregnation 2-11 that had been maintained at 60° C. was discharged through a resin coating die 12a of an attachment apparatus 12, and thereby the resin composition for impregnation 2-11 was attached to one surface of the reinforcing fiber sheet 11a (II-1). Subsequently, the reinforcing fiber sheet 11b (II-2) was superimposed on the surface of the reinforcing fiber sheet 11a (II-1) where the resin composition for impregnation was attached, and on the two external surfaces of the superimposed reinforcing fiber sheet 11a (II-1) and the reinforcing fiber sheet 11b (II-2), polyethylene terephthalate films (manufactured by Mitsubishi Plastics, Inc., product name "DIAFOIL MRF25") each having a thickness of 25 µm were respectively supplied as separating films (14a, 14b) from a separating film supply roll 14 to sandwich the reinforcing fiber sheets.

Subsequently, the reinforcing fiber sheets (II-1) and (II-2) sandwiched between the separating films (14a, 14b) were pressed from the outside with pressing rolls 13a and 13b in a pressing apparatus 13, and thus the resin composition for impregnation 2-11 attached to the reinforcing fiber sheet (II-1) was impregnated into the reinforcing fiber sheet (II-1) and the reinforcing fiber sheet (II-2). Thus, a prepreg precursor 2-12 containing the resin composition for impregnation 2-11 was obtained. The speed of the production line for the prepreg was set to 5 m/min.

For the prepreg precursor 2-12 of the present invention thus obtained, the basis weight was measured by a solvent method, and the FAW was 596 g/m², while the resin percentage content was 33.7% by mass. The external appearance was visually checked, and it was confirmed that the prepreg precursor was free of fluffs, and was uniformly impregnated with the resin for impregnation.

<Irradiation of Ultraviolet Radiation>

The prepreg precursor 2-12 obtained by the operation described above was irradiated with ultraviolet radiation by the following method, and a prepreg 2-13 was produced.

The prepreg precursor 2-12 was irradiated with ultraviolet radiation through an ultraviolet irradiation apparatus 16 equipped with a metal halide lamp (manufactured by Eye Graphics Co., Ltd.) at an irradiation dose of 320 mJ/cm$^2$ (the reference illuminometer was "ORCUV-351" of Orc Manufacturing Co., Ltd.), the separating films on both surfaces are detached by a separating film winding apparatus 17, and thereby a continuous prepreg 18 (2-13) was obtained. Meanwhile, reference numeral 15 in FIG. 5 represents driving rolls.

<Winding-Up of Prepreg>

Approximately 10 m of the continuous prepreg 2-13 obtained by the operation described above was wound around a paper tube (winding-up means 19) having an external diameter of 310 mm, and thus a prepreg roll 2-14 in which the prepreg 2-13 is wound plural turns into a roll shape and forms a multilayer roll, was obtained. In the prepreg roll 2-14, the adjacent layers formed by the prepreg 2-13 were in contact with each other.

For the prepreg 2-13 thus obtained, measurement of the tack value, evaluation of the unwinding properties, evaluation of the strength of adhesion of the prepreg, and evaluation of replaceability were carried out.

Figure 6:
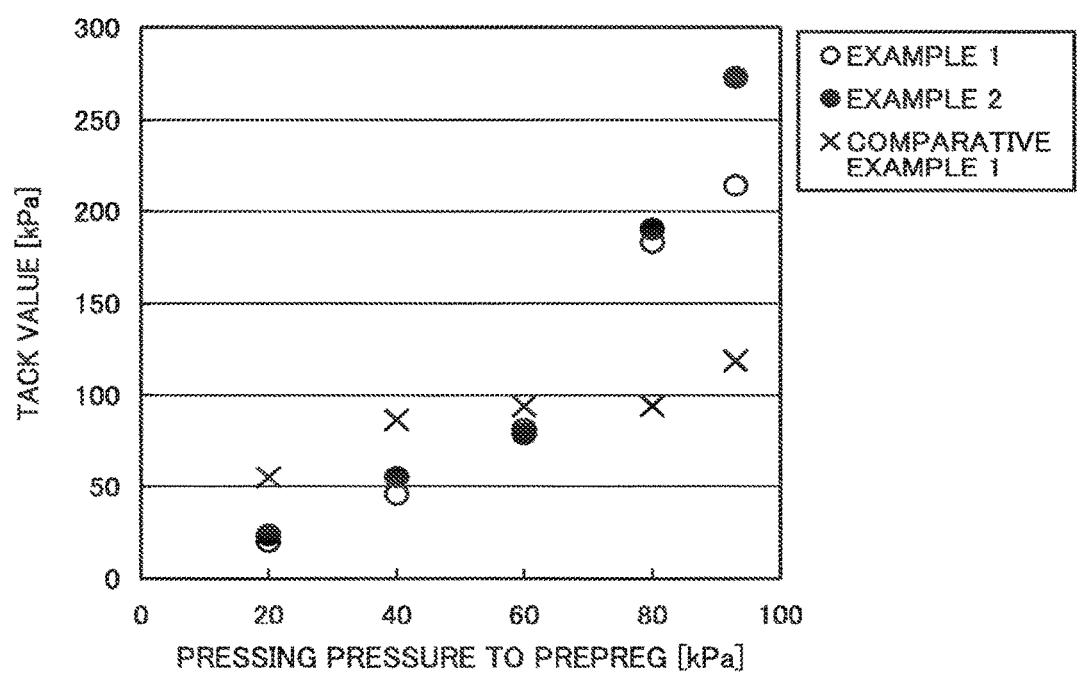
FIG. 6 is a diagram illustrating the relationship between the pressing pressure exerted to a prepreg and the tack value in the Examples and Comparative Examples related to the second embodiment of the present invention.

Since the prepreg 2-13 and the prepreg roll 2-14 thus obtained have neither a release paper nor a separating film disposed thereon, no time and labor was taken for detaching these at the time of laminating the prepreg 2-13. Furthermore, waste materials thereof were not generated. The results are presented in FIG. 6 and Table 3.

Example 2-2

A prepreg 2-23 was produced in the same manner as in Example 2-1. However, in the present Example, ultraviolet radiation was irradiated at an irradiation dose of ultraviolet radiation of 640 mJ/cm$^2$. The prepreg 2-23 thus obtained was processed in the same manner as in Example 2-1, and thus a prepreg roll 2-24 was obtained.

For the prepreg 2-23 thus obtained, measurement of the tack value, evaluation of the unwinding properties, evaluation of the strength of adhesion of the prepreg, and evaluation of replaceability were carried out.

Since the prepreg 2-13 and the prepreg roll 2-14 thus obtained have neither a release paper nor a separating film disposed thereon, no time and labor was taken for detaching these at the time of laminating the prepreg 2-13. Furthermore, waste materials thereof were not generated. The results are presented in FIG. 6 and Table 3.

Comparative Example 2-1

A carbon fiber prepreg (manufactured by Mitsubishi Rayon Co., Ltd., unidirectional carbon fiber prepreg, product name: TR350G175S, FAW 175 g/m$^2$) was cut patternwise to a size of 300 mm in length (0° direction, direction parallel to the carbon fibers)×300 mm in width (90° direction, direction perpendicular to the carbon fibers). An evaluation of the strength of adhesion of the prepreg and an evaluation of replaceability of the patternwise cut TR350G175S were carried out.

In Comparative Example 1, an evaluation was carried out by the following procedure, instead of the evaluation of the unwinding properties of a prepreg roll.

In an environment at a temperature of 23±3° C. and a humidity of 50±10% RH, the separating films of the prepreg that was cut patternwise as described above was peeled off, and an adhesive tape made of polyethylene terephthalate (manufactured by Sony Chemicals Corp., product name T4082S) and measuring 50 mm×300 mm was attached along the entire length of one edge that was perpendicular to the carbon fibers. Two sheets thereof were provided, and the two sheets were arranged to face each other so as to overlap the parts attached with the adhesive tape, and the two sheets were pressed such that a pressure equivalent to 80 kPa was applied thereto. Immediately thereafter, the adhesive tape sticking parts were opened and grabbed with the right and left hands, and it was evaluated whether the pressed assembly could be detached into two sheets.

Through this evaluation, it was observed in the present Comparative Example that the fibers of the two sheets of prepreg were mutually crosslinked. Thus, the unwinding properties of the prepreg roll were judged as "X", even without producing a prepreg roll.

Since the TR350G175S prepreg and the prepreg roll have a release paper and a separating film disposed thereon, time and labor for detaching these are needed during the operation of laminating the prepreg, and these also generate waste materials. The results are presented in FIG. 6 and Table 3.

TABLE 3

|  |  | Example 2-1 | Example 2-2 | Comparative Example 2-1 |
|---|---|---|---|---|
| Irradiation dose of ultraviolet radiation | | 320 mJ/ cm$^2$ | 640 mJ/ cm$^2$ | — |
| Tack value | Pressing pressure to prepreg of 40 kPa | 46 kPa | 55 kPa | 86 kPa |
| | Pressing pressure to prepreg of 80 kPa | 182 kPa | 190 kPa | 94 kPa |
| Unwinding properties of prepreg roll | Immediately thereafter | ◯ | ◯ | X |
| | After 10 days | ◯ | ◯ | — |
| | After 30 days | ◯ | ◯ | — |
| Strength of prepreg adhesion | | ◯ | ◯ | ◯ |
| Replaceability | | ◯ | ◯ | X |

(3) Examples and Comparative Examples Corresponding to Third Embodiment

The raw materials used (resins and the like), reinforcing fibers, and various measurement and evaluation methods are disclosed below.

(Raw Materials)

<Epoxy Resin (A) (Hereinafter, Referred to as "Component (A)" in Examples)>

A-1: Bisphenol A type liquid epoxy resin (manufactured by Mitsubishi Chemical Corp., product name "jER828")

A-2: Isocyanate-modified epoxy resin (manufactured by Asahi Kasei Epoxy Co., Ltd., product name "AER4152")

<Radical Polymerizable Unsaturated Compound (B) (Hereinafter, Referred to as Component (B) in Examples)>

B-1: Bisphenol A diglycidyl ether acrylic acid adduct (manufactured by Mitsubishi Rayon Co., Ltd., product name "DIABEAM UK6105")

<Epoxy Resin Curing Agent (C)>
Dicyandiamide (manufactured by Mitsubishi Chemical Corp., product name "DICY 15")
<Curing Aid>
DCMU: Diphenyldimethylurea (manufactured by Hodogaya Chemical Co., Ltd., product name "DCMU99")
<Radical Polymerization Initiator (D)>
α-Hydroxyalkylphenone (manufactured by BASF SE, "IRGACURE 184")
(Reinforcing Fiber Substrate)
Carbon fiber bundle 1: tensile strength 4.2 GPa, tensile modulus 235 GPa, number of filaments 50,000, basis weight 3.8 g/m (manufactured by Mitsubishi Rayon Co., Ltd.)

[Preparation of Master Batch Containing Radical Polymerization Initiator (D) and Epoxy Curing Agent (C)]

A component (A) or component (B), an epoxy resin curing agent (C), a curing aid, and a radical polymerization initiator (D) were weighed in a container at the composition indicated in Table 4, and the components were mixed with stirring. This was more thoroughly mixed with a three-roll mill. Thus, master batches 3-1 and 3-2 containing a radical polymerization initiator (D) and an epoxy resin curing agent (C) were obtained.

TABLE 4

| Incorporated component (parts by mass) | | Master batch 3-1 | Master batch 3-2 |
| --- | --- | --- | --- |
| Component (A) | A-1 | 50 | — |
| Component (B) | B-1 | — | 50 |
| Component (C) | Dicy | 42 | 42 |
| Curing aid | DCMU | 28 | 28 |
| Component (D) | Irgacure 184 | 20 | 20 |

<Evaluation of Resistance to Tear Peeling of Protective Film>

Figure 12:
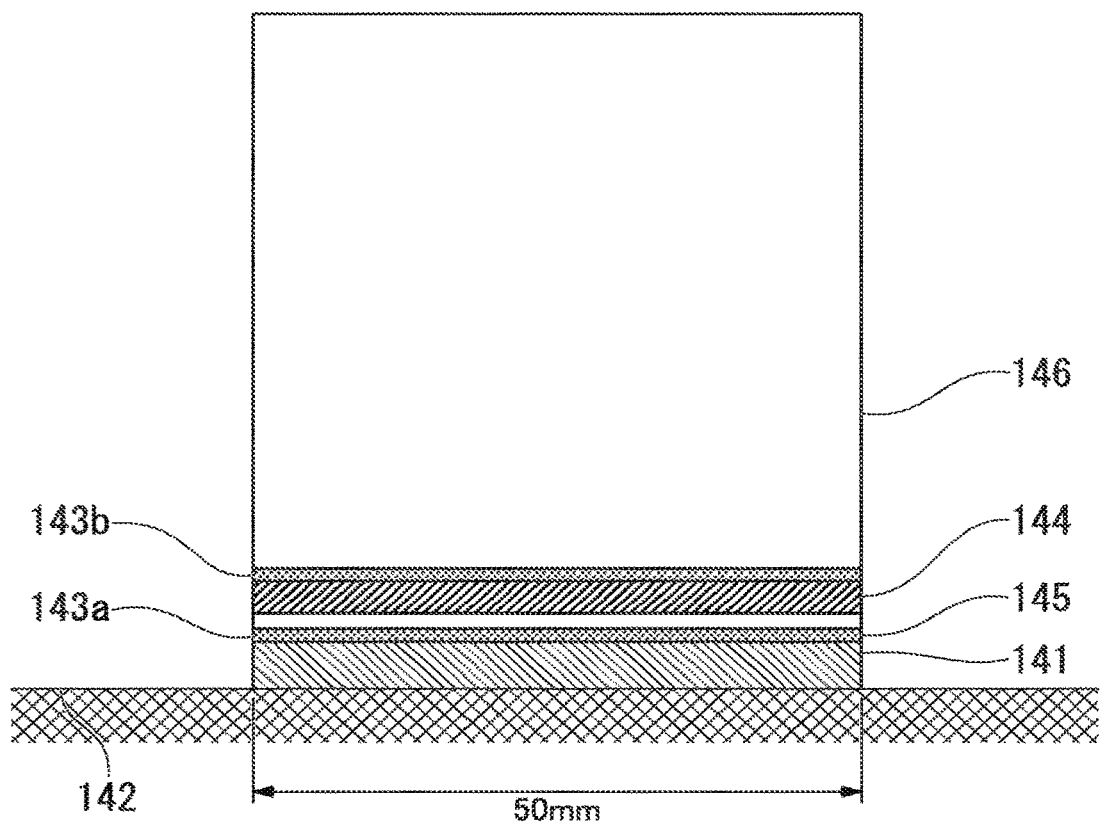
FIG. 12 is a front view diagram illustrating the method for evaluating the adhesive power of a protective film related to the third embodiment of the present invention.

As illustrated in FIG. 12, the resistance to tear peeling of the protective film was evaluated.

A metal plate 141 having a size of 50 mm×50 mm and a weight of 200 g was placed on a horizontal work bench surface 142, and a double-sided adhesive tape 143a was attached to the entire surface of the top surface of the metal plate 141. A protective film-attached prepreg 144 having a size of 50 mm×50 mm was superimposed, with the protective film 145 facing downward, and pasted to the double-sided adhesive tape 143a attached on the metal plate 141, by having the ends aligned together.

Subsequently, a double-sided adhesive tape 143b was attached to the entire surface of one surface of a metal block 146 having a size of 50 mm×50 mm×50 mm and a weight of 325 g, and the metal block was pasted, with the surface attached with the double-sided adhesive tape 143b facing downward, to the prepreg part of the protective film-attached prepreg 144 fixed on the metal plate 141 with a double-sided adhesive tape 143, by having the ends aligned together.

As illustrated in FIG. 12, the protective film-attached prepreg 144 was sandwiched between the metal plate 141 and the metal block 146, and the assembly was left to stand for one minute in a state of having the metal block 146 mounted on the prepreg 144. Thus, a specimen was produced.

After the assembly was left to stand for one minute in this state, the metal block 146 was grabbed, and the specimen was lifted vertically to a height of 10 cm at a rate of approximately 2 cm per second. From the state of the specimen after one minute from the initiation of the lift, the resistance to tear peeling of the pasting of the protective film to the prepreg was evaluated by the two stages described below. Meanwhile, the environment of the present evaluation was set to an air temperature of 23±3° C. and a humidity of 50±10% RH.

Satisfactory resistance to tear peeling (○) means a state in which the prepreg and the protective film remain attached so that the metal plate is lifted.

Poor resistance to tear peeling (X) means a state in which detachment occurs between the prepreg and the protective film, and the metal plate has been dropped.

The double-sided adhesive tapes 143a and 143b used for the present evaluation in the Examples and Comparative Examples are product name No. 5000NS (acrylic adhesive material, thickness 0.16 mm, 175 g/m$^2$) manufactured by Nitto Denko Corp.

The resistance to tear peeling of the pasting of the protective film to the prepreg was evaluated using a polyethylene film (manufactured by Hiroseki Kako Co., Ltd., product name: POLYLON FILM LD, thickness 25 μm) and a polyethylene terephthalate film (manufactured by Mitsubishi Plastics, Inc., product name: MRF75, thickness 75 μm; one surface was treated to be releasable, and the release-treated surface was arranged to face the prepreg side) as protective films.

<Evaluation of Resistance to Shear Peeling of Protective Film>

A protective film-attached prepreg cut to a size of 300 mm×600 mm was mounted on a cutting bench having a vacuum suction type fixing function of a cutting plotter (cutting plotter manufactured by Laserck Corp., L-2500), with the protective film surface facing downward, and the protective film-attached prepreg was fixed by vacuum suction.

For the prepreg that had been cut with a cemented carbide blade at a rate of 80 m/min in a direction of vertically cutting the reinforcing fibers, the resistance to shear peeling of the adhesive power of the protective film to the prepreg was evaluated in the two stages described below. Meanwhile, the environment of the present evaluation was set at an air temperature of 23±3° C. and a humidity of 50±10% RH.

In the case of satisfactory resistance to shear peeling (○), the protective film was attaching to the prepreg, and the prepreg could be cut properly.

In the case of poor resistance to shear peeling (X), detachment occurred between the prepreg and the protective film, and the prepreg was pulled by the blade and thus could not be cut properly.

The resistance to shear peeling of the adhesive power of the protective film to the prepreg was evaluated using a polyethylene film (manufactured by Hiroseki Kako Co., Ltd., product name: POLYLON FILM LD, thickness 25 μm) and a polyethylene terephthalate film (manufactured by Mitsubishi Plastics, Inc., product name: MRF75, thickness 75 μm; one surface was treated to be releasable, and the release-treated surface was arranged to face the prepreg side) as protective films.

<Evaluation of Tackiness of Prepreg>

As illustrated in FIGS. 8 to 11, tackiness of the prepreg was evaluated.

Figure 9:
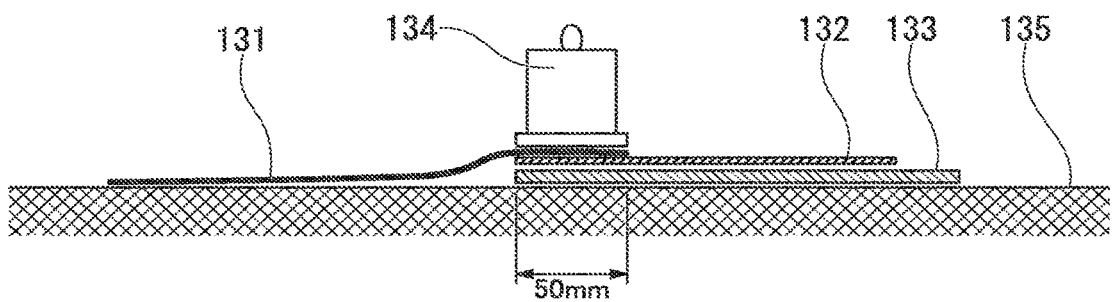
FIG. 9 is a perspective view diagram illustrating the state of being loaded with a weight in the method for evaluating tackiness related to the third embodiment of the present invention.

A polyethylene film 131 having a thickness of 25 μm, a width of 50 mm and a length of 250 mm, and the prepreg 132 having a width and a length of 50 mm or more, respectively, were superimposed, only under the weight of the polyethylene film 131 itself, such that one edge of the prepreg is perpendicular to the longitudinal direction of the polyethylene film 131, and the film and the prepreg are brought into contact over an area which measured 50 mm in width and 50 mm in length. A weight 134 was mounted such that a load would be applied uniformly over the superimposed area, and after the load was maintained for 60 seconds, the weight 134 was removed. Meanwhile, the reference numeral 135 in FIG. 9 represents the work bench surface.

Figure 10:
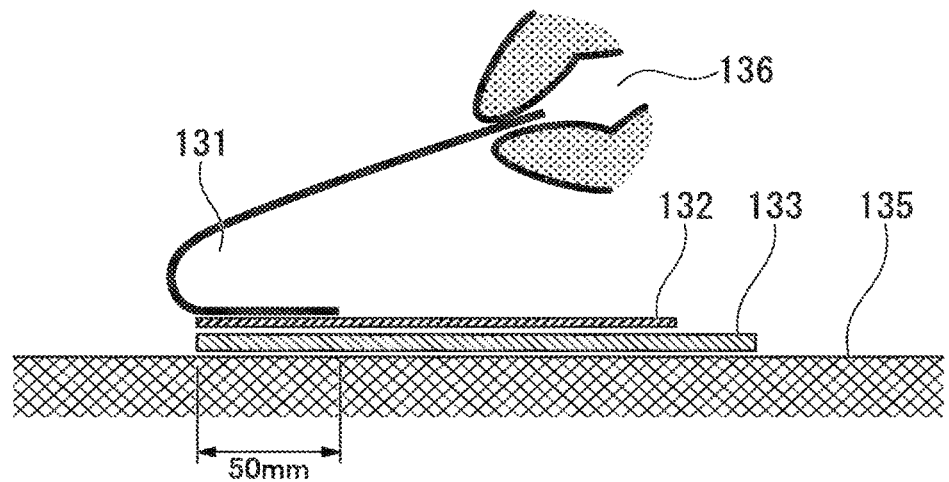
FIG. 10 is a perspective view diagram illustrating the state immediately before the lifting of the prepreg in the method for evaluating tackiness related to the third embodiment of the present invention.

Subsequently, as illustrated in FIG. 10, along the edge having a length of 50 mm of the polyethylene film, the edge that was not in contact with the prepreg was grabbed by fingers 136, and this was moved in the direction of peeling to the extent that no peeling force is exerted on the area of superimposition between the polyethylene film 131 and the prepreg 132.

Figure 11:
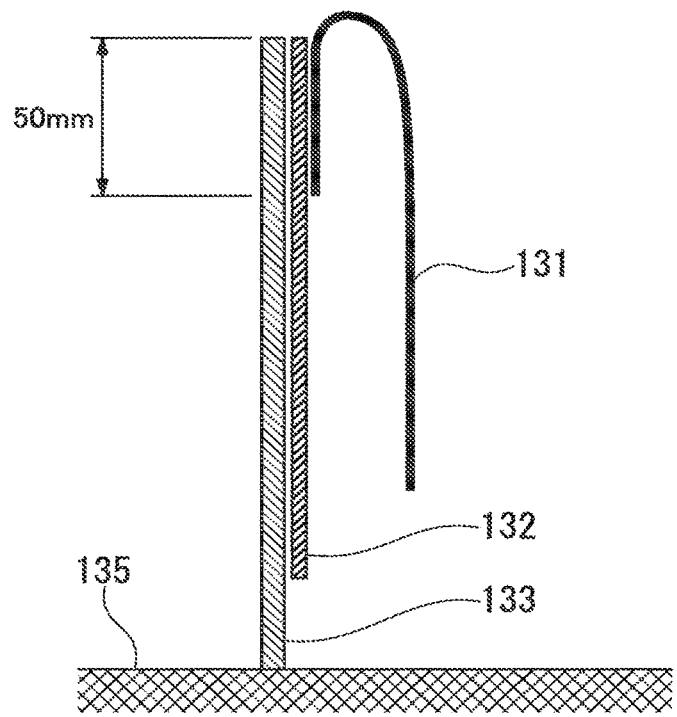
FIG. 11 is a perspective view diagram illustrating the state of determining whether the polyethylene film is detached within 10 seconds in the method for evaluating tackiness related to the third embodiment of the present invention.

Within 3 seconds thereafter, as illustrated in FIG. 11, the prepreg 132 laminated with the polyethylene film 131 was gently lifted vertically and maintained.

Within 10 seconds after the initiation of maintenance in a vertical state, it was judged whether the polyethylene film 131 was completely peeled off from the prepreg 132.

The test was carried out using 9 kinds of weights 134 such as 5 g, 7 g, 15 g, 30 g, 60 g, 150 g, 300 g, 600 g and 1200 g, and the weight of the lightest weight 134 that did not cause detachment of the polyethylene film 131 within 10 seconds was designated as the baseline value of the index of tackiness. Furthermore, when the polyethylene film 131 was detached within 10 seconds even in the case of making judgment using a weight of 1200 g, 1200 g was designated as the baseline value of the index of tackiness.

This was repeated three times, and the arithmetic mean of the baseline values of the index of tackiness thus obtained was designated as the index of tackiness.

In order to prevent bending of the prepreg 132, a stainless steel plate 133 having a thickness of 1 mm, a length of 35 cm and a width of 20 cm was laminated on the surface opposite to the polyethylene film 131—laminated surface of the prepreg 132. For the polyethylene film 131, POLYLON FILM LD (product name) of Hiroseki Kako Co., Ltd. was used. Meanwhile, the environment for the present evaluation was set to an air temperature of 23±3° C. and a humidity of 50±10% RH.

Example 3-1

<Preparation of Resin Composition for Impregnation>

1.71 parts by mass of component A-1 and 2.29 parts by mass of A-2 were weighed in a glass flask, and the components were heated to 130° C. using an oil bath and mixed. Thus, a base resin 3-11 was obtained. The base resin 3-11 was cooled to about 60° C. Subsequently, 64.25 parts by mass of the base resin 3-11, 15.25 parts by mass of the component A-1, and 16.00 parts by mass of the master batch 3-1 that had been prepared previously were weighed in a glass flask, and the components were heated to 60° C. using a water bath and mixed. Subsequently, 4.50 parts by mass of component B-1 was weighed and added to the glass flask, and the mixture was heated and stirred at 60° C. Thus, a resin composition for impregnation 3-12 indicated in Table 5 was obtained.

<Production of Prepreg>

A prepreg was produced as follows using the prepreg production apparatus 110 illustrated in FIG. 7. Two sheets of carbon fiber bundle sheets obtainable by mixing carbon fiber bundles were used as reinforcing fiber substrates. The carbon fiber bundle sheets were referred to as reinforcing fiber sheet 111a (III-1) and reinforcing fiber 111b (III-2), respectively.

The resin composition for impregnation 3-12 that had been maintained at 60° C. was discharged through a resin coating die 112a of an attachment apparatus 112, and the resin composition for impregnation 3-12 was attached to one surface of the reinforcing fiber sheet 111a (III-1). Subsequently, the reinforcing fiber sheet 111b (III-2) was superimposed on the surface attached with the resin composition for impregnation 3-12 of the reinforcing fiber sheet 111a (III-1), and separating films (114a, 114b) were respectively supplied from a separating film supply roll 114 on the two external surfaces of the superimposed reinforcing fiber sheet 111a (III-1) and reinforcing fiber sheet 111b (III-2) to sandwich the reinforcing fiber sheets.

Subsequently, the reinforcing fiber sheet 111a (III-1) and the reinforcing fiber sheet 111b (III-2) sandwiched between the separating films (114a, 114b) were pressed from the outside using pressing rolls 113a and 113b in a pressing apparatus 113, and the resin composition for impregnation 3-12 attached to the reinforcing fiber sheet 111a (III-1) was impregnated into the reinforcing fiber sheet 111a (III-1) and the reinforcing fiber sheet 111b (III-2). The separating films on both surfaces peeled off using a separating film winding apparatus 115, and thus a prepreg precursor 3-13 was obtained. Meanwhile, reference numeral 118 in FIG. 7 represents driving rolls.

Next, a polyethylene protective film 117 made of polyethylene (manufactured by Hiroseki Kako Co., Ltd., product name: POLYLON FILM LD, thickness 25 μm) was supplied on either surface of the prepreg precursor 3-13 thus obtained, and the protective films were pasted to the prepreg precursor 3-13 through protective film compressing rolls 121.

The prepreg precursor 3-13 was irradiated on both surfaces respectively with ultraviolet radiation at an irradiation dose of 320 mJ/cm$^2$ using a metal halide lamp (manufactured by Eye Graphics Co., Ltd.) of an energy ray irradiation apparatus 116, and thus a prepreg 120 (3-14) was obtained. Furthermore, the speed of production line for the prepreg 120 was set to 5 m/min. The prepreg 120 was wound around a winding means 119.

For the prepreg 3-14 thus obtained, the basis weight (FAW) of the reinforcing fibers and the resin percentage content were measured by a solvent method, and the FAW was 612 g/m$^2$, while the resin percentage content was 31% by mass. Furthermore, the results of an evaluation of the resistance to tear peeling of the pasting of the protective film to the prepreg 3-14 thus obtained, an evaluation of the resistance to shear peeling of the protective film, and an evaluation of tackiness of the prepreg are presented in Table 6.

Example 3-2

<Preparation of Resin Composition for Impregnation>

50 Parts by mass of A-1 and 40 parts by mass of A-2 as the component (A) were weighed in a glass flask, and the components were heated to 130° C. using an oil bath and mixed. Subsequently, the mixture of A-1 and A-2 was cooled to about 60° C. This was transferred to a kneader, and 19 parts by mass of the master batch 3-1 that had been previously prepared was added thereto. The mixture was stirred at 60° C., and thus a resin composition for impregnation 3-21 having the composition indicated in Table 5 was obtained.

<Production of Prepreg>

Figure 7:
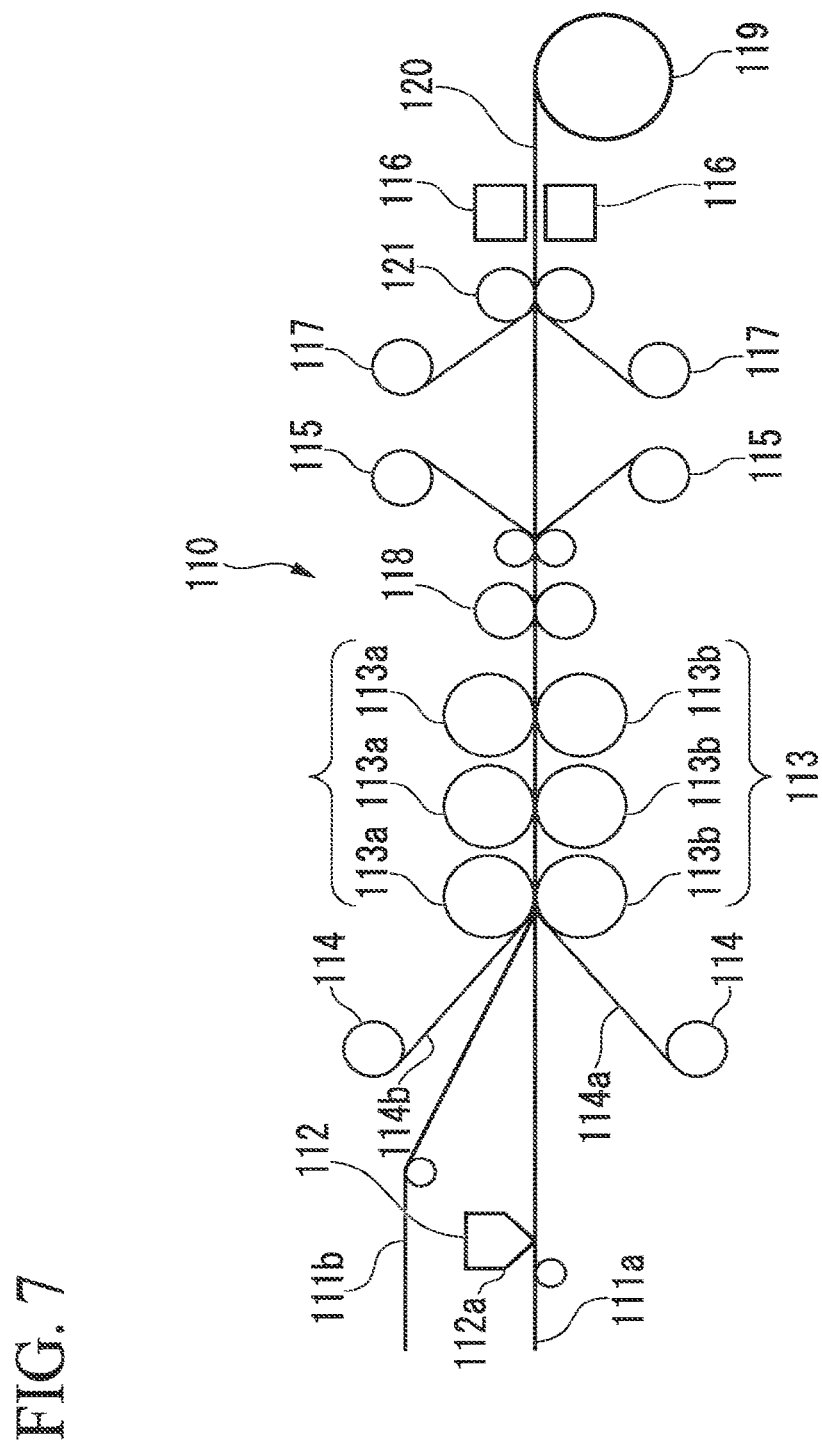
FIG. 7 is a schematic diagram illustrating an example of the method for producing a prepreg related to the third embodiment of the present invention.
Figure 8:
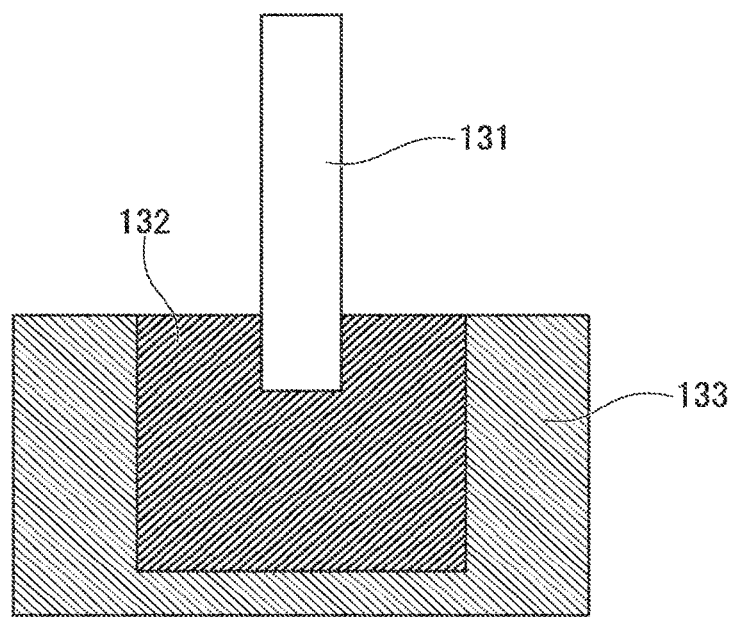
FIG. 8 is a front view diagram illustrating the disposition of the prepreg and the polyethylene film in the method for evaluating tackiness related to the third embodiment of the present invention.

A prepreg 3-24 was produced by the same method as that used in Example 1, using the prepreg production apparatus illustrated in FIG. 7 and using carbon fiber bundles and the resin composition for impregnation 3-21.

The prepreg 3-24 thus obtained had a FAW of 595 g/m$^2$ and a resin percentage content of 33% by mass. Furthermore, the results of an evaluation of the resistance to tear peeling of the pasting of the protective film to the prepreg 3-24 thus obtained, an evaluation of the resistance to shear peeling of the protective film, and an evaluation of tackiness of the prepreg are presented in Table 6.

Example 3-3

<Preparation of Resin Composition for Impregnation>

A resin composition for impregnation 3-31 having the composition indicated in Table 5 was obtained by the same method as that used in Example 3-2.

<Production of Prepreg>

A prepreg 3-34 was produced by the same method as that used in Example 3-1 using the prepreg production apparatus illustrated in FIG. 7 and using carbon fiber bundles and the resin composition for impregnation 3-31.

The prepreg 3-34 thus obtained had a FAW of 598 g/m$^2$ and a resin percentage content of 32% by mass. Furthermore, the results of an evaluation of the resistance to tear peeling of the pasting of the protective film to the prepreg 3-34 thus obtained, an evaluation of the resistance to shear peeling of the protective film, and an evaluation of tackiness of the prepreg are presented in Table 6.

Example 3-4

<Preparation of Resin Composition for Impregnation>

A matrix resin composition 3-41 was obtained by the same method as that used in Example 3-2, by changing the composition as indicated in Table 5.

<Production of Prepreg>

A prepreg 3-44 was produced by the same method as that used in Example 3-1 using the prepreg production apparatus illustrated in FIG. 7 and using carbon fiber bundles and the matrix resin composition 3-41.

The prepreg 3-44 thus obtained had a FAW of 599 g/m$^2$ and a resin percentage content of 31% by mass. Furthermore, the results of an evaluation of the resistance to tear peeling of the pasting of the protective film to the prepreg 3-44 thus obtained, an evaluation of the resistance to shear peeling of the protective film, and an evaluation of tackiness of the prepreg are presented in Table 6.

Example 3-5

<Production of Prepreg>

A prepreg 3-54 was produced by the same method as that used in Example 3-1, using the prepreg production apparatus illustrated in FIG. 7, using carbon fiber bundles and the resin composition for impregnation 3-21, and using a polyethylene terephthalate film (manufactured by Mitsubishi Plastics, Inc., product name: MRF75, thickness 75 µm; one surface was treated to be releasable, and the release-treated surface was arranged to face the prepreg side) as a protective film, instead of the polyethylene film.

The prepreg 3-54 thus obtained had a FAW of 601 g/m$^2$ and a resin percentage content of 32% by mass. Furthermore, the results of an evaluation of the resistance to tear peeling of the pasting of the protective film to the prepreg 3-54 thus obtained and an evaluation of the resistance to shear peeling of the protective film are presented in Table 6.

Example 3-6

<Production of Prepreg>

A prepreg was produced as follows using the prepreg production apparatus illustrated in FIG. 7. Carbon fiber bundles were used as the reinforcing fibers.

The resin composition for impregnation 3-21 that had been maintained at 60° C. was discharged through a resin coating die 112a, and the resin composition for impregnation 3-21 was attached on one surface of the reinforcing fiber sheet 111a (III-1). Subsequently, the reinforcing fiber sheet 111b (III-2) was superimposed on the surface attached with the resin composition for impregnation 3-21 of the reinforcing fiber sheet 111a (III-1), and a polyethylene terephthalate film (manufactured by Mitsubishi Plastics, Inc., product name: MRF75, thickness 75 µm; one surface was treated to be releasable, and the releasable surface was arranged to face the prepreg side) was supplied on either side of the external surfaces of the superimposed reinforcing fiber sheet 111a (III-1) and reinforcing fiber sheet 111b (III-2) as a separating film and protective film (114a, 114b), to sandwich the reinforcing fiber sheets.

Subsequently, the reinforcing fiber sheet 111a (III-1) and the reinforcing fiber sheet 111b (III-2) sandwiched between the films (114a, 114b) were pressed from the outside with pressing rolls 113a and 113b in a pressing apparatus 113, and the resin composition for impregnation 3-21 attached to the reinforcing fiber sheet 111a (III-1) was impregnated into the reinforcing fiber sheet 111a (III-1) and the reinforcing fiber sheet 111b (III-2). Thus, a prepreg precursor 3-63 was obtained.

Subsequently, while the protective films made of polyethylene terephthalate that were attached to the surfaces of the prepreg precursor 3-63 were maintained (that is, not peeled off), both surfaces of the prepreg precursor 3-63 were irradiated with ultraviolet radiation respectively at an irradiation dose of 320 mJ/cm$^2$ using a metal halide lamp (manufactured by Eye Graphics Co., Ltd.) in an energy ray irradiation apparatus 116. Thus, a prepreg 3-64 was obtained. Furthermore, the speed of the production line for the prepreg 3-64 was set to 5 m/min.

For the prepreg 3-64 thus obtained, the basis weight (FAW) of the reinforcing fibers and the resin percentage content were measured by a solvent method, and the FAW was 612 g/m$^2$, while the resin percentage content was 31% by mass. Furthermore, the results of an evaluation of the resistance to tear peeling of the pasting of the protective film to the prepreg 3-64 and an evaluation of the resistance to shear peeling of the adhesive power of the protective film are presented in Table 6.

Comparative Example 3-1

<Production of Prepreg>

A prepreg precursor was produced in the same manner as in Example 3-1, and the separating films (114a, 114b) were peeled off from the two surfaces of the prepreg precursor.

Next, without pasting a protective film on any surface of the prepreg precursor, the prepreg precursor was irradiated on both surfaces with ultraviolet radiation respectively at an irradiation dose of 320 mJ/cm$^2$ using a metal halide lamp (manufactured by Eye Graphics Co., Ltd.) in an energy ray irradiation apparatus 116, and thus a prepreg 3-74 was obtained. Furthermore, the speed of the production line for the prepreg was set to 5 m/min.

The FAW and the resin percentage content of the prepreg 3-74 thus obtained were the same as those of the prepreg 3-14. Furthermore, for the prepreg 3-74, a protective film made of polyethylene (manufactured by Hiroseki Kako Co., Ltd., product name: POLYLON FILM LD, thickness 25 μm) was placed on the surface of the prepreg 3-74, and the assembly was compressed, before the evaluation of the resistance to tear peeling of the protective film and the evaluation of the resistance to shear peeling of the protective film were carried out. Regarding the conditions for compression of the prepreg and the protective film by protective film compressing rolls 121, compression was carried out at a speed of prepreg take-up of 5 m/min, and a linear pressure of about 600 N/m.

Meanwhile, the environment for conducting the process of placing and compressing the protective film on the prepreg surface was at an air temperature of 15±5° C. The results of an evaluation of the resistance to tear peeling of the pasting of the protective film and an evaluation of the resistance to shear peeling of the protective film are presented in Table 7.

Comparative Example 3-2

<Production of Prepreg>

A prepreg 3-84 was produced by the same method as that used in Comparative Example 3-1 using the prepreg production apparatus illustrated in FIG. 7 and using carbon fiber bundles and the resin composition for impregnation 3-21.

The FAW and the resin percentage content of the prepreg 3-84 thus obtained were the same as those of the prepreg 3-24.

Furthermore, placement and compression of the protective film were also carried out in the same manner as in Comparative Example 3-1. The results of an evaluation of the resistance to tear peeling of the protective film and an evaluation of the resistance to shear peeling of the protective film are presented in Table 7.

Comparative Example 3-3

<Production of Prepreg>

A prepreg 3-94 was produced by the same method as that used in Comparative Example 3-1 using the prepreg production apparatus illustrated in FIG. 7 and using carbon fiber bundles and the resin composition for impregnation 3-31.

The FAW and the resin percentage content of the prepreg 3-94 thus obtained were the same as those of the prepreg 3-34.

Furthermore, placement and compression of the protective film were also carried out in the same manner as in Comparative Example 3-1. The results of an evaluation of the resistance to tear peeling of the protective film and an evaluation of the resistance to shear peeling of the protective film are presented in Table 7.

Comparative Example 3-4

<Production of Prepreg>

A prepreg 3-104 was produced by the same method as that used in Comparative Example 3-1 using the prepreg production apparatus illustrated in FIG. 7 and using carbon fiber bundles and the resin composition for impregnation 3-41.

The FAW and the resin percentage content of the prepreg 3-104 thus obtained were the same as those of the prepreg 3-44.

Furthermore, placement and compression of the protective film were also carried out in the same manner as in Comparative Example 3-1. The results of an evaluation of the resistance to tear peeling of the protective film and an evaluation of the resistance to shear peeling of the protective film are presented in Table 7.

Comparative Example 3-5

<Production of Prepreg>

A prepreg 3-114 was produced by the same method as that used in Comparative Example 3-1 using the prepreg production apparatus illustrated in FIG. 7 and using carbon fiber bundles and the resin composition for impregnation 3-21.

The FAW and the resin percentage content of the prepreg 3-114 thus obtained were the same as those of the prepreg 3-24.

Furthermore, placement and compression of the protective film were also carried out in the same manner as in Comparative Example 3-1. However, for the prepreg 3-114, polyethylene terephthalate films (manufactured by Mitsubishi Plastics, Inc., product name: MRF75, thickness 75 μm; one surface was treated to be releasable, and the release-treated surface was arranged to face the prepreg side) were used as protective films. The results of an evaluation of the resistance to tear peeling of the protective film and an evaluation of the resistance to shear peeling of the protective film are presented in Table 7.

TABLE 5

| Incorporated component (parts by mass) | | Resin composition for impregnation 3-11 | Resin composition for impregnation 3-21 | Resin composition for impregnation 3-31 | Resin composition for impregnation 3-41 |
|---|---|---|---|---|---|
| Component (A) | A-1 | 55.0 | 50.0 | 35.0 | 30.0 |
| | A-2 | 40.0 | 40.0 | 40.0 | 40.0 |
| Component (B) | B-1 | 5.0 | 10.0 | 25.0 | 30.0 |
| Component (C) | Dicy | 4.2 | 4.2 | 4.2 | 4.2 |
| Curing aid | DCMU | 2.8 | 2.8 | 2.8 | 2.8 |
| Component (D) | Irgacure 184 | 2.0 | 2.0 | 2.0 | 2.0 |

TABLE 6

|  |  | Example 3-1 | Example 3-2 | Example 3-3 | Example 3-4 | Example 3-5 | Example 3-6 |
|---|---|---|---|---|---|---|---|
| Resin composition for impregnation | | Resin composition for impregnation 3-11 | Resin composition for impregnation 3-21 | Resin composition for impregnation 3-31 | Resin composition for impregnation 3-41 | Resin composition for impregnation 3-21 | Resin composition for impregnation 3-21 |
| Film placement step | Prepreg | Prepreg 3-14 | Prepreg 3-24 | Prepreg 3-34 | Prepreg 3-44 | Prepreg 3-54 | Prepreg 3-64 |
| | Placement process during prepreg production (presence/absence) | Present | Present | Present | Present | Present | Present |
| | Kind of protective film (PE/PET) | PE | PE | PE | PE | PET | PET |
| Evaluation | Evaluation of resistance to tear peeling of pasting of protective film | ○ | ○ | ○ | ○ | ○ | ○ |
| | Evaluation of resistance to shear peeling of adhesive power of protective film | ○ | ○ | ○ | ○ | ○ | ○ |
| Evaluation of tackiness | Before ultraviolet irradiation — Index of tackiness | 5.0 | 5.3 | 5.0 | 7.0 | — | — |
| | Before ultraviolet irradiation — Determination of tack | X | X | X | X | — | — |
| | After ultraviolet irradiation — Index of tackiness | 54.5 | 82.5 | 1200 | Adhesion not feasible | — | — |
| | After ultraviolet irradiation — Determination of tack | ○ | ○ | ○ | ○ | — | — |

TABLE 7

|  |  | Comparative Example 3-1 | Comparative Example 3-2 | Comparative Example 3-3 | Comparative Example 3-4 | Comparative Example 3-5 |
|---|---|---|---|---|---|---|
| Resin composition for impregnation | | Resin composition for impregnation 3-11 | Resin composition for impregnation 3-21 | Resin composition for impregnation 3-31 | Resin composition for impregnation 3-41 | Resin composition for impregnation 3-21 |
| Film placement step | Prepreg | Prepreg 3-74 | Prepreg 3-84 | Prepreg 3-94 | Prepreg 3-104 | Prepreg 3-114 |
| | Placement process during prepreg production (presence/absence) | Absent | Absent | Absent | Absent | Absent |
| | Kind of protective film (PE/PET) | PE | PE | PE | PE | PET |
| Evaluation | Evaluation of resistance to tear peeling of pasting of protective film | X | X | X | X | X |
| | Evaluation of resistance to shear peeling of adhesive power of protective film | X | X | X | X | X |
| Evaluation of tackiness | Before ultraviolet irradiation — Index of tackiness | — | — | — | — | — |
| | Before ultraviolet irradiation — Determination of tack | — | — | — | — | — |
| | After ultraviolet irradiation — Index of tackiness | — | — | — | — | — |
| | After ultraviolet irradiation — Determination of tack | — | — | — | — | — |

(4) Examples and Comparative Examples Corresponding to Fourth Embodiment

The raw materials, materials used in the present Examples and Comparative Examples, and various measurement and evaluation methods are described below.

(Raw Materials of Resin Composition for Impregnation)
<Epoxy Resin (A) (Hereinafter, Referred to as "Component (A)")>
A-1: Bisphenol A type liquid epoxy resin (manufactured by Mitsubishi Chemical Corp., product name "jER828")
A-2: Isocyanate-modified epoxy resin (manufactured by Asahi Kasei Epoxy Co., Ltd., product name "AER4152")
<Radical Polymerizable Unsaturated Compound (B) (Hereinafter, Referred to as "Component (B)")>
B-1: Bisphenol A diglycidyl ether acrylic acid adduct (manufactured by Mitsubishi Rayon Co., Ltd., product name "DIABEAM UK6105")
B-2: Novolac type glycidyl ether acrylic acid adduct (manufactured by DIC Corp., "DICLITE UE-8740")
<Epoxy Resin Curing Agent (C)>
Dicyandiamide (manufactured by Mitsubishi Chemical Corp., product name "DICY 15")
<Curing Aid>
DCMU: Diphenyldimethylurea (manufactured by Hodogaya Chemical Co., Ltd., product name "DCMU99")
<Radical Polymerization Initiator (D)>
α-Hydroxyalkylphenone (manufactured by BASF SE, "IRGACURE 184")
(Reinforcing Fiber Substrate)
Carbon fiber bundle 2: tensile strength 4.1 GPa, tensile modulus 240 GPa, number of filaments 50,000, basis weight 3.75 g/m (manufactured by Mitsubishi Rayon Co., Ltd.)

(Light Transmitting Film)

F-1: Polyester peelable film (manufactured by Mitsubishi Plastics, Inc., product name "DIAFOIL MRF25" having a thickness of 25 µm F-2: Polyester peelable film (manufactured by Mitsubishi Plastics, Inc., product name "DIAFOIL MRZ38") having a thickness of 38 µm F-3: Polyester peelable film (manufactured by Mitsubishi Plastics, Inc., product name "DIAFOIL MRF50") having a thickness of 50 µm F-4: Polyester peelable film (manufactured Mitsubishi Plastics, Inc., product name "DIAFOIL MRF75") having a thickness of 75 µm F-5: Polyester peelable film (manufactured by Mitsubishi Plastics, Inc., product name "DIAFOIL MRV100") having a thickness of 100 µm (Peelable Paper)

F-6: Peelable paper (manufactured by Lintec Corp., product name "CFP-45") having a thickness of 100 µm (Measurement and Evaluation Methods)

<Measurement of Viscosity Change of Resin Composition for Impregnation Caused by Ultraviolet Irradiation)

The viscosity change caused by ultraviolet irradiation of the resin compositions for impregnation obtained by Examples and Comparative Examples was measured under the following measurement conditions.

Measurement apparatus: (manufactured by Reologica Instruments A.B., product name: "VAR-100")

Test mode: High speed oscillation

Measurement temperature: 30° C.

Plate size: 8 mmφ

Gap: 0.05 mm

Stress: 700 Pa

Frequency: 1.59 Hz

Ultraviolet intensity ($\lambda$=365 nm): 50 mW/cm$^2$

Duration of irradiation: 6 seconds

Interval and frequency of irradiation: Irradiated two times with an interval of 120 seconds.

Viscosity measurement: The viscosity of a resin composition for impregnation was continuously measured in real time from a time point before ultraviolet irradiation, and the viscosity before ultraviolet irradiation, the viscosity after 120 seconds from the first ultraviolet irradiation, and the viscosity after 120 seconds from the second ultraviolet irradiation were described in Table 9 as representative values.

<Evaluation of Tear Peelability of Light Transmitting Film>

Figure 14:
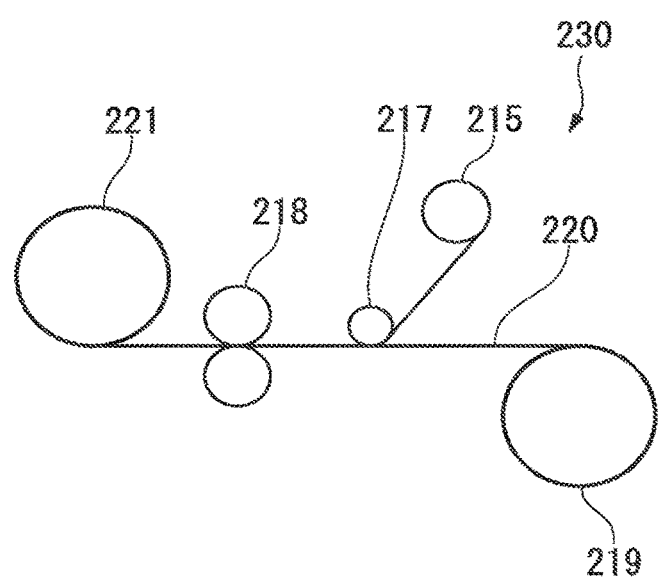
FIG. 14 is a schematic diagram illustrating a film detaching apparatus used for the evaluation of film detachability in the Examples and Comparative Examples related to the fourth embodiment of the present invention.

A second laminated body (a product wound by the winding means 219 of FIG. 14) obtained in each of the Examples and Comparative Examples was loaded on the unwinding means 221 of a light transmitting film collecting apparatus 230, and was continuously delivered by driving rolls 218 at a rate of 5 m/min. The light transmitting film of the top surface of the prepreg was detached using film detachment guide rolls 217, and the light transmitting film was collected using a film winding apparatus 215 at the same speed as the speed of prepreg production (see FIG. 14).

The film detachability was evaluated based on the following criteria. Meanwhile, the environment of the present evaluation was at an air temperature of 30° C.±10° C. and a humidity of 40%±15%.

In the case of satisfactory film detachability (◯), the matrix resin composition bled out from prepreg edges was satisfactorily peeled off from the side of the film to be collected, and was maintained in a state of being attached to both edge sides of the prepreg.

In the case of poor film detachability (X), the matrix resin composition bled out from prepreg edges was wound around the film winding apparatus in a state of being attached to the detached film side.

[Preparation of Master Batch Containing Radical Polymerization Initiator (D) and Epoxy Resin Curing Agent (C)]

A component (A) or component (B), an epoxy resin curing agent (C), a curing aid, and a radical polymerization initiator (D) were weighed in a container at the composition indicated in Table 8, and the components were mixed with stirring. This was mixed more thoroughly with a three-roll mill. Thus, master batches 4-1 to 4-3 each containing a radical polymerization initiator (D) and an epoxy resin curing agent (C) were obtained.

TABLE 8

| Incorporated component (parts by mass) | | Master batch 4-1 | Master batch 4-2 | Master batch 4-3 |
|---|---|---|---|---|
| Component (A) | A-1 | — | — | 100 |
| Component (B) | B-1 | 100 | — | — |
|  | B-2 | — | 100 | — |
| Component (C) | Dicy | 42 | 42 | 42 |
| Curing aid | DCMU | 28 | 28 | 28 |
| Component (D) | Irgacure 184 | 20 | 20 | 20 |

Example 4-1

<Preparation of Resin Composition for Impregnation>

50 Parts by mass of A-1 and 40 parts by mass of A-2 as component (A) were weighed in a glass flask, and the components were heated to 130° C. using an oil bath and mixed. Subsequently, the mixture of A-1 and A-2 was cooled to about 60° C. This was transferred to a kneader, 19 parts by mass of the master batch 4-1 that had been prepared previously was added thereto, and the mixture was stirred at 60° C. Thus, a resin composition for impregnation 4-11 indicated in Table 8 was obtained. For the resin composition for impregnation 4-11, the viscosities before and after ultraviolet irradiation were measured according to the <Measurement of viscosity change of resin composition for impregnation caused by ultraviolet irradiation>. The results are described in Table 9.

<Method for Producing Prepreg (Second Laminated Body B1)>

Figure 13:
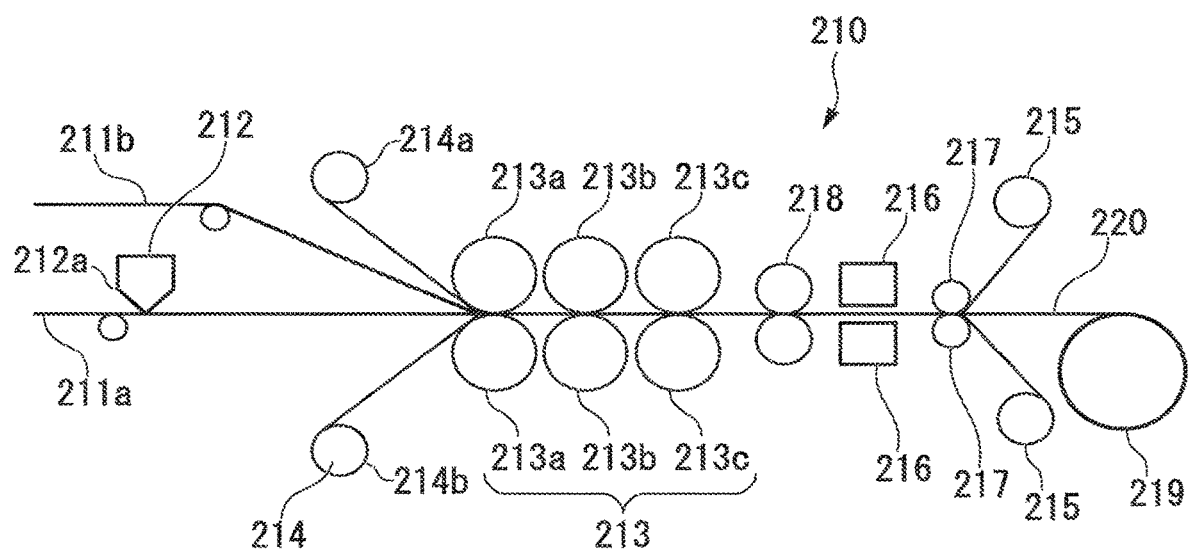
FIG. 13 is a schematic diagram illustrating the method for producing a prepreg in the Examples and Comparative Examples related to the fourth embodiment of the present invention.

A second laminated body B1 was produced as follows using the prepreg production apparatus 210 illustrated in FIG. 13. Meanwhile, two sheets of carbon fiber bundle sheets obtainable by mixing carbon fiber bundles were used as the reinforcing fiber substrate. The carbon fiber bundle sheets are referred to as a reinforcing fiber sheet 211a (IV-1) and a reinforcing fiber sheet 211b (IV-2), respectively.

The resin composition for impregnation 4-11 that had been maintained at 60° C. was discharged through a resin coating die 212a of an attachment apparatus 212, and thereby the resin composition for impregnation 4-11 was attached to one surface of the reinforcing fiber sheet 211a (IV-1). Subsequently, the reinforcing fiber sheet 211b (IV-2) was superimposed on the surface of the reinforcing fiber sheet 211a (IV-1) where the resin composition for impregnation 4-11 was attached, and on the two external surfaces of the superimposed reinforcing fiber sheet 211a (IV-1) and the reinforcing fiber sheet 211b (IV-2), films (214a, 214b) were respectively supplied from the respective film supply rolls 214 to sandwich the reinforcing fiber sheets. A polyester film F-1 was used as the film.

Subsequently, the reinforcing fiber sheet 211*a* (IV-1) and the reinforcing fiber sheet 211*b* (IV-2) were pressurized from the outside of the films 214*a* and 214*b* with pressing rolls 213*a*, 213*b* and 213*c* using a pressing apparatus 213, and thus the resin composition for impregnation 4-11 attached to the reinforcing fiber sheet (IV-1) was impregnated into the reinforcing fiber sheet 211*a* (IV-1) and the reinforcing fiber sheet 211*b* (IV-2). The diameters of the pressing rolls 213*a*, 213*b* and 213*c* were all 500 mm, and the pressing force was set to 1000 kgf as the value of the load cell installed thereon.

Furthermore, the respective space distances between the upper and lower rolls of the pressing rolls 213*a*, 213*b* and 213*c* were controlled, and thereby the width change of the prepreg precursor thus obtained was adjusted. Thus, at the time of passing between the pressing rolls 213*a*, the widths of the reinforcing fiber sheets 211*a* (IV-1) and 211*b* (IV-2) were extended from 290 mm to 308 mm; at the time of passing between the pressing rolls 213*b*, the widths were extended from 308 mm to 313 mm; and at the time of passing between the pressing rolls 213*c*, the widths were extended from 313 mm to 315 mm. Thus, a first laminated body A1 was obtained.

At both edges of the prepreg precursor in the first laminated body A1 thus obtained, the resin composition for impregnation 4-11 that had been squeezed during the impregnation step was generated. On the outside of the two edges of the prepreg precursor, the resin composition for impregnation 4-11 was exuded to the extent of a width of 15 mm or less.

Next, the top surface of the first laminated body A1 thus obtained and portion of the resin composition for impregnation 4-11 that had been exuded were irradiated with ultraviolet radiation at an irradiation dose of 320 mJ/cm² using a metal halide lamp (manufactured by Eye Graphics co., Ltd.) in an ultraviolet irradiation apparatus 216, and thus a second laminated body B1 was obtained. The second laminated body B1 thus obtained was wound up using a winding means 219. Also, the speed of the production line for the prepreg 220 was set to 5 m/min.

Regarding the basis weight (FAW) of the reinforcing fiber sheets (IV-1 and IV-2) and the resin percentage content in the second laminated body B1, the FAW was 600 g/m², and the resin percentage content was 33% by mass.

The tear peelability of the light transmitting film was evaluated according to the "Evaluation of tear peelability of light transmitting film> using the second laminated body B1 thus obtained. The results are presented in Table 10.

Example 4-2

A second laminated body B2 was produced by the same method as that used in Example 4-1, except that the ultraviolet irradiation dose by the ultraviolet irradiation apparatus 216 was changed to 640 mJ/cm².

The FAW of the reinforcing fiber sheet and the resin percentage content of the second laminated body B2 were all the same as those of the second laminated body B1. Furthermore, the width of the resin composition for impregnation 4-11 that had exuded on the outside of the two edges of the prepreg precursor was also 15 mm or less, which was the same as that of Example 4-1. For the second laminated body B2 thus obtained, tear peelability of the light transmitting film was evaluated in the same manner as in Example 4-1. The results are presented in Table 10.

Example 4-3

A second laminated body B3 was produced by the same method as that used in Example 4-1, except that the polyester film F-2 was used as the film supplied from the film supply roll 214.

The FAW of the reinforcing fiber sheet and the resin percentage content of the second laminated body B3 were all the same as those of the second laminated body B1. Furthermore, the width of the resin composition for impregnation 4-11 that had exuded on the outside of the two edges of the prepreg precursor was also 15 mm or less, which was the same as that of Example 4-1. For the second laminated body B3 thus obtained, tear peelability of the light transmitting film was evaluated in the same manner as in Example 4-1. The results are presented in Table 10.

Example 4-4

A second laminated body B4 was produced by the same method as that used in Example 4-1, except that the polyester film F-2 was used as the film supplied from the film supply roll 214, and the ultraviolet irradiation dose by the ultraviolet irradiation apparatus 216 was changed to 640 mJ/cm².

The FAW of the reinforcing fiber sheet and the resin percentage content of the second laminated body B4 were all the same as those of the second laminated body B1. Furthermore, the width of the resin composition for impregnation 4-11 that had exuded on the outside of the two edges of the prepreg precursor was also 15 mm or less, which was the same as that of Example 4-1. For the second laminated body B4 thus obtained, tear peelability of the light transmitting film was evaluated in the same manner as in Example 4-1. The results are presented in Table 10.

Example 4-5

A second laminated body B5 was produced by the same method as that used in Example 4-1, except that the polyester film F-3 was used as the film supplied from the film supply roll 214.

The FAW of the reinforcing fiber sheet and the resin percentage content of the second laminated body B5 were all the same as those of the second laminated body B1. Furthermore, the width of the resin composition for impregnation 4-11 that had exuded on the outside of the two edges of the prepreg precursor was also 15 mm or less, which was the same as that of Example 4-1. For the second laminated body B5 thus obtained, tear peelability of the light transmitting film was evaluated in the same manner as in Example 4-1. The results are presented in Table 10.

Example 4-6

A second laminated body B6 was produced by the same method as that used in Example 4-1, except that the polyester film F-3 was used as the film supplied from the film supply roll 214, and the ultraviolet irradiation dose by the ultraviolet irradiation apparatus 216 was changed to 640 mJ/cm².

The FAW of the reinforcing fiber sheet and the resin percentage content of the second laminated body B6 were all the same as those of the second laminated body B1. Furthermore, the width of the resin composition for impregnation 4-11 that had exuded on the outside of the two edges of the prepreg precursor was also 15 mm or less, which was the same as that of Example 4-1. For the second laminated body B6 thus obtained, tear peelability of the light transmitting film was evaluated in the same manner as in Example 4-1. The results are presented in Table 10.

Example 4-7

A second laminated body B7 was produced by the same method as that used in Example 4-1, except that the polyester film F-4 was used as the film supplied from the film supply roll 214.

The FAW of the reinforcing fiber sheet and the resin percentage content of the second laminated body B7 were all the same as those of the second laminated body B1. Furthermore, the width of the resin composition for impregnation 4-11 that had exuded on the outside of the two edges of the prepreg precursor was also 15 mm or less, which was the same as that of Example 4-1. For the second laminated body B7 thus obtained, tear peelability of the light transmitting film was evaluated in the same manner as in Example 4-1. The results are presented in Table 10.

Example 4-8

A second laminated body B8 was produced by the same method as that used in Example 4-1, except that the polyester film F-4 was used as the film supplied from the film supply roll 214, and the ultraviolet irradiation dose by the ultraviolet irradiation apparatus 216 was changed to 640 mJ/cm$^2$.

The FAW of the reinforcing fiber sheet and the resin percentage content of the second laminated body B8 were all the same as those of the second laminated body 131. Furthermore, the width of the resin composition for impregnation 4-11 that had exuded on the outside of the two edges of the prepreg precursor was also 15 mm or less, which was the same as that of Example 4-1. For the second laminated body B8 thus obtained, tear peelability of the light transmitting film was evaluated in the same manner as in Example 4-1. The results are presented in Table 10.

Example 4-9

A second laminated body B9 was produced by the same method as that used in Example 4-1, except that the polyester film F-5 was used as the film supplied from the film supply roll 214.

The FAW of the reinforcing fiber sheet and the resin percentage content of the second laminated body B9 were all the same as those of the second laminated body B1. Furthermore, the width of the resin composition for impregnation 4-11 that had exuded on the outside of the two edges of the prepreg precursor was also 15 mm or less, which was the same as that of Example 4-1. For the second laminated body B9 thus obtained, tear peelability of the light transmitting film was evaluated in the same manner as in Example 4-1. The results are presented in Table 10.

Example 4-10

A second laminated body B10 was produced by the same method as that used in Example 4-1, except that the polyester film F-5 was used as the film supplied from the film supply roll 214, and the ultraviolet irradiation dose by the ultraviolet irradiation apparatus 216 was changed to 640 mJ/cm$^2$.

The FAW of the reinforcing fiber sheet and the resin percentage content of the second laminated body B10 were all the same as those of the second laminated body B1. Furthermore, the width of the resin composition for impregnation 4-11 that had exuded on the outside of the two edges of the prepreg precursor was also 15 mm or less, which was the same as that of Example 4-1. For the second laminated body B10 thus obtained, tear peelability of the light transmitting film was evaluated in the same manner as in Example 4-1. The results are presented in Table 10.

Example 4-11

<Preparation of Resin Composition for Impregnation 4-21>

50 Parts by mass of A-1 and 40 parts by mass of A-2 as the component (A) were weighed in a glass flask, and the components were heated to 130° C. using an oil bath and mixed. Subsequently, the mixture of A-1 and A-2 was cooled to about 60° C. This was transferred to a kneader, 19 parts by mass of the master batch 4-2 that had been prepared previously, and the mixture was stirred at 60° C. Thus, a resin composition for impregnation 4-21 indicated in Table 9 was obtained. For the resin composition for impregnation 4-21, the viscosities before and after ultraviolet irradiation were measured according to the <Measurement of viscosity change of resin composition for impregnation caused by ultraviolet irradiation>. The results are presented in Table 9.

<Production of Prepreg (Second Laminated Body B)>

A second laminated body B11 was produced by the same method as that used in Example 4-1, except that the resin composition for impregnation 4-21 was used instead of the resin composition for impregnation 4-11.

The FAW of the reinforcing fiber sheet and the resin percentage content of the second laminated body B11 were all the same as those of the second laminated body B1. Furthermore, the width of the resin composition for impregnation 4-21 that had exuded on the outside of the two edges of the prepreg precursor was also 15 mm or less, which was the same as that of Example 4-1. For the second laminated body B11 thus obtained, tear peelability of the light transmitting film was evaluated in the same manner as in Example 4-1. The results are presented in Table 10.

Example 4-12

A second laminated body B12 was produced by the same method as that used in Example 4-1, except that the resin composition for impregnation 4-21 was used instead of the resin composition for impregnation 4-1, and the ultraviolet irradiation dose by the ultraviolet irradiation apparatus 216 was changed to 640 mJ/cm$^2$.

The FAW of the reinforcing fiber sheet and the resin percentage content of the second laminated body B12 were all the same as those of the second laminated body B1, Furthermore, the width of the resin composition for impregnation 4-21 that had exuded on the outside of the two edges of the prepreg precursor was also 15 mm or less, which was the same as that of Example 4-1. For the second laminated body B12 thus obtained, tear peelability of the light transmitting film was evaluated in the same manner as in Example 4-1. The results are presented in Table 10.

Comparative Example 4-1

<Preparation of Resin Composition for Impregnation 4-31>

40 Parts by mass of A-1 and 40 parts by mass of A-2 as the component (A) were weighed in a glass flask, and the components were heated to 130° C. using an oil bath and mixed. Subsequently, the mixture of A-1 and A-2 was cooled to about 60° C. This was transferred to a kneader, 19 parts by mass of the master batch 4-3 that had been prepared previously, and the mixture was stirred at 60° C. Thus, a resin composition for impregnation 4-31 indicated in Table 9 was obtained. For the resin composition for impregnation 4-31, the viscosities before and after ultraviolet irradiation were measured according to the <Measurement of viscosity change of resin composition for impregnation caused by ultraviolet irradiation>. The results are presented in Table 9.

<Production of Prepreg (Laminated Body B)>

A second laminated body B13 was produced by the same method as that used in Example 4-1, except that the resin composition for impregnation 4-31 was used instead of the resin composition for impregnation 4-11, and the ultraviolet irradiation dose by the ultraviolet irradiation apparatus 216 was changed to 640 mJ/cm².

The FAW of the reinforcing fiber sheet and the resin percentage content of the second laminated body B13 were all the same as those of the second laminated body B1. Furthermore, the width of the resin composition for impregnation 4-31 that had exuded on the outside of the two edges of the prepreg precursor was also 15 mm or less, which was the same as that of Example 4-1. For the second laminated body B13 thus obtained, tear peelability of the light transmitting film was evaluated in the same manner as in Example 4-1. The results are presented in Table 11.

Comparative Example 4-2

A second laminated body B14 was produced by the same method as that used in Example 4-1, except that the peelable paper F-6 was supplied from the film supply roll 214, and the ultraviolet irradiation dose by the ultraviolet irradiation apparatus 216 was changed to 640 mJ/cm².

The FAW of the reinforcing fiber sheet and the resin percentage content of the second laminated body B14 were all the same as those of the second laminated body B1. Furthermore, the width of the resin composition for impregnation 4-11 that had exuded on the outside of the two edges of the prepreg precursor was also 15 mm or less, which was the same as that of Example 4-1. For the second laminated body B14 thus obtained, tear peelability of the light transmitting film was evaluated in the same manner as in Example 4-1. The results are presented in Table 11.

Comparative Example 4-3

A second laminated body B15 was produced by the same method as that used in Example 4-1, except that ultraviolet irradiation dose by the ultraviolet irradiation apparatus 216 was not carried out (irradiation dose 0 mJ/cm²).

The FAW of the reinforcing fiber sheet and the resin percentage content of the second laminated body B15 were all the same as those of the second laminated body B1. Furthermore, the width of the resin composition for impregnation 4-11 that had exuded on the outside of the two edges of the prepreg precursor was also 15 mm or less, which was the same as that of Example 4-1. For the second laminated body B15 thus obtained, tear peelability of the light transmitting film was evaluated in the same manner as in Example 4-1. The results are presented in Table 11.

Comparative Example 4-4

A second laminated body B16 was produced by the same method as that used in Comparative Example 4-3, except the resin composition for impregnation 4-2 was used instead of the resin composition for impregnation 4-11.

The FAW of the reinforcing fiber sheet and the resin percentage content of the second laminated body B16 were all the same as those of the second laminated body B1. Furthermore, the width of the resin composition for impregnation 4-21 that had exuded on the outside of the two edges of the prepreg precursor was also 15 mm or less, which was the same as that of Comparative Example 4-3. For the second laminated body B16 thus obtained, tear peelability of the light-transmitting film was evaluated in the same manner as in Comparative Example 4-3. The results are presented in Table 11.

TABLE 9

| | | Resin composition for impregnation 4-11 | Resin composition for impregnation 4-21 | Resin composition for impregnation 4-31 |
|---|---|---|---|---|
| Component (A) | A-1 | 50 | 50 | 60 |
| | A-2 | 40 | 40 | 40 |
| Component (B) | B-1 | 10 | — | — |
| | B-2 | — | 10 | — |
| Component (C) | Dicy | 4.2 | 4.2 | 4.2 |
| Curing aid | DCMU | 2.8 | 2.8 | 2.8 |
| Component (D) | Irgacure 184 | 2.0 | 2.0 | 2.0 |
| Resin viscosity (30° C.) | Non-UV-irradiated (Pa · sec) | 577 | 478 | 983 |
| | UV-irradiated 1 time (Pa · sec) | 9300 | 18800 | 768 |
| | UV-irradiated 2 times (Pa · sec) | 15300 | 29000 | 734 |

TABLE 10

|  | Example 4-1 Second laminated body B1 | Example 4-2 Second laminated body B2 | Example 4-3 Second laminated body B3 | Example 4-4 Second laminated body B4 | Example 4-5 Second laminated body B5 | Example 4-6 Second laminated body B6 |
|---|---|---|---|---|---|---|
| Resin composition for impregnation | Resin composition for impregnation 4-11 | Resin composition for impregnation 4-11 | Resin composition for impregnation 4-11 | Resin composition for impregnation 4-11 | Resin composition for impregnation 4-11 | Resin composition for impregnation 4-11 |
| Film | F-1 | F-1 | F-2 | F-2 | F-3 | F-3 |
| Intensity of ultraviolet radiation (mJ/cm$^2$) | 320 | 640 | 320 | 640 | 320 | 640 |
| Film tear peelability | ○ | ○ | ○ | ○ | ○ | ○ |

|  | Example 4-7 Second laminated body B7 | Example 4-8 Second laminated body B8 | Example 4-9 Second laminated body B9 | Example 4-10 Second laminated body B10 | Example 4-11 Second laminated body B11 | Example 4-12 Second laminated body B12 |
|---|---|---|---|---|---|---|
| Resin composition for impregnation | Resin composition for impregnation 4-11 | Resin composition for impregnation 4-11 | Resin composition for impregnation 4-11 | Resin composition for impregnation 4-11 | Resin composition for impregnation 4-21 | Resin composition for impregnation 4-21 |
| Film | F-4 | F-4 | F-5 | F-5 | F-1 | F-1 |
| Intensity of ultraviolet radiation (mJ/cm$^2$) | 320 | 640 | 320 | 640 | 320 | 640 |
| Film tear peelability | ○ | ○ | ○ | ○ | ○ | ○ |

TABLE 11

|  | Comparative Example 4-1 Second laminated body B13 | Comparative Example 4-2 Second laminated body B14 | Comparative Example 4-3 Second laminated body B15 | Comparative Example 4-4 Second laminated body B16 |
|---|---|---|---|---|
| Resin composition for impregnation | Resin composition for impregnation 4-31 | Resin composition for impregnation 4-11 | Resin composition for impregnation 4-11 | Resin composition for impregnation 4-21 |
| Film | F-1 | F-6 | F-1 | F-1 |
| Intensity of ultraviolet radiation (mJ/cm$^2$) | 640 | 640 | 0 | 0 |
| Film tear peelability | X | X | X | X |

INDUSTRIAL APPLICABILITY

According to the embodiments of the present invention, a prepreg which has excellent handleability, does not generate voids in a fiber-reinforced composite material, and can easily produce even a molded article having a curved surface shape, can be produced.

EXPLANATIONS OF LETTERS OR NUMERALS

1: REGION 1
2: REGION 2
10: PREPREG PRODUCTION APPARATUS
11a: REINFORCING FIBER SHEET (II-1)
11b: REINFORCING FIBER SHEET (II-2)
12: ATTACHMENT APPARATUS
12a: RESIN COATING DIE
13: PRESSING APPARATUS
13a, b: PRESSING ROLLS
14: SEPARATING FILM SUPPLY ROLL
14a, b: SEPARATING FILM
15: DRIVING ROLLS
16: ULTRAVIOLET IRRADIATION APPARATUS
17: SEPARATING FILM WINDING APPARATUS
18: PREPREG
19: WINDING MEANS
110: PREPREG PRODUCTION APPARATUS
111a: REINFORCING FIBER SHEET (III-1)
111b: REINFORCING FIBER SHEET (III-2)
112: ATTACHMENT APPARATUS
112a: RESIN COATING DIE
113: PRESSING APPARATUS
113a, b: PRESSING ROLLS
114: SEPARATING FILM SUPPLY ROLL
114a, b: SEPARATING FILM
115: SEPARATING FILM WINDING APPARATUS
116: ENERGY RAY IRRADIATION APPARATUS
117: PROTECTIVE FILM

118: DRIVING ROLLS
119: WINDING MEANS
120: PREPREG
121: PROTECTIVE FILM COMPRESSING ROLL
131: POLYETHYLENE FILM
132: PREPREG
133: STAINLESS STEEL PLATE
134: WEIGHT
135: WORK BENCH SURFACE
136: FINGERTIPS PICKING UP POLYETHYLENE FILM
141: METAL PLATE
142: WORK BENCH SURFACE
143a: DOUBLE-SIDED TAPE
143b: DOUBLE-SIDED TAPE
144: PREPREG
145: PROTECTIVE FILM
210: PREPREG PRODUCTION APPARATUS
211a: REINFORCING FIBER SHEET (IV-1)
211b: REINFORCING FIBER SHEET (IV-2)
212: ATTACHMENT APPARATUS
212a: RESIN COATING DIE
213: PRESSING APPARATUS
213a, 213b, 213c: PRESSING ROLLS
214: FILM SUPPLY ROLL
215: FILM WINDING APPARATUS
216: ULTRAVIOLET IRRADIATION APPARATUS
217: FILM DETACHMENT GUIDE ROLLS
218: DRIVING ROLLS
219: WINDING MEANS
220: PREPREG
221: UNWINDING MEANS
230: LIGHT TRANSMITTING FILM COLLECTING APPARATUS
250: PHOTOMASK
252: POLYESTER SUBSTRATE
254: CIRCULAR LIGHT-ADHERING SHEETS

The invention claimed is:

1. A prepreg, comprising reinforcing fibers and a matrix resin composition, wherein the matrix resin composition comprises:
   component (A): an epoxy resin;
   component (B): a radical polymerizable unsaturated compound;
   component (C): an epoxy resin curing agent; and
   component (E): a polymer formed by radical polymerization of the component (B),
   wherein:
   the prepreg is in a sheet form or a tape form;
   the prepreg has, on at least one surface of the prepreg, plural regions having mutually different reaction ratios of the matrix resin composition;
   the plural regions comprise at least one region having a high reaction ratio of the matrix resin composition and where a lower tackiness exists compared to a region having a relatively low reaction ratio of the matrix resin composition;
   the at least one region having the high reaction ratio of the matrix resin composition and the lower tackiness exists in a surface layer portion of the prepreg; and
   the component (E) is localized in the surface layer portion of the prepreg but not in a core of the prepreg, where the core of the prepreg is a portion deeper than 40% of a thickness of the prepreg from a surface of the prepreg relative to 100% of the thickness of the prepreg.

2. The prepreg according to claim 1, wherein the component (B) is a (meth)acrylate resin.

3. A method for producing the prepreg according to claim 1, the method comprising:
   producing a prepreg precursor by impregnating a reinforcing fiber substrate comprising the reinforcing fibers with a resin composition for impregnation including the component (A), the component (B), and the component (C); and
   irradiating a portion of at least one surface of the prepreg precursor with at least one energy wave selected from the group consisting of ultraviolet radiation, infrared radiation, visible light and electron beam to thereby cause a portion of the component (B) to react, and thereby producing the component (E) at the surface of the prepreg precursor.

4. The prepreg according to claim 1, wherein the matrix resin composition further comprises:
   component (D): a polymerization initiator that generates a radical, and wherein, in at least one surface of the prepreg, a tack value measured at a pressing pressure of 40 kPa is 70 kPa or less, while a tack value measured at a pressing pressure of 80 kPa is 150 kPa or more.

5. The prepreg according to claim 4, wherein, when a sum of contents of the component (A), the component (B), and the component (E) is 100 parts by mass, a sum of contents of the component (B) and the component (E) is 10 parts by mass to 25 parts by mass.

6. The prepreg according to claim 4, wherein the reinforcing fibers are in the form of a reinforcing fiber sheet obtained by gathering and arranging reinforcing fiber bundles.

7. The prepeg of claim 4, wherein the reinforcing fibers are carbon fibers.

8. The prepreg according to claim 1, wherein:
   a protective film is laminated on at least one surface of the prepreg; and
   an index of tackiness of the prepreg is 50 g or more.

9. The prepreg according to claim 1, wherein the reinforcing fibers are carbon fibers.

* * * * *